United States Patent
Reo et al.

(10) Patent No.: US 12,440,165 B2
(45) Date of Patent: Oct. 14, 2025

(54) CATHETER FOR NEURAL MEASUREMENTS AND TREATMENT AND RELATED SYSTEMS AND METHODS

(71) Applicant: Otsuka Medical Devices Co., Ltd., Tokyo (JP)

(72) Inventors: Michael L. Reo, Redwood City, CA (US); Stephen Bower, Morgan Hill, CA (US); Ashby Shaw, Santa Clara, CA (US); David Elliot Faulk, Jr., San Jose, CA (US)

(73) Assignee: Otsuka Medical Devices Co., Ltd., Tokyo (JP)

( * ) Notice: Subject to any disclaimer, the term of this patent is extended or adjusted under 35 U.S.C. 154(b) by 748 days.

(21) Appl. No.: 17/815,657

(22) Filed: Jul. 28, 2022

(65) Prior Publication Data
US 2023/0040877 A1 Feb. 9, 2023

Related U.S. Application Data

(60) Provisional application No. 63/357,840, filed on Jul. 1, 2022, provisional application No. 63/263,000, filed (Continued)

(51) Int. Cl.
*A61B 5/00* (2006.01)
*A61B 5/294* (2021.01)
(Continued)

(52) U.S. Cl.
CPC ............ *A61B 5/6852* (2013.01); *A61B 5/294* (2021.01); *A61B 5/388* (2021.01);
(Continued)

(58) Field of Classification Search
CPC ....... A61B 5/6852; A61B 5/294; A61B 5/388; A61B 2562/0209; A61B 2562/222;
(Continued)

(56) References Cited

U.S. PATENT DOCUMENTS 4,554,925 A  11/1985  Young
4,643,186 A  2/1987  Rosen
(Continued)

FOREIGN PATENT DOCUMENTS

EP  1299035  4/2003
EP  1503685  2/2005
(Continued)

OTHER PUBLICATIONS

Accornero, Neri, et al., "Selective Activation of Peripheral Nerve Fibre Groups of Different Diameter by Triangular Shaped Stimulus Pulses", J. Physiol. (1977), 273, pp. 539-560,, 22 pgs.
(Continued)

*Primary Examiner* — Adam Z Minchella
(74) *Attorney, Agent, or Firm* — Theresa Ann Raymer

(57) ABSTRACT

Described herein are catheters for use in analyzing neural activity of nerves that surround a biological lumen. Such a catheter comprises a handle including a first, second, and third actuators, and a shaft extending from the handle and including proximal and distal electrodes that are selectively deployable. The first actuator is configured to selectively deploy the proximal electrode in response to the first actuator being manually maneuvered. The second actuator is configured to selectively deploy the distal electrode in response to the second actuator being manually maneuvered. The third actuator is configured to selectively adjust a longitudinal distance between the proximal and distal electrodes in response to the third actuator being manually maneuvered.

24 Claims, 20 Drawing Sheets

Related U.S. Application Data on Oct. 25, 2021, provisional application No. 63/226,622, filed on Jul. 28, 2021.

(51) Int. Cl.
  *A61B 5/388* (2021.01)
  *A61M 25/00* (2006.01)

(52) U.S. Cl.
  CPC .. *A61B 2562/0209* (2013.01); *A61B 2562/222* (2013.01); *A61B 2562/227* (2013.01); *A61M 25/0054* (2013.01); *A61M 2025/0096* (2013.01); *A61M 2205/0266* (2013.01)

(58) Field of Classification Search
  CPC ..... A61B 2562/227; A61B 5/24; A61B 5/201; A61B 5/4836; A61B 5/725; A61B 18/1492; A61B 18/1815; A61B 2018/00023; A61B 2018/00267; A61B 2018/00404; A61B 2018/00434; A61B 2018/00511; A61B 2018/00577; A61B 2018/00839; A61B 2018/1253; A61B 2018/126; A61B 2018/1407; A61B 2018/1467; A61B 2018/162; A61B 2018/1861; A61B 2562/028; A61M 25/0054; A61M 2025/0096; A61M 2205/0266; A61N 1/18

See application file for complete search history.

(56) References Cited

U.S. PATENT DOCUMENTS

| | | | |
|---|---|---|---|
| 4,650,466 A | 3/1987 | Luther | |
| 4,709,698 A | 12/1987 | Johnston et al. | |
| 4,841,977 A | 6/1989 | Griffith et al. | |
| 4,983,169 A | 1/1991 | Furukawa | |
| 5,000,185 A | 3/1991 | Yock | |
| 5,035,695 A * | 7/1991 | Weber, Jr. | A61B 18/1402 606/49 |
| 5,114,423 A | 5/1992 | Kasprzyk | |
| 5,368,591 A | 11/1994 | Lennox | |
| 5,391,197 A | 2/1995 | Burdette et al. | |
| 5,423,811 A | 6/1995 | Imran et al. | |
| 5,558,672 A | 9/1996 | Edwards et al. | |
| 5,575,788 A | 11/1996 | Baker et al. | |
| 5,657,755 A | 8/1997 | Desai | |
| 5,685,839 A | 11/1997 | Edwards et al. | |
| 5,688,266 A | 11/1997 | Edwards et al. | |
| 5,800,482 A | 9/1998 | Pomeranz et al. | |
| 6,066,134 A | 5/2000 | Eggers et al. | |
| 6,097,985 A | 8/2000 | Kasevich et al. | |
| 6,117,101 A | 9/2000 | Diederich et al. | |
| 6,254,598 B1 | 7/2001 | Edwards | |
| 6,283,989 B1 | 9/2001 | Laufer et al. | |
| 6,292,695 B1 | 9/2001 | Webster, Jr. et al. | |
| 6,296,619 B1 | 10/2001 | Brisken et al. | |
| 6,383,151 B1 | 5/2002 | Diederich et al. | |
| 6,514,249 B1 | 2/2003 | Maguire et al. | |
| 6,529,756 B1 | 3/2003 | Phan | |
| 6,564,096 B2 | 5/2003 | Mest | |
| 6,584,360 B2 | 6/2003 | Francischelli et al. | |
| 6,635,054 B2 | 10/2003 | Fjield et al. | |
| 6,648,883 B2 | 11/2003 | Francischelli et al. | |
| 6,669,655 B1 | 12/2003 | Acker | |
| 6,692,490 B1 | 2/2004 | Edwards | |
| 6,719,755 B2 | 4/2004 | Sliwa, Jr. et al. | |
| 6,763,722 B2 | 7/2004 | Field et al. | |
| 6,837,886 B2 | 1/2005 | Collins | |
| 6,845,267 B2 | 1/2005 | Harrison et al. | |
| 6,954,977 B2 | 10/2005 | Maguire | |
| 7,052,695 B2 | 5/2006 | Kalish | |
| 7,156,816 B2 | 1/2007 | Schwartz et al. | |
| 7,162,303 B2 | 1/2007 | Levin et al. | |
| 7,371,231 B2 | 5/2008 | Rioux et al. | |
| 7,510,536 B2 | 3/2009 | Foley et al. | |
| 7,617,005 B2 | 11/2009 | Demarais et al. | |
| 7,621,873 B2 | 11/2009 | Owen et al. | |
| 7,653,438 B2 | 1/2010 | Deem et al. | |
| 7,717,948 B2 | 5/2010 | Demarais et al. | |
| 7,942,871 B2 | 5/2011 | Thapliyal et al. | |
| 8,024,050 B2 | 9/2011 | Libbus et al. | |
| 8,025,688 B2 | 9/2011 | Diederich et al. | |
| 8,137,274 B2 | 3/2012 | Weng et al. | |
| 8,447,414 B2 | 5/2013 | Johnson et al. | |
| 8,483,831 B1 | 7/2013 | Hlavka et al. | |
| 8,626,300 B2 | 1/2014 | Demarais et al. | |
| 8,702,619 B2 | 4/2014 | Wang | |
| 8,774,913 B2 | 7/2014 | Demarais et al. | |
| 8,790,281 B2 | 7/2014 | Diederich et al. | |
| 8,818,514 B2 | 8/2014 | Zarins et al. | |
| 8,845,629 B2 | 9/2014 | Demarais et al. | |
| 8,909,316 B2 | 12/2014 | Ng | |
| 8,932,289 B2 | 1/2015 | Mayse et al. | |
| 9,022,948 B2 | 5/2015 | Wang | |
| 9,028,472 B2 | 5/2015 | Mathur et al. | |
| 9,066,720 B2 | 6/2015 | Ballakur et al. | |
| 9,072,902 B2 | 7/2015 | Mathur et al. | |
| 9,155,590 B2 | 10/2015 | Mathur | |
| 9,186,198 B2 | 11/2015 | Demarais et al. | |
| 9,186,212 B2 | 11/2015 | Nabulovsky et al. | |
| 9,289,132 B2 | 3/2016 | Ghaffari | |
| 9,326,816 B2 | 5/2016 | Srivastava | |
| 9,327,123 B2 | 5/2016 | Yamasaki | |
| 9,333,035 B2 | 5/2016 | Rudie | |
| 9,339,332 B2 | 5/2016 | Srivastava | |
| 9,345,530 B2 | 5/2016 | Ballakur et al. | |
| 9,375,154 B2 | 6/2016 | Wang | |
| 7,717,948 C1 | 8/2016 | Demarais et al. | |
| 9,427,579 B2 | 8/2016 | Fain et al. | |
| 9,439,598 B2 | 9/2016 | Shimada et al. | |
| 9,649,064 B2 | 5/2017 | Toth et al. | |
| 9,723,998 B2 | 8/2017 | Wang | |
| 9,730,639 B2 | 8/2017 | Toth et al. | |
| 9,743,845 B2 | 8/2017 | Wang | |
| 9,750,560 B2 | 9/2017 | Ballakur et al. | |
| 9,770,291 B2 | 9/2017 | Wang et al. | |
| 9,770,593 B2 | 9/2017 | Gross | |
| 9,801,684 B2 | 10/2017 | Fain | |
| 9,820,811 B2 | 11/2017 | Wang | |
| 9,907,983 B2 | 3/2018 | Thapliyal et al. | |
| 9,931,047 B2 | 4/2018 | Srivastava | |
| 9,956,034 B2 | 5/2018 | Toth et al. | |
| 9,968,790 B2 | 5/2018 | Toth et al. | |
| 9,981,108 B2 | 5/2018 | Warnking | |
| 9,999,463 B2 | 6/2018 | Puryear et al. | |
| 10,004,458 B2 | 6/2018 | Toth et al. | |
| 10,004,557 B2 | 6/2018 | Gross et al. | |
| 10,010,364 B2 | 7/2018 | Harringtpm | |
| 10,016,233 B2 | 7/2018 | Pike | |
| 10,022,085 B2 | 7/2018 | Toth et al. | |
| 10,039,901 B2 | 8/2018 | Warnking | |
| 10,123,903 B2 | 11/2018 | Warnking et al. | |
| 10,143,419 B2 | 12/2018 | Toth et al. | |
| 10,179,020 B2 | 1/2019 | Ballakur et al. | |
| 10,179,026 B2 | 1/2019 | Ng | |
| 10,182,865 B2 | 1/2019 | Naga et al. | |
| 10,226,633 B2 | 3/2019 | Toth et al. | |
| 10,245,429 B2 | 4/2019 | Deem et al. | |
| 10,292,610 B2 | 5/2019 | Srivastava | |
| 10,293,190 B2 | 5/2019 | Zarins et al. | |
| 10,363,359 B2 | 7/2019 | Toth et al. | |
| 10,368,775 B2 | 8/2019 | Hettrick et al. | |
| 10,376,310 B2 | 8/2019 | Fain et al. | |
| 10,383,685 B2 | 8/2019 | Gross et al. | |
| 10,398,332 B2 | 9/2019 | Min et al. | |
| 10,470,684 B2 | 11/2019 | Toth et al. | |
| 10,478,249 B2 | 11/2019 | Gross et al. | |
| 10,499,937 B2 | 12/2019 | Warnking | |
| 10,543,037 B2 | 1/2020 | Shah | |
| 10,850,091 B2 | 12/2020 | Zarins et al. | |
| 11,801,085 B2 | 10/2023 | Wu et al. | |
| 2001/0023365 A1 | 9/2001 | Medhkour et al. | |

(56) References Cited

U.S. PATENT DOCUMENTS

| | | |
|---|---|---|
| 2002/0042610 A1 | 4/2002 | Sliwa, Jr. et al. |
| 2002/0072741 A1 | 6/2002 | Sliwa, Jr. et al. |
| 2002/0165535 A1 | 11/2002 | Lesh |
| 2002/0173724 A1 | 11/2002 | Dorondo et al. |
| 2002/0193681 A1 | 12/2002 | Vitek et al. |
| 2003/0004439 A1 | 1/2003 | Pant et al. |
| 2003/0028111 A1 | 2/2003 | Vaezy et al. |
| 2003/0074039 A1 | 4/2003 | Puskas |
| 2003/0114878 A1 | 6/2003 | Diederich et al. |
| 2003/0125726 A1 | 7/2003 | Maguire et al. |
| 2003/0181963 A1 | 9/2003 | Pellegrino et al. |
| 2003/0216721 A1 | 11/2003 | Diederich et al. |
| 2003/0216792 A1 | 11/2003 | Levin |
| 2004/0019349 A1 | 1/2004 | Fuimaono et al. |
| 2004/0082859 A1 | 4/2004 | Schaer |
| 2004/0097819 A1 | 5/2004 | Duarte |
| 2004/0106880 A1 | 6/2004 | Weng et al. |
| 2004/0122494 A1 | 6/2004 | Eggers et al. |
| 2004/0181178 A1 | 9/2004 | Aldrich et al. |
| 2004/0242999 A1 | 12/2004 | Vitek et al. |
| 2005/0038340 A1 | 2/2005 | Vaezy et al. |
| 2005/0159738 A1 | 7/2005 | Visram et al. |
| 2005/0203501 A1 | 9/2005 | Aldrich et al. |
| 2005/0215990 A1 | 9/2005 | Govari |
| 2005/0228283 A1 | 10/2005 | Gifford et al. |
| 2005/0228459 A1 | 10/2005 | Levin et al. |
| 2005/0228460 A1 | 10/2005 | Levin et al. |
| 2005/0261672 A1 | 11/2005 | Deem et al. |
| 2005/0288730 A1 | 12/2005 | Deem et al. |
| 2006/0041277 A1 | 2/2006 | Deem et al. |
| 2006/0052695 A1 | 3/2006 | Adam et al. |
| 2006/0058711 A1 | 3/2006 | Harhen et al. |
| 2006/0064081 A1 | 3/2006 | Rosinko |
| 2006/0118127 A1 | 6/2006 | Chinn |
| 2006/0142827 A1 | 6/2006 | Willard et al. |
| 2006/0184069 A1 | 8/2006 | Vaitekunas |
| 2006/0217772 A1 | 9/2006 | Libbus et al. |
| 2006/0235286 A1 | 10/2006 | Stone et al. |
| 2007/0060921 A1 | 3/2007 | Janssen et al. |
| 2007/0072741 A1 | 3/2007 | Robideau |
| 2007/0106292 A1 | 5/2007 | Kaplan et al. |
| 2007/0135875 A1 | 6/2007 | Demarais et al. |
| 2008/0039746 A1 | 2/2008 | Hissong et al. |
| 2008/0215031 A1 | 9/2008 | Belfort et al. |
| 2009/0234407 A1 | 9/2009 | Hastings et al. |
| 2009/0248005 A1 | 10/2009 | Rusin et al. |
| 2010/0256627 A1* | 10/2010 | Ma .................... A61N 1/06 606/41 |
| 2011/0118723 A1 | 5/2011 | Turner et al. |
| 2011/0125206 A1 | 5/2011 | Bornzin |
| 2011/0208096 A1 | 8/2011 | Demarais et al. |
| 2012/0004656 A1 | 1/2012 | Jackson et al. |
| 2012/0265198 A1 | 10/2012 | Crow et al. |
| 2012/0296232 A1 | 11/2012 | Ng |
| 2013/0023897 A1 | 1/2013 | Wallace |
| 2013/0085489 A1 | 4/2013 | Hill |
| 2013/0096550 A1 | 4/2013 | Hill |
| 2013/0116737 A1 | 5/2013 | Edwards et al. |
| 2013/0123770 A1 | 5/2013 | Smith |
| 2013/0131743 A1 | 5/2013 | Yamasaki et al. |
| 2013/0150749 A1 | 6/2013 | McLean et al. |
| 2013/0165925 A1 | 6/2013 | Mathur et al. |
| 2013/0172872 A1 | 7/2013 | Subramaniam |
| 2013/0274614 A1 | 10/2013 | Shimada et al. |
| 2013/0289369 A1 | 10/2013 | Margolis |
| 2013/0289682 A1 | 10/2013 | Barman et al. |
| 2014/0018788 A1 | 1/2014 | Engelman et al. |
| 2014/0058294 A1 | 2/2014 | Gross et al. |
| 2014/0257271 A1 | 9/2014 | Mayse et al. |
| 2014/0274614 A1 | 9/2014 | Min et al. |
| 2014/0275924 A1 | 9/2014 | Min et al. |
| 2014/0288551 A1 | 9/2014 | Bharmi et al. |
| 2014/0288616 A1 | 9/2014 | Rawat et al. |
| 2014/0303617 A1 | 10/2014 | Shimada |
| 2015/0289931 A1 | 10/2015 | Puryear et al. |
| 2016/0000345 A1 | 1/2016 | Kobayashi et al. |
| 2016/0045121 A1 | 2/2016 | Akingba et al. |
| 2016/0338773 A1 | 11/2016 | Shimada et al. |
| 2017/0027460 A1 | 2/2017 | Shimada et al. |
| 2017/0035310 A1 | 2/2017 | Shimada et al. |
| 2017/0296264 A1 | 10/2017 | Wang |
| 2018/0022108 A1 | 1/2018 | Mori et al. |
| 2018/0042670 A1 | 2/2018 | Wang et al. |
| 2018/0064359 A1 | 3/2018 | Pranaitis |
| 2018/0078307 A1 | 3/2018 | Wang et al. |
| 2018/0185091 A1 | 7/2018 | Toth et al. |
| 2018/0221087 A1 | 8/2018 | Puryear et al. |
| 2018/0249958 A1 | 9/2018 | Toth et al. |
| 2018/0250054 A1 | 9/2018 | Gross et al. |
| 2018/0271594 A1* | 9/2018 | Tyson .................... A61B 18/1206 |
| 2018/0280082 A1 | 10/2018 | Puryear et al. |
| 2018/0289320 A1 | 10/2018 | Toth et al. |
| 2018/0310991 A1 | 11/2018 | Pike |
| 2018/0333204 A1 | 11/2018 | Ng |
| 2019/0046111 A1 | 2/2019 | Toth et al. |
| 2019/0046264 A1 | 2/2019 | Toth et al. |
| 2019/0076191 A1 | 3/2019 | Wang |
| 2019/0110704 A1 | 4/2019 | Wang |
| 2019/0134396 A1 | 5/2019 | Toth et al. |
| 2019/0151670 A1 | 5/2019 | Toth et al. |
| 2019/0183560 A1 | 6/2019 | Ballakur et al. |
| 2019/0307361 A1 | 10/2019 | Hettrick et al. |
| 2020/0046248 A1 | 2/2020 | Toth et al. |
| 2020/0077907 A1 | 3/2020 | Shimada et al. |
| 2021/0000543 A1 | 1/2021 | Coates et al. |
| 2022/0095979 A1* | 3/2022 | Shimada .................... A61B 5/24 |

FOREIGN PATENT DOCUMENTS

| | | |
|---|---|---|
| EP | 1579889 | 9/2005 |
| EP | 2213257 | 8/2010 |
| EP | 2359764 | 8/2011 |
| EP | 2430996 | 3/2012 |
| EP | 2842604 | 3/2015 |
| EP | 2968984 | 1/2016 |
| EP | 2995250 | 3/2016 |
| EP | 3799931 | 4/2021 |
| WO | WO1999/002096 | 1/1999 |
| WO | WO2001/095820 | 12/2001 |
| WO | WO2002/005897 | 1/2002 |
| WO | WO 2002/019934 | 3/2002 |
| WO | WO2003/022167 | 3/2003 |
| WO | WO2003/051450 | 6/2003 |
| WO | WO2006/041881 | 4/2006 |
| WO | WO2006/060053 | 6/2006 |
| WO | WO2007/014003 | 2/2007 |

OTHER PUBLICATIONS

Carter JR. Microneurography and sympathetic nerve activity: a decade-by-decade journey across 50 years. *J Neurophysiol.* 2019;121(4):1183-1194. doi:10.1152/jn.00570.2018.

Diedrich A, Charoensuk W, Brychta RJ, Ertl AC, Shiavi R., "Analysis of raw microneurographic recordings based on wavelet denoising technique and classification algorithm: wavelet analysis in microneurography." IEEE Transactions on Bio-medical Engineering. Jan. 2003;50(1):41-50. DOI: 10.1109/TBME.2002.807323.

Papademetriou, et al., "Renal Sympathetic Denervation: Hibernation or Resurrection?", Cardiology 2016; 135 , 11 pgs.

Salmanpour, A., L. J. Brown and J. K. Shoemaker, "Detection of single action potential in multi-unit postganglionic sympathetic nerve recordings in humans: A matched wavelet approach," 2010 IEEE International Conference on Acoustics, Speech and Signal Processing, Dallas, TX, 2010, pp. 554-557, doi: 10.1109/ICASSP. 2010.5495604.

Schlaich, APA, Markus Pa; Straznicky, Noraa; Grima, Marieea; Ika-Sari, Carolinaa; Dawood, Tyea; Mahfoud, Felixb; Lambert, Elisabetha; Chopra, Reenaa; Socratous, Floraa; Hennebry, Saraha; Eikelis, Ninaa; Böhm, Michaelb; Krum, Henryd; Lambert, Gavina; Esler, Murray Da; Sobotka, Paul Ac, "Renal denervation: a potential new treatment modality for polycystic ovary syndrome?," Journal

(56) References Cited

OTHER PUBLICATIONS of Hypertension: May 2011—vol. 29—Issue 5—p. 991-996 doi: 10.1097/HJH.0b013e328344db3a.

Xu, J., Wu, T., and Yang, Z., "A New System Architecture for Future Long-Term High-Density Neural Recording;" TCSII Jul. 2013 402-406.

U.S. Appl. No. 14/683,966, 312 Amendment filed Mar. 13, 2018, 10 pgs.

U.S. Appl. No. 14/683,966, Corrected Notice of Allowance mailed May 22, 2018, 4 pgs.

U.S. Appl. No. 14/683,966, Non Final Office Action mailed Jun. 12, 2017, 14 pgs.

U.S. Appl. No. 14/683,966, Notice of Allowance mailed Jan. 31, 2018, 8 pgs.

U.S. Appl. No. 14/683,966, PTO Response to Rule 312 Communication mailed Mar 29, 2018, 2 pgs.

U.S. Appl. No. 14/683,966, Response filed Nov. 10, 2017 to Non Final Office Action mailed Jun. 12, 2017, 13 pgs.

U.S. Appl. No. 15/204,349, Advisory Action mailed Jul. 9, 2022, 5 pgs.

U.S. Appl. No. 15/204,349, Final Office Action mailed Apr. 22, 2019, 16 pgs.

U.S. Appl. No. 15/204,349, Non Final Office Action mailed Nov. 27, 2018, 14 pgs.

U.S. Appl. No. 15/204,349, Preliminary Amendment filed Nov. 30, 2016, 3 pgs.

U.S. Appl. No. 15/204,349, Response filed Feb. 27, 2019 to Non Final Office Action mailed Nov. 27, 2018, 10 pgs.

U.S. Appl. No. 15/204,349, Response filed Jun. 5, 2018 to Restriction Requirement mailed May 17, 2018, 7 pgs.

U.S. Appl. No. 15/204,349, Response filed Jun. 24, 2019 to Final Office Action mailed Apr. 22, 2019, 12 pgs.

U.S. Appl. No. 15/204,349, Restriction Requirement mailed May 17, 2018, 7 pgs.

U.S. Appl. No. 15/299,694, Advisory Action mailed Jul. 9, 2019, 5 pgs.

U.S. Appl. No. 15/299,694, Final Office Action mailed Apr. 22, 2019, 16 pgs.

U.S. Appl. No. 15/299,694, Non Final Office Action mailed Nov. 27, 2018, 15 pgs.

U.S. Appl. No. 15/299,694, Response filed Feb. 27, 2019 to Non Final Office Action mailed Nov. 27, 2018, 10 pgs.

U.S. Appl. No. 15/299,694, Response filed Jun. 24, 2019 to Final Office Action mailed Apr. 22, 2019, 11 pgs.

U.S. Appl. No. 15/299,694, Response filed Oct. 8, 2018 to Restriction Requirement mailed Aug. 6, 2018, 7 pgs.

U.S. Appl. No. 15/299,694, Restriction Requirement mailed Aug. 6, 2018, 6 pgs.

U.S. Appl. No. 15/943,354, Preliminary Amendment filed Apr. 3, 2018, 9 pgs.

U.S. Appl. No. 15/943,354, Non Final Office Action mailed Apr. 20, 2020, 7 pgs.

U.S. Appl. No. 15/996,978, Preliminary Amendment filed Jun. 5, 2018, 11 pgs.

U.S. Appl. No. 15/996,978, Response filed Apr. 6, 2020 to Restriction Requirement mailed Feb. 7, 2020, 8 pages.

U.S. Appl. No. 15/996,978, Restriction Requirement mailed Apr. 16, 2020, 8 pages.

U.S. Appl. No. 15/996,978, Response filed May 1, 2020 to Restriction Requirement mailed Apr. 16, 2020, 8 pages.

U.S. Appl. No. 15/996,978, Non Final Office Action mailed Jun. 11, 2020, 8 pages.

U.S. Appl. No. 15/943,354, Restriction Requirement mailed Nov. 20, 2019, 8 pages.

U.S. Appl. No. 15/943,354, Response filed Dec. 19, 2019 to Restriction Requirement mailed Nov. 2019, 8 pages.

U.S. Appl. No. 15/943,354, Non Final Office Action mailed Jan. 13, 2020, 6 pages.

U.S. Appl. No. 15/996,978, Restriction Requirement mailed Feb. 7, 2020, 7 pages.

File History for U.S. Appl. No. 17/815,657, filed Jul. 28, 2022.

U.S. Appl. No. 17/453,636, filed Nov. 4, 2021.

Borchert, Bianca et al., "Lethal Atrioesophageal Fistual After Pulmonary Vein Isolation using High-Intensity Focused Ultrasound (Hifu)" J. Hrthm vol. 5, Issue 1, p. 145-148, Jan. 2008.

Calkins, Hugh et al., "Temperature Monitoring During Radiofrequency Catheter Ablation Procedures Using Closed Loop Control," Circulation vol. 90, No. 3, p. 1279-1286, Sep. 1994.

Deardorff, Dana L. et al., "Control of interstitial thermal coagulation: Comparative evaluation of microwave and ultrasound applicators," Medical Physics vol. 28, No. 1, p. 104-117, Jan. 2001.

Dinerman, Jay L. et al., "Temperature Monitoring During Radiofrequency Ablation," Journal of Cardiovascular Electrophysiology, vol. 7 No. 2, p. 163-173, Feb. 1996.

Esler, Murray et al., "The future of renal denervation," Autonomic Neuroscience: Basic and Clinical, vol. 204, p. 131-138, May 2017.

Filonenko, E.A et al., "Heating of Biological Tissues by Two-Dimensional Phased Arrays with Random and Regular Element Distributions," Acoustical Physics, vol. 50 No. 2, p. 222-231, 2004.

Fry, William J., "Action of Ultrasound on Nerve Tissue—A review," The Journal of the Acoustical Society of America, vol. 25 No. 1, p. 1-5, Jan. 1953.

Fry, Frank J., "Precision High Intensity Focusing Ultrasonic Machines for Surgery," High Intensity Focused U.S., 152-156, Sep. 6-7, 1957.

Haines, David, "Biophysics of Ablation: Application to Technology," Journal of Cardiovascular Electrophysiology, vol. 15, No. 10, pg. S2-S11, Oct. 2004.

Hynynen, K. et al., "Design of Ultrasonic Transducers for Local Hyperthermia," Ultrasound in Med. & Biol., vol. 7, No. 4, p. 397-402, Feb. 1981.

Hynynen, K. et al., "Temperature measurements during ultrasound hyperthermia," Medical Physics vol. 16, No. 4, p. 618-626, Jul./Aug. 1989.

Jolesz, Ferenc A. et al., "MR Imaging-Controlled Focused Ultrasound Ablation: A Noninvasive Image-Guided Surgery," Magnetic Resonance Imaging Clinics of North America, vol. 13, Issue 3, p. 545-560, 2005.

Kandzari, David A., et al., "Reply to letter to the editor by Kintur Sanghvi, MD; Allen McGrew, DO; and Kiran Hegde, BE, MBA," American Heart Journal, vol. 180, p. e3-e4, Oct. 2016.

Lafon, C. et al., "Design and Preliminary Results of an Ultrasound Applicator for Interstitial Thermal Coagulation," Ultrasound in Medicine & Biology, vol. 24, No. 1, p. 113-122, 1998.

Lewis, Matthew A. et al., "Thermometry and Ablation Monitoring with Ultrasound," Int. J. Hyperthermia vol. 31, Issue 2, p. 163-181, Mar. 2015.

Liu, Xinmeng et al., "Visualization and mapping of the right phrenic nerve by intracardiac echocardiography during atrial fibrillation ablation," Europace vol. 25, p. 1352-1360, 2023.

Mendelsohn, Farrell O., "Microanatomy of the Renal Sympathetic Nervous System," Endovascular Today, p. 59- 62, Oct. 2013.

Okamura, Keisuke et al., "Intravascular Ultrasound Can Be Used to Locate Nerves, but not Confirm Ablation, During Renal Sympathetic Denervation," J. Clin. Med. Res., vol. 13, No. 12, p. 556-562, 2021.

Quadri, Syed A. et al., "High-intensity focused ultrasound: past, present, and future in neurosurgery," Neurosurgical Focus, vol. 44, No. 2, p. 1-9, Feb. 2018.

Ross, Anthony B. et al., "Highly directional transurethral ultrasound applicators with rotational control for MRI-guided prostatic thermal therapy," Physics in Medicine & Biology, vol. 49, p. 189-204, Jan. 2004.

Sakaoka, Atsushi, et al., "Accurate Depth of Radiofrequency-Induced Lesions in Renal Sympathetic Denervation Based on a Fine Histological Sectioning Approach in a Porcine Model," Cir. Cardiovasc. Interv., vol. 11, p. 1-8, 2018.

Sanghvi, Kintur et al., "Rationale and design for studies of renal denervation in the absence (SPYRAL HTN Off-Med) and presence (SPYRAL HTN On-Med) of antihypertensive medications," American Heart Journal, vol. 180, p. e1-e2. Oct. 2016.

Satou, Shunsuke et al., "Observation of renal sympathetic nerves by intravascular ultrasound," Hypertension Research vol. 42, p. 1092-1094, 2019.

(56) References Cited

OTHER PUBLICATIONS

Schmidt, Boris et al., "Balloon Catheters for Pulmonary Vein Isolation," Herz vol. 33, p. 580-584, 2008.
Smith, Nadine Barrie et al., "Transrectal Ultrasound Applicator for Prostate Heating Monitored Using MRI Thermometry," Int. J. Radiation Oncology Biol. Phys. vol. 43, No. 1, p. 217-225, 1998.
Stauffer, P.R. et al., "13 Interstitial Heating Technologies," Thermoradiotherapy and Thermochemotherapy, p. 279-320, 1995.
Swanson, David K. et al., "Tissue temperature Feedback Control of Power, The Key to Successful Ablation," Innovations, vol. 6 No. 4, p. 276-282, Jul./Aug. 2011.
Tabei, Makoto et al., "A k-space method for coupled first-order acoustic propagation equations," J. Acoust. Soc. Am., vol. 111, No. 1, pt. 1, p. 53-63, Jan. 2002.
Tzafriri, Abraham R. et al., "Innervation Patterns May Limit Response to Endovascular Renal Denervation," Journal of the American College of Cardiology, vol. 64, No. 11, p. 1079-1087, Sep. 2014.
Umemura, Shin-ichiro, "Focused ultrasound transducer for thermal treatment," International Journal of Hyperthermia, vol. 31, No. 2, p. 216-221, 2015.
Wan, Hong et al., "Thermal Dose Optimization for Ultrasound Tissue Ablation," IEE Transactions on Ultrasonics, Ferroelectrics, and Frequency Control, vol. 46, No. 4, p. 913-928, Jul. 1999.
Zivin, Adam, et al., "Temperature Monitoring versus Impedance Monitoring during RF Catheter Ablation," Radiofrequency Catheter Ablation of Cardiac Arrhythmias, Basic Concepts and Clinical Applications, Second Edition, Edited by Shoei K. Stephen Huang, MD & David J. Wilber, MD, p. 103-112, 2000.
Ahmed, Muneeb et al., "Thermal Ablation Therapy for Hepatocellular Carcinoma," J. Vasc. Interv, Radiol., vol. 13, No. 9 pt. 2, 2002.
Benito, Fernando et al., "Radiofrequency catheter ablation of accessory pathways in infants," Heart, vol. 78, p. 160-162, 1997.
Chang, Isaac A. et al., "Thermal Modeling of Lesion Growth with Radiofrequency Ablation Devices," Biomedical Engineering Online vol. 3, p. 27, 2004.
Chung, Andrew et al., "Thermal dosimetry of a focused ultrasound beam in vivo by magnetic resonance imaging," Medical Physics, vol. 26, No. 9, p. 2017-2026, Sep. 1999.
Damianou, Christakis et al., "High Intensity Focused Ultrasound Ablation of Kidney Guided MRI," Ultrasound in Med. & Biol., vol. 30, No. 3, p. 397-404, 2004.
Deardorff, Dana L. et al., "Axial Control of Thermal Coagulation Using a Multi-Element Interstitial Ultrasound Applicator with Internal Cooling," IEE Transactions on Ultrasonics, Ferroelectrics, and Frequency Control, vol. 47, No. 1, p. 170-178, Jan. 2000.
Dewhirst, M.W. et al., "Basic Principles of Thermal Dosimetry and Thermal Thresholds for Tissue Damage from Hyperthermia," International Journal of Hyperthermia vol. 19, No. 3, p. 267-294, May-Jun. 2003.
Diederich, Chris J. et al., "Ultrasound Technology for Hyperthermia," Ultrasound in Med. & Biol., vol. 25, No. 6, p. 871-887, 1999.
Fry, F.J. et al., "Production of Reversible Changes in the Central Nervous System by Ultrasound," Science, vol. 127, p. 83-84, Jan. 1958.
Gavrilov, L.R. et al., The Effect of Focused Ultrasound on the Skin and Deep Nerve Structures of Man and Animal, p. 279-292.
Gavrilov, L.R., "Use of Focused Ultrasound for Stimulation of Nerve Structures," Ultrasonics, p. 132-138, May 1984.
Graham, S.J. et al., "Quantifying Tissue Damage Due to Focused Ultrasound Heating Observed by MRI" Magnetic Resonance in Medicine vol. 41, p. 321-328, 1999.
Goldberg, S. Nahum et al., "Radiofrequency Tissue Ablation: Increased Lesion Diameter with a Perfusion Electrode," Acad. Radiol. vol. 3, No. 8, p. 636-644, Aug. 1996.
Häcker, Axel et al., "Extracorporeal Organotripsy for Renal Tumours," Current Opinion in Urology, vol. 13, p. 221-225, 2003.
Hausberg, Martin et al., "Sympathetic Nerve Activity in End-Stage Renal Disease," Circulation, vol. 106, p. 1974-1979, 2002.
Ho, Siew Yen et al., "Anatomy of the Left Atrium: Implications for Radiofrequency Ablation of Atrial Fibrillation," J Cardiovasc Electrophysiol, vol. 10, p. 1525-1533, Nov. 1999.
Israel, Gary M. et al., "MRI of the Kidney and Urinary Tract," Journal of Magnetic Resonance Imaging, vol. 24, p. 725-734, 2006.
Jiang, S.C. et al., "Effects of Thermal Properties and Geometrical Dimensions on Skin Burn Injuries," Burns, vol. 28, p. 713-717, 2002.
Kaye, David M. et al., "Functional and Neurochemical Evidence for Partial Cardiac Sympathetic Reinnervation After Cardiac Transplantation in Humans," Circulation, vol. 88, No. 3, Sep. 1993.
Keane, David, "New Catheter Ablation Techniques for the Treatment of Cardiac Arrhythmias," Cardiac Electrophysiology Review vol. 6, No. 4, p. 341-348, 2002.
Kennedy, J.E. et al., "High Intensity Focused Ultrasound: Surgery of the Future?", The British Journal of Radiology, vol. 76, p. 590-599, Sep. 2003.
Lai, Yu-Chi et al., "Lesion Size Estimator of Cardiac Radiofrequency Ablation at Different Common Locations with Different Tip Temperatures," IEEE Transactions on Biomedical Engineering vol. 51, No. 10, p. 1859-1864, Oct. 2004.
Lauder, Lucas et al., "Renal Denervation in the Management of Hypertension," EuroIntervention, vol. 20, p. e467-e478, 2024.
Lele, P.P., "Effects of Focused Ultrasonic Radiation on Peripheral Nerve, with Observations on Local Heating," Experimental Neurology, vol. 8, p. 47-83, 1963.
Liao, Qingyao et al., "Optimal Strategy for HIFU-Based Renal Sympathetic Denervation in Canines," Frontiers in Cardiovascular Medicine vol. 8, p. 1-11, Oct. 2021.
Liem, L. Bing, "Progress in Cardiac Arrhythmia Ablation: Potential for Broader Application and Shorter Procedure Time," Journal of Cardiothoracic and Vascular Anesthesia, vol. 11, No. 7, p. 895-900, Dec. 1997.
Lin, James C., "Physical Aspects of Radiofrequency Ablation," Radiofrequency Catheter Ablation of Cardiac Arrhythmias, Basical Concepts and Clinical Applications, Second Edition, Edited by Shoei K. Stephen Huang & David K. Wilber, 2000.
Mahfoud, Felix et al., "Device Therapy of Hypertension," Circulation Research nol. 128, p. 1080-1099, Apr. 2021.
Makin, Inder Raj. S. et al., "Miniaturized Ultrasound Arrays for Interstitial Ablation and Imaging," Ultrasound in Med. & Biol. vol. 31, No. 11, p. 1539-1550, 2005.
Malcolm, A.L. et al., "Ablation of Tissue Volumes Using High Intensity Focused Ultrasound" Ultrasound in Med. & Biol. Vol. 22 No. 5 p. 659-669, 1996.
Manolis, Antonis S. et al., "Radiofrequency Catheter Ablation for Cardiac Tachyarrhythmias," Annals of Internal Medicine, vol. 131, No. 6, p. 452-461, Sep. 1994.
Mitchell, G.A.G et al., "An Anatomical Evaluation of Operations for Hypertension," Proceedings of the Anatomical Society vol. LIV., No. 10, p. 545-560.
Mompeo, Blanca et al., "The Gross Anatomy of the Renal Sympathetic Nerves Revisited," Clinical Anatomy vol. 29, p. 660-664, Apr. 2016.
Moore, J.H. et al., "The Biophysical Effects of Ultrasound on Median Nerve Distal Latencies," Electromyogr. Clin. Neurophysiol., vol. 40, p. 169-190, 2000.
Nath, Sunil et al., "Basic Aspects of Radiofrequency Catheter Ablation," Journal of Cardiovascular Electrophysiology vol. 5, No. 10, p. 863-876, Oct. 1994.
Nath, Sunil et al., "Biophysics and Pathology of Catheter Energy Delivery Systems," Progress in Cardiovascular Diseases, vol. XXXVII, No. 4, p. 185-204, Jan./Feb. 1995.
Nau, William H. et al., "MRI-Guided Interstitial Ultrasound Thermal Therapy of the Prostate: A Feasibility Study in the Canine Model," Medical Physics vol. 32, No. 3, p. 733-743, Mar. 2005.
Nikfarjam, Mehrdad et al., "Mechanisms of Focal Heat Destruction of Liver Tumors," Journal of Surgical Research, vol. 127, No. 2, p. 208-223, Aug. 2005.
Ninet, Jean et al., "Surgical Ablation of Atrial Fibrillation With Off-Pump, Epicardial, High-Intensity Focused Ultrasound: Results of A Multicenter Trial," The Journal of Thoracic and Cardiovascular Surgery, vol. 130, No. 3, p. 803.e1-803 e.8, Sep. 2005.

(56) References Cited

OTHER PUBLICATIONS

Ohkubo, Toyoyuki et al., "Experimental Study of Catheter Ablation Using Ultrasound Energy in Canine and Porcine Hearts," Jpn. Heart J. vol. 39, No. 3, p. 399-409, May 1998.
Papademetriou, Vasilios et al., "Renal Nerve Ablation for Resistant Hypertension, How Did We Get Here, Present Status, and Future Directions," Circulation, No. 129, p. 1440-1451, 2014.
Pozzoli, Alberto et al., "Electrophysiological Efficacy of Epicor High-Intensity Focused Ultrasound," European Journal of Cardio-Thoracic surgery, vol. 42, p. 129-134, 2012.
Riis, Thomas et al., "Effective Ultrasonic Stimulation in Human Peripheral Nervous System," IEE Transactions on Biomedical Engineering, vol. XX, No. XX, p. 1-8, XXXX 2021.
Roux, N. et al., "The Myocardial Sleeves of the Pulmonary Veins: Potential Implications for Atrial Fibrillation," Surg. Radiol. Anat., vol. 26, p. 285-289, Feb. 2004.
Schuarte, Patrick et al., "Catheter Ablation of Cardiac Autonomic Nerves for Prevention of Vagal Atrial Fibrillation," Circulation vol. 102, p. 2774-2780, 2000.
Tellez, Armando et al., "Renal Artery Nerve Distribution and Density in the Porcine Model: Biologic Implications for the Development of Radiofrequency Ablation Therapies," Translational Research vol. 162 No. 6, p. 381-389, Dec. 2013.
Ter Haar, G., "Ultrasound Focal Beam Surgery," Ultrasound in Med. & Biol., vol. 21, No. 9, p. 1089-1100, 1995.
Ter Haar, G.R. et al., "Ultrasonic Heating of Mammalian Tissues In vivo," Br. J. Cancer vol. 45, Supp. V., p. 65-67, 1982.
Ter Haar, Gail R. "Therapeutic and Surgical Applications," Physical Principles of Medical Ultrasonics, Second Edition, Edited by C.R. Hill, J.C. Bamber, and G.R. Ter Haar, p. 407-456, 2004.
Trippodo, Nick C. et al., "Similarities of Genetic (Spontaneous) Hypertension," Circulation Research vol. 48, No. 3, p. 309-319, Mar. 1981.
Urban, Bruce A. et al., "Three-dimensional vol. rendered CT Angiography of the Renal Arteries and Veins: Normal Anatomy, Variants, and Clinical Applications," RG vol. 21 No. 2, p. 373-386, Mar.-Apr. 2001.
Wang, Shyh-Hau et al., "Effects of Low Intensity Ultrasound on the Conduction Property of Neural Tissues," IEEE International Ultrasonics, Ferroelectrics, and Frequency Control Joint $50^{th}$ Anniversary Conference, p. 1824-1827, 2004.
Weld, Kyle J. et al., "Comparison of Cryoablation, Radiofrequency Ablation and High-Intensity Focused Ultrasound for Treating Small Renal Tumours" BJU International vol. 96, p. 1224-1229, 2005.
Wells, P.N.T., "Functional Modification: Clinical Applications," Biomedical Ultrasonics, p. 470-504, 1977.
Winternitz, Sherry R. et al., "Importance of the Renal Nerves in the Pathogenesis of Experimental Hypertension," Hypertension (supp. III), vol. 4, No. 5, p. III-08-III-115, Sep.-Oct. 1982.
Wulff, V.J. et al., "Effects of Ultrasonic Vibrations on Nerve Tissues," P.S.E.B.M., vol. 76, p. 361-366, 1951.
Yarmolenko, Pavel S. et al., "Thresholds for thermal damage to normal tissues: An update," Int. J. Hyperthermia, vol. 27 No. 4, p. 320-343, Jun. 2011.
Young, Robert R. et al., "Functional Effects of Focused Ultrasound on Mammalian Nerves," Science, vol. 134, p. 1521-1522, Nov. 1961.
Zimmer, J.E. et al., "The Feasibility of Using Ultrasound for Cardiac Ablation," IEEE Transactions on Biomedical Engineering, vol. 42, No. 9, p. 891-897, Sep. 1995.
Ahmed, Humera et al., Renal Sympathetic Denervation Using an Irrigated Radiofrequency Ablation Catheter for the Management of Drug-Resistant Hypertension, JACC Cardiovascular Interventions, vol. 5, No. 7, 758-765 (2012).
American Heart Association—Pulmonary Hypertension: High Blood Pressure in the Heart-to-Lung System, (last reviewed Oct. 31, 2016).
Appeal Brief of Patent Owner from Reexamination 95-002,110.

Aytac, et al., "Correlation Between the Diameter of the Main Renal Artery and the Presence of an Accessory Renal Artery", J Ultrasound Med 22:433-439, 2003.
Azizi, Michel et al., Ultrasound renal denervation for hypertension resistant to a triple medication pill (Radiance-HTN Trio): a randomised, multicentre, single-blind, sham-controlled trial, 397 Lancet 2476 (2021).
Bailey, M.R. et al., Physical Mechanisms of the Therapeutic Effect of Ultrasound (A Review), Acoustical Physics, vol. 49, No. 4, 2003, pp. 369-388.
Bengel, et al., Serial Assessment of Sympathetic Reinnervation After Orthotopic Heart Transplantation; A Longitudinal Study Using PET and C-11 Hydroxyephedrine, Circulation. 1999;99: 1866-1871.
Berjano, E. et al., "A Cooled Intraesophageal Balloom to Prevent Thermal Injury during Endocardial Surgical Radiofrequency Ablation of the left Atrium: a finite element study." Physics in Medicine and Biology, 50(20): 269-279, 2015.
Bhatt, D.L., et al., A Controlled Trial of Renal Denervation for Resistant Hypertension, New England J. Med., 370:1393-1401 (2014).
Bhatt, Deepak L. et al., Long-term outcomes after catheter-based renal artery denervation for resistant hypertension: final follow-up of the randomised Symplicity HTN-3 Trial, 400 Lancet 1405 (2022).
Billard, B.E. et al., Effects of Physical Parameters on High Temperature Ultrasound Hyperthermia, Ultrasound in Med. & Biol. vol. 16, No. 4, pp. 409-420, 1990.
Bisdas, Theodosios et al., Initial Experience with the 6-F and 8-F Indigo Thrombectomy System for Acute Renovisceral Occlusive Events, Journal of Endovascular Therapy, vol. 24, No. 4, 604-610 (2017).
Blanketjin, Peter, Sympathetic Hyperactivity in Chronic Kidney Disease, Neprhrol Dial Transplant, vol. 19, No. 6, 1354-1357 (2004).
Blum et al., Treatment of Ostial Renal-Artery Stenoses with Vascular Endoprostheses after Unsuccessful Balloon Angioplasty, N. Engl. J. Med. 336 459-65 (1997).
Bonsignore, C., "A Decade of Evolution in Stent Design", Proceedings of the International Conference on Shape Memory and Superelastic Technologies, (2003).
Bradfield, Jason S. et al., Renal denervation as adjunctive therapy to cardiac sympathetic denervation for ablation refractory ventricular tachycardia, Heart Rhythm Society, vol. 17, No. 2, 220-227 (2020).
Bush, et al., "Endovascular revascularization of renal artery stenosis: Technical and clinical results", Journal of Vascular Surgery, 2001, May, 1041-1049 (2001).
Camasao, D. B. et al., The mechanical characterization of blood vessels and their substitutes in the continuous quest for physiological-relevant performances: A critical review, Materials Today Bio, vol. 10 (2021).
Carter, Stefan et al., Measurement of Renal Artery Pressures by Catheterization in Patients with and without Renal Artery Stenosis, Circulation, vol. XXXIII, 443-449 (1966).
Chapelon, J.Y., "Treatment of Localised Prostate Cancer with Transrectal High Intensity Focused Ultrasound," European Journal of Ultrasound 9, 31-38, 1999.
Charlesworth, Peter et al., Renal Artery Injury from a Fogarty Balloon Catheter, Journal of Vascular Surgery, vol. 1, No. 4, 573-576 (1984).
Chart showing priority claims of the '629 patent, exhibit to Petition for Inter Partes Review of U.S. Pat. No. 8,845,629, filed Jan. 13, 2022 in the Patent Trial and Appeal Board, United States Patent and Trademark Office, Petition No. PTAB-IPR2022-00431.
Chiesa et al., Endovascular Stenting for the Nutcracker Phenomenon, J. Endovasc. Ther., 8:652-655 (2001).
Coates, Paul et al., "Time, Temperature, Power, and Impedance Considerations for Radiofrequency Catheter Renal Denervation," Cardiovascular Revascularization Medicine 42, 171-177 (2022).
Corrected Patent Owner's Response to Office Action, dated May 10, 2013, from File History of Inter Partes Reexamination 95/002,110.

(56) References Cited

OTHER PUBLICATIONS

Correspondence from PTAB Deputy Chief Clerk to Counsel re conference call request-Exhibit 3001 in the Patent Trial and Appeal Board, United States Patent and Trademark Office, Petition No. PTAB-IPR2022-00431.
Curriculum Vitae of Dr. Chris Daft.
Curriculum Vitae of Dr. John M. Moriarty.
Curriculum Vitae of Dr. Michael Bohm.
Curriculum Vitae of Farrell Mendelsohn.
Dangas, G., et al., Intravascular Ultrasound-Guided Renal Artery Stenting, J Endovasc Ther, 2001;8:238-247 (2001).
Deardorff, Dana et al., Ultrasound Applicators with Internal Water-Cooling for High-Powered Interstitial Thermal Therapy, IEEE Transactions on Biomedical Engineering, vol. 47, No. 10, 1356-1365 (2000).
Deardorff, Dana et al., Ultrasound Applicators with Internal Cooling for Interstitial Thermal Therapy, SPIE vol. 3594, 36-46, Jan. 1999.
Decision of the Patent Trial and Appeal Board in U.S. Appl. No. 14/731,347.
Declaration of Chris Daft dated Jan. 11, 2022, in the Patent Trial and Appeal Board, United States Patent and Trademark Office, Petition No. PTAB-IPR2022-00431.
Second Declaration of Chris Daft. Dated Jan. 10, 2023, in the Patent Trial and Appeal Board, United States Patent and Trademark Office, Petition No. PTAB-IPR2022-00431.
Declaration of Dr. Daniel van der Weide, dated Oct. 26, 2022, in the Patent Trial and Appeal Board, United States Patent and Trademark Office, Petition No. PTAB-IPR2022-00431.
Declaration of Dr. Dieter Haemmerich, dated Aug. 29, 2012, in the Patent Trial and Appeal Board, United States Patent and Trademark Office, In re U.S. Pat. No. 7,717,948.
Declaration of Dr. John M. Moriarty in German Nullity proceedings for EP2261905 dated Jul. 13, 2022.
Declaration of Dr. John Moriarty, dated Jan. 19, 2023, in the Patent Trial and Appeal Board, United States Patent and Trademark Office, Petition No. PTAB-IPR2022-00431.
Declaration of Jonathan Bradford in Support of Patent Owner's Response, dated Oct. 27, 2022.
Declaration of Jonathan Bradford dated May 10, 2022, in the Patent Trial and Appeal Board, United States Patent and Trademark Office, Petition No. PTAB-IPR2022-00431.
Declaration of Dr. Michael Bohm dated Sep. 29, 2022 on behalf of Medtronic Inc.
Declaration of Dr. Robert Tucker, dated Oct. 27, 2022, in the Patent Trial and Appeal Board, United States Patent and Trademark Office, Petition No. PTAB-IPR2022-00431.
Declaration of Farrell Mendelsohn dated Jan. 10, 2022, in the Patent Trial and Appeal Board, United States Patent and Trademark Office, Petition No. PTAB-IPR2022-00431.
Defendant's Reply to Court Order of Oct. 4, 2022 and Plaintiff's Surrejoinder of Sep. 29, 2022 in the Mannheim District Court, case No. 7 O 14/21, dated Oct. 31, 2022.
Defendant's Response dated May 11, 2022 in the Munich Federal Patent Court, Nullity Suit 6 Ni 32/22.
Dibona, Gerald F., "Neural Control of the Kidney, Past, Present and Future," 41 [Part II] Hypertension 621 24 (2003).
Dibona, Gerald, Sympathetic Nervous System and Kidney in Hypertension, Current Opinion in Nephrology and Hypertension, vol. 11, 197-200 (2002).
Dibona, Gerald F et al., "Neural Control of Renal Function", 77 Physiological Reviews No. 1, 75 (1997).
Diederich, et al., "Catheter-based Ultrasound Applicators for Selective Thermal Ablation: progress towards MRI-guided applications in prostate," International Journal of Hyperthermia, 20:7, 739-756.
Diederich, et al., "Transurethral Ultrasound Applicators with Directional Heating Patterns for Prostate Thermal Therapy: In vivo evaluation using magnetic resonance thermometry," Med. Phys. 31 (2), 405-413, Feb. 2004.
Diederich, et al., Ultrasound Catheters for Circumferential Cardiac Ablation, in Proceedings of SPIE Conference on Thermal Treatment of Tissue with Image Guidance San Jose, California, Jan. 1999 SPIE vol. 3594.
Draney, Mary et al., Three-Dimensional Analysis of Renal Artery Bending Motion During Respiration, International Society of Endovascular Specialists, vol. 12, 380-386 (2005).
Erikson, Kenneth et al., Ultrasound in Medicine: A Review, IEEE Transactions on Sonics and Ultrasonics, vol. 21, No. 3 (1974).
EP Board of Appeals Communication dated Dec. 17, 2019—Preliminary Remarks for EP appeal No. T2680/16-3.3.4.01.
European Search Report in Application No. 12180431.4 dated Jan. 17, 2013.
European Communication in Application No. 12180431.4 dated Oct. 23, 2013.
European Office Action in Application No. 12180431.4.
European Patent No. 12167931, Claims of the Main Request dated Sep. 30, 2016.
European Search Report (Supplementary) in Application No. 14775754.6 dated Feb. 17, 2016.
European Search Report in Application No. 218186547 dated Nov. 19, 2018.
European Search Report in Application No. 20202272.9 dated Mar. 1, 2021.
Fan, Xiaobing et al., "Control of the Necrosed Tissue Volume during Noninvasive Ultrasound Surgery using a 16-Element Phased Array," Department of Radiology, Brigham and Women's Hospital, Harvard Medical School, Oct. 31, 1994.
Fengler, Karl et al., A Three-Arm Randomized Trial of Different Renal Denervation Devices and Techniques in Patients with Resistant Hypertension (Radiosound-HTN), 139 Circulation 590 (2019).
File History to EP1802370B1 Part 1.
File History to EP1802370B1 Part 2.
File History to EP1802370B1 Part 3.
Foley, Jessica L., et al., "Image-Guided HIFU Neurolysis of Peripheral Nerves to Treat Spasticity and Pain," Ultrasound in Med & Biol., vol. 30, Np. 9 pp. 1199-1207, 2004.
Gallitto, Enrico et al., Renal Artery Orientation Influences the Renal Outcome in Endovascular Thoraco-abdominal Aortic Aneurysm Repair, European Society of Endovascular Surgery, vol. 56, No. 3, 382-390 (2018).
Gervais, Debra A. et al., Radiofrequency ablation of renal cell carcinoma: Part 2, Lessons learned with ablation of 100 tumors, 185 AJR Am. J. Roentgenol. 72 (2005).
Goldberg, S. Nahum et al., EUS-guided radiofrequency ablation in the pancreas: results in a porcine model, 50 Gastrointest. Endosc. 392 (1999).
Golwyn et al., Percutaneous Transcatheter Renal Ablation with Absolute Ethanol for Uncontrolled Hypertension or Nephrotic Syndrome: Results in 11 Patients with End-Stage Renal Disease, J. Vasco and Interventional Radiology, 8,527-433 (1997).
Gorsich, W., et. al., Heat-Induced Contraction of Blood Vessels, Lasers in Surgery and Medicine, 2:1-13 (1982).
Gray, Henry, Gray's Anatomy: The Anatomical Basis of Medicine and Surgery, Churchill Livingstone, New York, NY (1995).
Habict, Antje et al., Sympathetic Overactivity and Kidneys, The Middle Eastern Journal of Medicine, vol. 115, 634-640 (2003).
Hansen et al., The Transplanted Human Kidney Does Not Achieve Functional Reinnervation, 87 Clinical Science 13 (1994).
Harrison, R. R. et al., "A Low-Power Integrated Circuit for a Wireless 1 OD-Electrode Neural Recording System," IEEE Journal of Solid-State Circuits, vol. 42, No. 1, pp. 123-133, Jan. 2007. doi: 10.1 109/JSSC.2006.886567.
He, D. S. et al., Application of Ultrasound Energy for Intracardiac Ablation of Arrhythmias, European Heart Journal, vol. 16, 961-966 (1995).
Heffner, H. et al., "Gain, Band Width, and Noise Characteristics of the Variable-Parameter Amplifier," Journal of Applied Physics, vol. 29, No. 9, Sep. 1958, 1 1 pages.
Holmes, David R. et al., Pulmonary vein stenosis complicating ablation for atrial fibrillation: clinical spectrum and interventional considerations, 2 JACC Cardiovasc. Interv. 267 (2009).

(56) References Cited

OTHER PUBLICATIONS

Hsu, Thomas H. S. et al., Radiofrequency ablation of the kidney: acute and chronic histology in porcine model, 56 Urology 872 (2000).
Huang, S.K.S. and Wilbur, D. Eds, Radiofrequency Catheter Ablation of Cardiac Arrhythmias, Basic Concepts and Clinical Applications, Futura Publishing Company, Inc., Armonk, New York (2000).
Huang, et al., Renal Denervation Prevents and Reverses Hyperinsulinemia-Induced Hypertension in Rats, Hypertension 32 (1998) pp. 249-254.
Institution Decision Granting Institution of Inter Partes Review 35 U.S.C. sec. 314, dated Aug. 8, 2022 in the Patent Trial and Appeal Board, United States Patent and Trademark Office, Petition No. PTAB-IPR2022-00431.
Isles et al., Management of Renovascular Disease: A Review of Renal Artery Stenting in Ten Studies, QJM 92, 159-67 (1999).
Ivanisevic, N., "Circuit Design Techniques for Implantable Closed-Loop Neural Interfaces," Doctoral Thesis in Information and Communication Technology, KTH School of Electrical Engineering and Computer Science, Sweden, May 2019, 92 pages.
Janssen, B. J. A., et al. "Renal nerves in hypertension." Miner Electrolyte Metab., 15:74-82 (1989).
Janzen, Nicolette et al., Minimally Invasive Ablative Approaches in the Treatment of Renal Cell Carcinoma, Current Urology Reports, vol. 3 (2002).
Kaltenbach, Benjamin et al., Renal Artery Stenosis After Renal Sympathetic Denervation, Journal of the American College of Cardiology, vol. 60, No. 25 (2012).
Kapural, Leonardo, et al., "Radiofrequency Ablation for Chronic Pain Control," Anesthetic Techniques in Pain Management, pp. 517-525, 2001.
Katholi, R.E., et. al., Importance of Renal Sympathetic Tone in the Development of DOCA-Salt Hypertension in The Rat, Hypertension, 2:266-273 (1980).
Kim, Yun-Hyeon et al., Pulmonary vein diameter, cross-sectional area, and shape: CT analysis, Radiology Society of North America, vol. 235, No. 1, 49-50 (2005).
Kirsh, Danielle, Balloon Catheters: What are some key design considerations?, Massdevice (Dec. 6, 2016).
Kompanowska-Jezierska, Elzbieta et al., Early Effects of Renal Denervation in the Anaesthetized Rat: Natriuresis and Increased Cortical Blood Flow, 531 J. Physiology No. 2, 527 (2001).
Koomans, Hein et al., Sympathetic Hyperactivity in Chronic Renal Failure: A wake-up call, Frontiers in Nephrology, vol. 15, 524-537 (2004).
Kuo, et al., "Atrial Fibrillation: New Horizons", Chang Gung Med J vol. 26 No. Oct. 10, 2003.
Lang, Roberto et al., Recommendations for Chamber Quantification: A Report from the American Society of Echocardiography's Guidelines and Standards Committee and the Chamber Quantification Writing Group, Developed in Conjunction with the European Association of Echocardiography, a Branch of the European Society of Cardiology, Journal of the American Society of Echocardiography, vol. 18, No. 12, 1440-1463 (2005).
Lee, Jong Deok et al., MR imaging-histopathologic correlation of radiofrequency thermal ablation lesion in a rabbit liver model: observation during acute and chronic stages, 2 Korean J. Radiol. 151 (2001).
Levin, S., et al., ARDIAN: Succeeding Where Drugs Fail—Treating Hypertension in the Cath Lab, In Vivo, 27:23 (2009).
Mahfoud, Felix et al., Catheter-Based Renal Denervation Is No Simple Matter: Lessons to Be Learned From Our Anatomy?, Journal of the American College of Cardiology, vol. 64, No. 7, 644-647 (2014).
Marine, Joseph E., Catheter ablation therapy for supraventricular arrhythmias, 298 JAMA 2768 (2007).
Martin, Louis G. et al., Long-term Results of Angioplasty in 110 Patients with Renal Artery Stenosis, Journal of Vascular and Interventional Radiology, vol. 3, No. 4, 619-626 (1992).

Maslov, P., "Recruitment Pattern of Muscle Sympathetic Nerve Activity in Chronic Stable Heart Failure Patients and in Healthy Control Subjects," Doctoral Dissertation, University of Split, Croatia, 2013, 69 pages.
Matsumoto, Edward D. et al., Short-term efficacy of temperature-based radiofrequency ablation of small renal tumors, 65 Urology 877 (2005).
Medtronic Press Release, Medtronic Announces U.S. Renal Denervation Pivotal Trial Fails to Meet Primary Efficacy Endpoint While Meeting Primary Safety Endpoint (Jan. 9, 2014).
Medtronic Inc., Renal Denervation (RDN): Novel Catheter-Based Treatment for Hypertension, Scientific Background, 2011.
Medtronic Scientific Background, Hypertension and the Symplicity Renal Denervation System.
Medtronic, Symplicity RDN Common System Q&A.
Medtronic Inc., The Symplicity RDN System, 2012.
Meyers, Philip et al., Temporary Endovascular Balloon Occlusion of the Internal Carotid Artery with a Nondetachable Silicone Balloon Catheter: Analysis Technique and Cost, American Journal of Neuroradiology, vol. 20, No. 4, 559-564 (1999).
Millard, et al., Renal Embolization for Ablation of Function In Renal Failure And Hypertension, Postgraduate Med. J. 65, 729-734 (1989).
Mitchell, et al., "The Renal Nerves" British Journal of Urology, Read by invitation at the Sixth Annual Meeting of the British Association of Urological Surgeons on Jun. 30, 1950.
Morrissey, D. M. "Sympathectomy in the treatment of hypertension." Lancet, CCLXIV:403-408 (1953).
Nair et al., "The Need for and the Challenges of Measuring Renal Sympathetic Nerve Activity," Heart Rhythm 2016; 13:1166-1171.
Natale, Andrea et al., First Human Experience with Pulmonary Vein Isolation Using a Through-the-Balloon Circumferential Ultrasound Ablation System for Recurrent Atrial Fibrillation, Circulation, vol. 102, 1879-1882 (2000).
Netter, Frank, Atlas of Human Anatomy, Icon Learning Systems, Rochester, NY (2002).
Neumann, Jutta, Sympathetic hyperactivity in chronic kidney disease: Pathogenesis, clinical relevance, and treatment, International Society of Nephrology, vol. 65, 1568-1576 (2004).
News, Columbia University Irving Medical Center, Zapping Nerves with Ultrasound Lowers Drug-Resistant Blood Pressure (May 16, 2021), https://www.cuimc.columbia.edu/news/zapping-nervesultrasound-lowers-drug-resistant-blood-pressure.
Notice of Deposition of Tucker, filed Dec. 30, 2022 in the Patent Trial and Appeal Board, United States Patent and Trademark Office, Petition No. PTAB-IPR2022-00431.
Notice of Deposition of van der Weide, filed Dec. 30, 2022 in the Patent Trial and Appeal Board, United States Patent and Trademark Office, Petition No. PTAB-IPR2022-00431.
Notice re filing date accorded, dated Feb. 10, 2022 in the Patent Trial and Appeal Board, United States Patent and Trademark Office, Petition No. PTAB-IPR2022-00431.
Nozawa, T., et al. "Effects of long-term renal sympathetic denervation on heart failure after myocardial infarction in rats." Heart Vessels, 16:51-56 (2002).
Oliveira, Vera L. et al., "Renal Denervation Normalizes Pressure and Baroreceptor Reflex in High Renin Hypertension in Conscious Rats", 19 Hypertension Suppl. II No. 2, 17 (1992) ("Oliveira 1992").
Olsson, R. et al., "A Three-Dimensional Neural Recording Microsystem with Implantable Data Compression 5 Circuitry," ISSCC. 2005 IEEE International Digest of Technical Papers. Solid-State Circuits Conference, 2005., San Francisco, CA, 2005, pp. 558-559 vol. 1 doi:10.1109/JSSC.2005.858479.
Order: Conduct of the Proceeding Scheduling Order 37 C.F.R. sec. 42.5, dated Aug. 8, 2022 in the Patent Trial and Appeal Board, United States Patent and Trademark Office, Petition No. PTAB-IPR2022-00431.
Order Setting Oral Hearing 37 C.F.R. § 42.70, dated Mar. 24, 2023 in the Patent Trial and Appeal Board, United States Patent and Trademark Office, Petition No. PTAB-IPR2022-00431.
Osborn, J., "Catheter-Based Renal Nerve Ablation as a Novel Hypertension Therapy, Lost, and Then Found," in Translation.

(56) References Cited

OTHER PUBLICATIONS

Page, Irvine H. & George J. Heuer, The Effect of Renal Denervation on the Level of Arterial Blood Pressure and Renal Function in Essential Hypertension, 14 J. Clinical Investigation 27 (1935) (received for publication in 1934).
Page, Irvine H. & George J. Heuer, The Effect of Renal Denervation on Patients Suffering from Nephritis, 14 J. Clinical Investigation 443 (1935).
Papademetriou, Vasilios et al., Renal Sympathetic Denervation for the Treatment of Difficult-to-Control or Resistant Hypertension, 2011 Int. J. Hypertension, Article 196518 (2011).
Papadopoulos, N., "Evaluation of a Small Flat Rectangular Therapeutic Ultrasonic Transducer Intended for Intravascular Use," Ultrasonics 74, 196-203, 2017.
Pappone C, et al., "Circumferential radiofrequency ablation of pulmonary vein ostia: a new anatomic approach for curing atrial fibrillation", Circulation. 2000; 102(21): 2619-2628. (2000).
Patent Owner's Amended Objections to Evidence Under 37 C.F.R. §42.64.
Patent Owner's Mandatory Notice, filed Feb. 3, 2022 in the Patent Trial and Appeal Board, United States Patent and Trademark Office, Petition No. PTAB-IPR2022-00431.
Patent Owner's Notice of Deposition of Dr. Chris Daft, filed Sep. 20, 2022 in the Patent Trial and Appeal Board, United States Patent and Trademark Office, Petition No. PTAB-IPR2022-00431.
Patent Owner's Notice of Deposition of Dr. Chris Daft filed Feb. 21, 2023 in the Patent Trial and Appeal Board, United States Patent and Trademark Office, Petition No. PTAB-IPR2022-00431.
Patent Owner's Notice of Deposition of Dr. Farrell Mendelsohn, filed Sep. 21, 2022 in the Patent Trial and Appeal Board, United States Patent and Trademark Office, Petition No. PTAB-IPR2022-00431.
Patent Owner's Notice of Deposition of Dr. John Moriarty, filed Feb. 21, 2023 in the Patent Trial and Appeal Board, United States Patent and Trademark Office, Petition No. PTAB-IPR2022-00431.
Patent Owner's Objections to Evidence, filed Aug. 18, 2022 in the Patent Trial and Appeal Board, United States Patent and Trademark Office, Petition No. PTAB-IPR2022-00431.
Patent Owner's Power of Attorney, filed Feb. 3, 2022 in the Patent Trial and Appeal Board, United States Patent and Trademark Office, Petition No. PTAB-IPR2022-00431.
Patent Owner Medtronic Ireland Power of Attorney, filed May 10, 2022 in the Patent Trial and Appeal Board, United States Patent and Trademark Office, Petition No. PTAB-IPR2022-00431.
Patent Owner's Preliminary Response, filed May 10, 2022 in the Patent Trial and Appeal Board, United States Patent and Trademark Office, Petition No. PTAB-IPR2022-00431.
Patent Owner's Request for Oral Hearing, filed Mar. 23, 2023 in the Patent Trial and Appeal Board, United States Patent and Trademark Office, Petition No. PTAB-IPR2022-00431.
Patent Owner's Response, filed Oct. 27, 2022 in the Patent Trial and Appeal Board, United States Patent and Trademark Office, Petition No. PTAB-IPR2022-00431.
Patent Owner's Sur-Reply, filed Mar. 9, 2023 in the Patent Trial and Appeal Board, United States Patent and Trademark Office, Petition No. PTAB-IPR2022-00431.
Patent Owner's Updated Mandatory Notice, filed May 10, 2022 in the Patent Trial and Appeal Board, United States Patent and Trademark Office, Petition No. PTAB-IPR2022-00431.
Peet, M.M., Hypertension and Its Surgical Treatment by Bilateral Supradiaphragmatic Splanchnicectomy, Am. J. Surgery, LXXV:48-68 (1948).
Petition for Inter Partes Review of U.S. Pat. No. 8,845,629, dated Jan. 13, 2022 by ReCor Medical, Inc. and Otsuka Medical Devices Co., Ltd., in the Patent Trial and Appeal Board, United States Patent and Trademark Office, Petition No. PTAB-IPR2022-00431.
Petitioner ReCor's Biography of Dr. Neil C. Barman.
Petitioner's Power of Attorney for Otsuka Medical Devices Co., Ltd., filed Jan. 13, 2022 in the Patent Trial and Appeal Board, United States Patent and Trademark Office, Petition No. PTAB-IPR2022-00431.
Petitioner's Power of Attorney for Recor Medical, Inc., filed Jan. 13, 2022 in the Patent Trial and Appeal Board, United States Patent and Trademark Office, Petition No. PTAB-IPR2022-00431.
Petitioner Reply, filed Jan. 23, 2023 in the Patent Trial and Appeal Board, United States Patent and Trademark Office, Petition No. PTAB-IPR2022-00431.
Petitioners' Request for Oral Argument, filed Mar. 21, 2023 in the Patent Trial and Appeal Board, United States Patent and Trademark Office, Petition No. PTAB-IPR2022-00431.
Petitioners' Updated Mandatory Notices, dated Jan. 18, 2022 in the Patent Trial and Appeal Board, United States Patent and Trademark Office, Petition No. PTAB-IPR2022-00431.
Plaintiff's Nullity Brief, dated Jan. 14, 2022, in the Munich Federal Patent Court, Nullity Suit 6 Ni 32/22.
Plaintiff's Reply to the May 11, 2022 Response, dated Jul. 18, 2022, in the Munich Federal Patent Court, Nullity Suit 6 Ni 32/22.
Plaintiff's Response to Court Order disagreeing with Stay of Proceedings dated Oct. 28, 2022 in Mannheim District Court, Infringement suit 7 O 147/21.
Plaintiff's Technical Brief dated Sep. 29, 2022 in the Mannheim District Court, Infringement suit 7 O 147/21.
Plouin et al., Blood Pressure Outcome of Angioplasty in Atherosclerotic Renal Artery Stenosis: A Randomized Trial. Essai Multicentrique Medicaments vs Angioplastie (EMMA) Study Group, Hypertension 31, 823-29 (1998).
Prakash, Punit, et al., "Considerations for Theoretical Modeling of Thermal Ablation with Catheter-Based Ultrasonic Sources: Implications for Treatment Planning, Monitoring and Control," International Journal of Hyperthermia, 28:1, 69-86.
Prochnau, Dirk et al., Catheter-based renal denervation for drug-resistant hypertension by using a standard electrophysiology catheter, EuroIntervention, vol. 7, 1077-1080 (2012).
Pugsley, et al., The vascular system: An overview of structure and function, Journal of Pharmacological and Toxicological Methods 44 (2000) 333-340.
Pürerfellner, Helmut et al., Incidence, Management and Outcome in Significant Pulmonary Vein Stenosis Complicating Ablation for Atrial Fibrillation, 93 Am. J. Cardiol. 1428 (2004).
Pürerfellner, Helmut & Martinek, Martin, Pulmonary vein stenosis following catheter ablation of atrial fibrillation, 20 Curr. Opin. Cardiol. 484 (2005).
Reaz, M.B.I., et al., "Techniques of EMG signal analysis: detection, processing, classification and applications," Biological Procedures Online, Jan. 2006, 25 pages.
Reddy, Vivek Y., "Use of a Diode Laser Balloon Ablation Catheter to Generate Circumferential Pulmonary Venous Lesions in an Open-Thoracotomy Caprine Model," Pace, vol. 27, 52-57, Jan. 2004.
Romanes, G.J., Cunningham's Textbook of Anatomy (11th ed. 1972).
Ryan, Steve, What are the Risks Associated with a Pulmonary Vein Ablation Procedure?, Atrial Fibrillation: Resources for Patients (last accessed Oct. 18, 2022).
Ryan, Thomas et al., Proceedings of Thermal Treatment of Tissue with Image Guidance, Progress in Biomedical Optics, vol. 3594 (1999).
Ryan, Thomas P., Thermal Treatment of Tissue with Image Guidance; Ultrasound Catheters For Circumferential Cardiac Ablation 1999.
Sakakura, Kenichi et al., Anatomic Assessment of Sympathetic Peri-Arterial Renal Nerves in Man, Journal of the American College of Cardiology, vol. 64, No. 7, 635-643 (2014).
Sánchez-Quintana, Damian et al., How close are the phrenic nerves to cardiac structures? Implications for cardiac interventionalists, 16 J. Cardiovasc. Electrophysiol 309 (2005) ("Sánchez-Quintana").
Sato, Yu, et al., "Translational Value of Preclinical Models for Renal Denervation: a histological comparison of human versus porcine renal nerve anatomy," EuroIntervention, 18, e1120-e1128, 2023.

(56) References Cited

OTHER PUBLICATIONS

Schmieder, Ronald E., Renal denervation in patients with chronic kidney disease: current evidence and future perspectives, Nephrol. Dial. Transplant. gfac189 (2022).
Schneider, Peter, Endovascular Skills: Guidewire and Catheter Skills for Endovascular Surgery, 2nd ed., Marcel Dekker, Inc., New York, NY (2003).
Schneider, Peter A., Endovascular Skills, Quality Medical Publishing, Inc., 1998 ("Schneider").
Schmidt, Boris, et al., "Pulmonary Vein Isolation by High Intensity Focused Ultrasound," Indian Pacing and Electrophysiology Journal, pp. 126-133 (2006).
Selected documents from the File History of Inter Partes Reexamination 95/002,110, exhibit to Petition for Inter Partes Review of U.S. Pat. No. 8,845,629, filed Jan. 13, 2022 in the Patent Trial and Appeal Board, United States Patent and Trademark Office, Petition No. PTAB-IPR2022-00431.
Shimizu, Kazumasa et al., Sympathetic Dysfunction in Heart Failure, Bailliere's Clinical Endocrinology and Metabolism, vol. 7, No. 2 (1993).
Shonai et al., Renal Artery Aneurysm: Evaluation with Color Doppler Ultrasonography Before and lifter Percutaneous Transarterial Embolization, J. Ultrasound Med. 19, 277-80 (2000)("Shonai 2000").
Slide deck from Medtronic Circulatory System Devices Panel Meeting, General Issues Panel: Clinical Evaluation of Anti-Hyperintensive Devices (Dec. 5, 2018).
Smithwick, R. H., et al., "Splanchnicectomy for essential hypertension." J. Am. Med. Assoc., 152:1501-1504 (1953).
Stella, A., et al. "Effects of reversible renal denervation on haemodynamic and excretory functions of the ipsilateral and contralateral kidney in the cat." J Hypertension, 4: 181-188 (1986)("Stella").
Stipulation Modifying Schedule, dated Dec. 30, 2022 in the Patent Trial and Appeal Board, United States Patent and Trademark Office, Petition No. PTAB-IPR2022-00431.
Stipulation Modifying Schedule, dated Feb. 16, 2023 in the Patent Trial and Appeal Board, United States Patent and Trademark Office, Petition No. PTAB-IPR2022-00431.
Stoeckel, D. et al., A Survey of Stent Designs, Min Invas Ther & Allied Technol 2002: 11(4) 137-147 (2002).
Swartz, John F. et al., Radiofrequency Endocardial Catheter Ablation of Accessory Atrioventricular Pathway Atrial Insertion Sites, 87 Circulation 487 (1993).
Tank, J. et al., "Spike Rate of Multi-Unit Muscle Sympathetic Nerve Fibers Following Catheter-Based Renal Nerve Ablation," J Am. Soc Hypertens, Oct. 2015; 9(10): 794-801. doi:10.1016/j.jash.2015.07.012.
Tanaka, Kazushi et al., "A New Radiofrequency Thermal Balloon Catheter for Pulmonary Vein Isolation," Journal of the American College of Cardiology vol. 38, No. 7, 2001.
Teigen et al., Segmental Renal Artery Embolization for Treatment of Pediatric Renovascular Hypertension, J. Vasco Interv. Radiol. 3, 111-7 (1992).
Thatipelli, Mallik R., et al., CT angiography of renal artery anatomy for evaluating embolic protection devices, 18 J. Vasc. Interv. Radiol. 842 (2007).
The Doctors and Experts at WebMD, Webster's New World Medical Dictionary (3rd ed. 2008) ("WebsterMD").
Transcript of the Mar. 2, 2023 deposition of Dr. John Moriarty.
Transcript of the Mar. 3, 2023 deposition of Dr. Chris Daft.
Transcript of deposition of the Jan. 1, 2023 deposition of Dr. Robert Tucker.
Transcript of the Jan. 14, 2023 deposition of Dr. Daniel van der Weide.
Transcript of the Sep. 30, 2022 deposition of Dr. Chris Daft.
Transcript of the Oct. 1, 2022 deposition of Dr. Farrell Mendelsohn.
Tsao, Hsuan-Ming et al., Evaluation of Pulmonary Vein Stenosis after Catheter Ablation of Atrial Fibrillation, 6 Card. Electrophysiol. Rev. 397 (2002).
Turner, et al., "Initial Experience Using the Palmaz Corinthian Stent for Right Ventricular Outflow Obstruction in Infants and Small Children", Catheterization and Cardiovascular Interventions 51:444-449 (2000).
Uchida, et al., "Effect of radiofrequency catheter ablation on parasympathetic denervation: A comparison of three different ablation sites." Pace, 21 :2517-2521 (1998).
Ulmsten, Ulf et al., "The Safety and Efficacy of MenoTreatTM, a new balloon device for thermal endometrial ablation," Acta Obstet Gynecol Scand 2001; 80: 52-57.
Vaezy, Shahram et al., Image-Guided Acoustic Therapy, Annual Review Biomedical Engineering, vol. 3, 375-390 (2001).
Valente, John F. et al., Laparoscopic renal denervation for intractable ADPKD-related pain, 16 Nephrol. Dial. Transplant. 160 (2001).
Vujaskovic, Z. et al., (1994) Effects of intraoperative hyperthermia on canine sciatic nerve: histopathologic and morphometric studies, International Journal of Hyperthermia, 10:6, 845-855 (1994) ("Vujaskovic 1994").
Wanchoo, Nishey, Medtronic Gets European and Australian Approval for Symplicity Spyral Multi-Electrode Renal Denervation Catheter, Medgadget (2013).
Weinstock, Marta et al., "Renal Denervation Prevents Sodium Retention and Hypertension in Salt-Sensitive Rabbits with Genetic Baroreflex Impairment", 90 Clinical Science 287 (1996).
Xu, J. et al, "A Bidirectional Neuromodulation Technology for Nerve Recording and Stimulation, Micromachines," vol. 9, 1 1 538. Oct. 23, 2018. doi:10.3390/mi9110538.
Zazgornik, "Bilateral Nephrectomy: The best, but often overlooked, treatment for refractory hypertension in hemodialysis patients," Am. J. Hypertension, 11:1364-1370 (1998).
Ziegler et al., Sources of Urinary Catecholamines in Renal Denervated Transplant Recipients, 8 J. Hypertension No. 10, 927 (1990).
U.S. Appl. No. 17/453,636, filed Nov. 4, 2021, File History.
U.S. Appl. No. 10/408,665, File History.
U.S. Appl. No. 60/624,793, File History.
U.S. Appl. No. 60/370,190, File History.
U.S. Appl. No. 60/415,575, File History.
U.S. Appl. No. 60/442,970, File History.
U.S. Appl. No. 60/616,254, File History.
U.S. Appl. No. 60/747,137, File History.
U.S. Appl. No. 60/808,306, File History.
U.S. Appl. No. 60/816,999, File History.
U.S. Appl. No. 61/405,472, File History.
U.S. Appl. No. 11/532,814, Non-Final Office Action mailed Mar. 29, 2012.
U.S. Appl. No. 15/261,732, Notice of Allowance dated Sep. 25, 2018.
U.S. Appl. No. 16/219,874, Final Office Action mailed Dec. 21, 2020, 7 pages.
U.S. Appl. No. 16/517,180, Preliminary Amendment filed Jul. 19, 19, 12 pgs.
File History of U.S. Appl. No. 12/754,337.
File History to U.S. Pat. No. 9,943,666.
File History to U.S. Pat. No. 9,981, 108.
File History to U.S. Pat. No. 10,039,901.
Final Office Action dated Feb. 19, 2021, U.S. Appl. No. 15/996,978, filed Jun. 4, 2018.
Final Office Action dated Jun. 16, 2021, U.S. Appl. No. 15/996,978, filed Jun. 4, 2018.
Non-Final Office Action dated Sep. 2, 2021, U.S. Appl. No. 15/996,978, filed Jun. 4, 2018.
Notice of Allowance dated Oct. 6, 2021, U.S. Appl. No. 15/996,978, filed Jun. 4, 2018.
Response to Office Action dated May 18, 2021, U.S. Appl. No. 15/996,978, filed Jun. 4, 2018.
Response to Office Action dated Jul. 20, 2021, U.S. Appl. No. 15/996,978, filed Jun. 4, 2018.
Response to Office Action dated Sep. 22, 2021, U.S. Appl. No. 15/996,978, filed Jun. 4, 2018.

\* cited by examiner

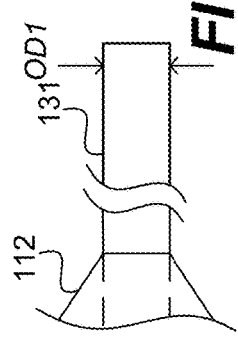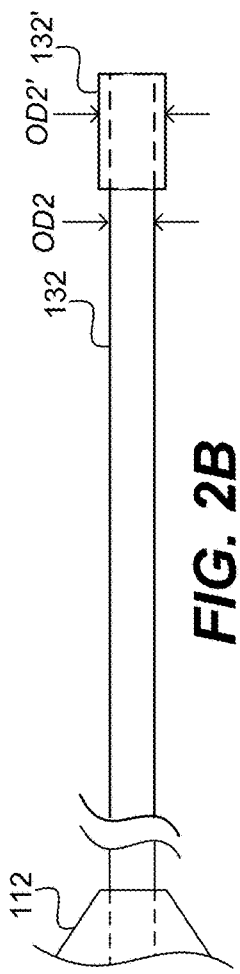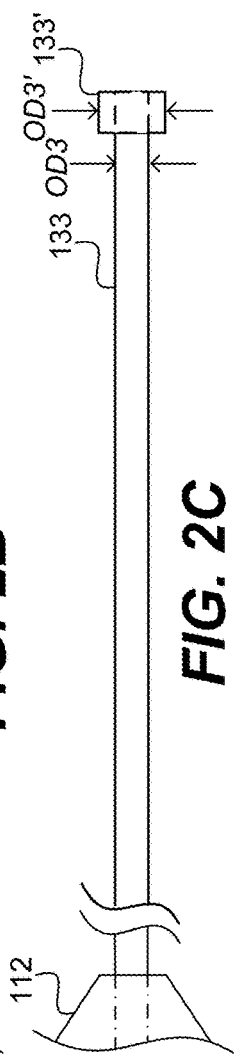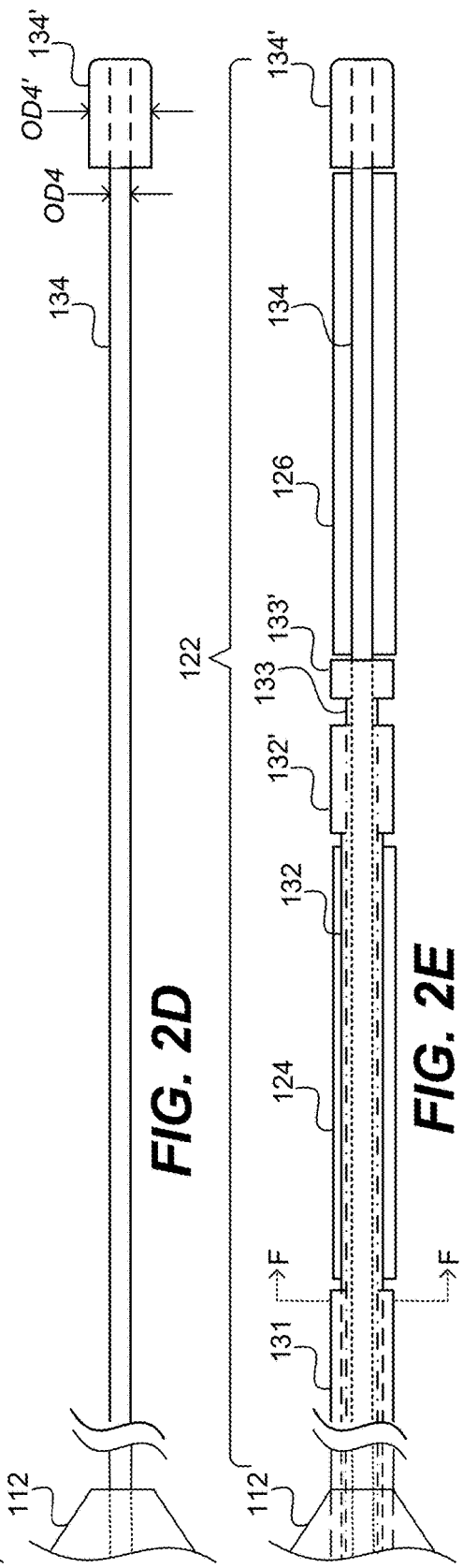
FIG. 2A  FIG. 2B  FIG. 2C  FIG. 2D  FIG. 2E

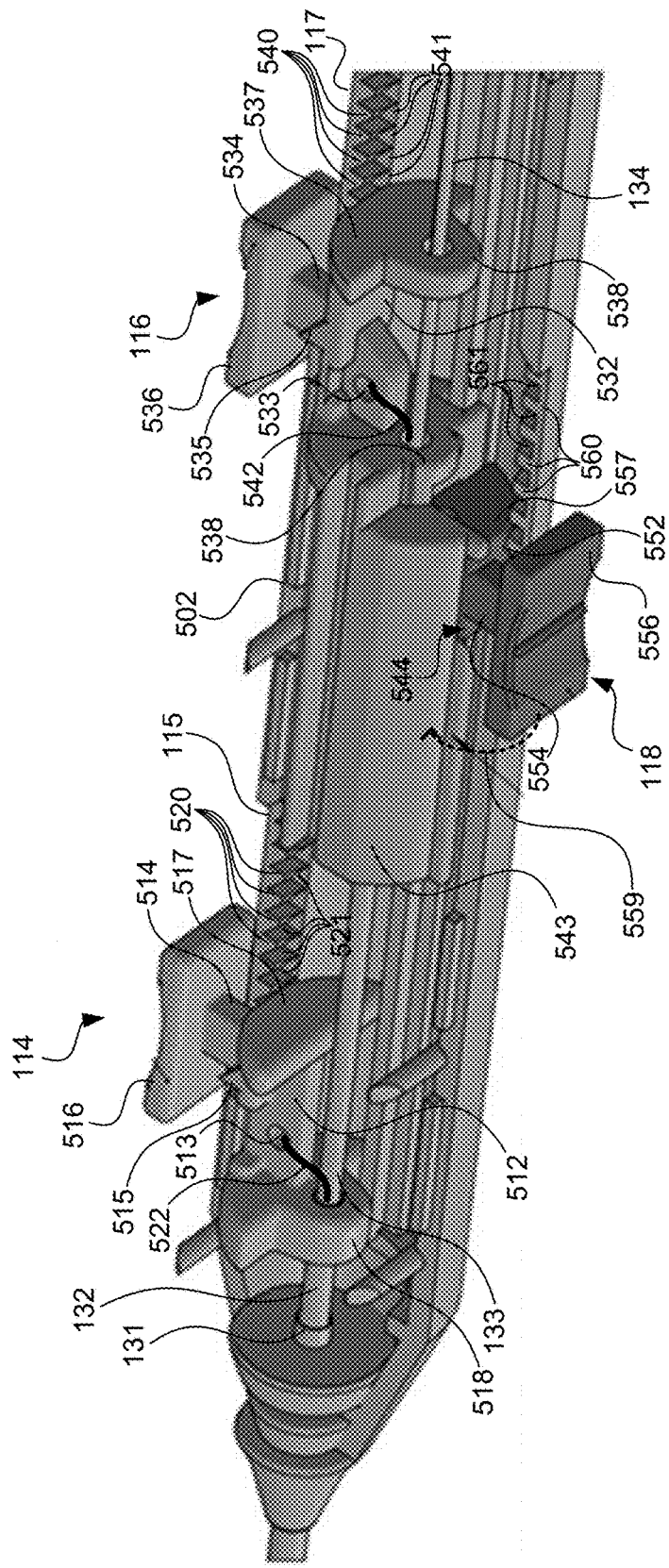
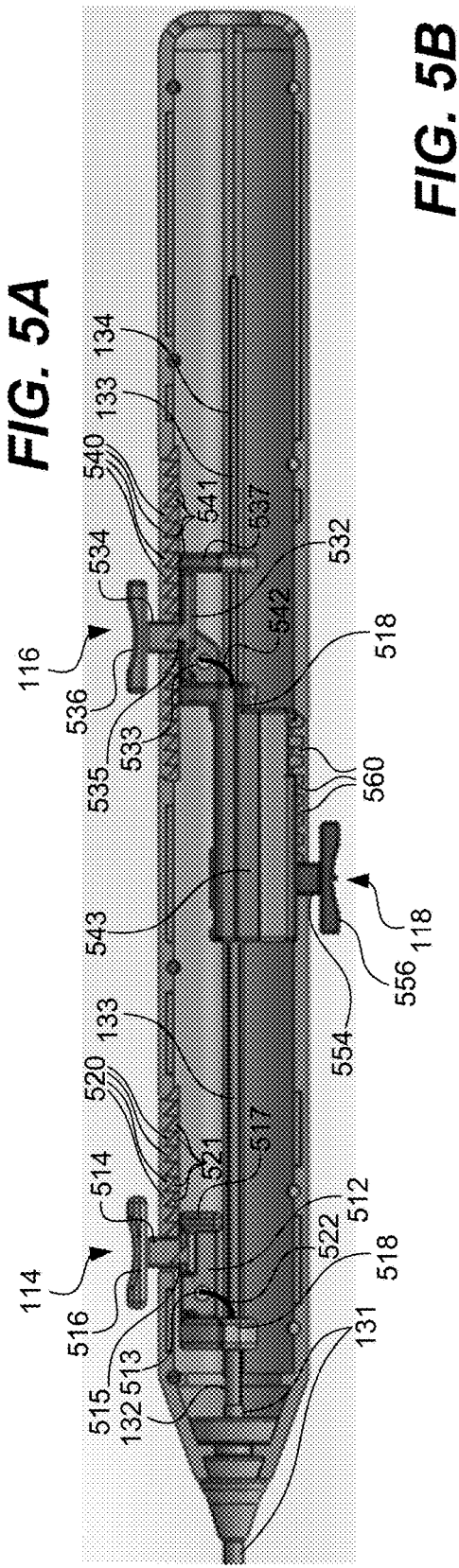
FIG. 5A
FIG. 5B

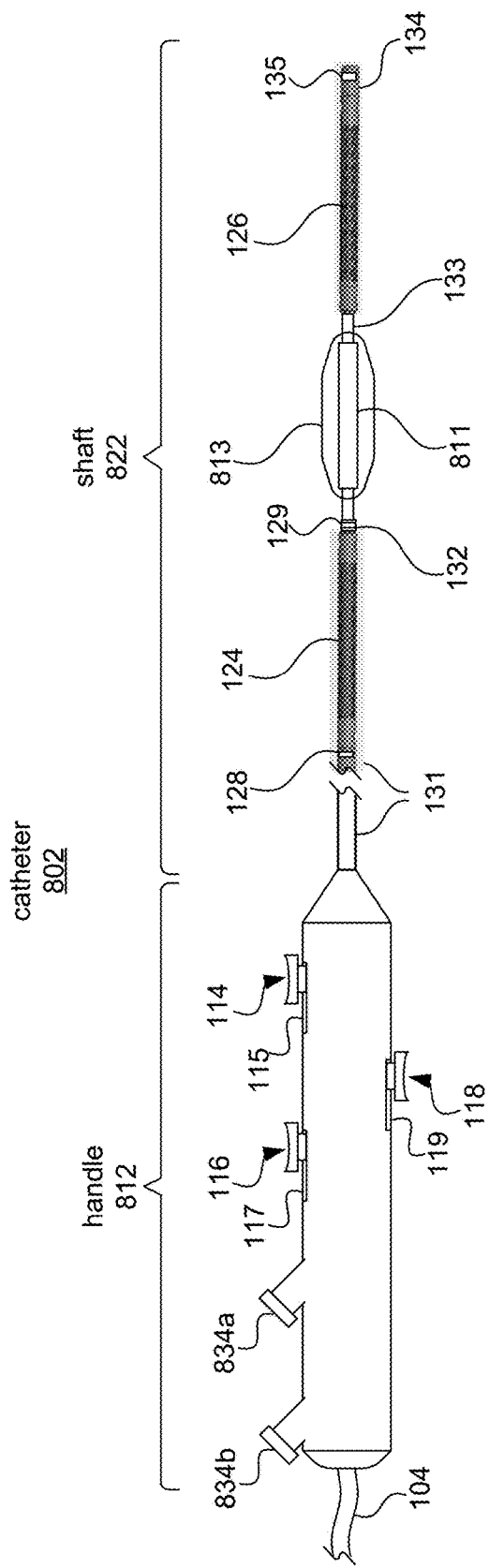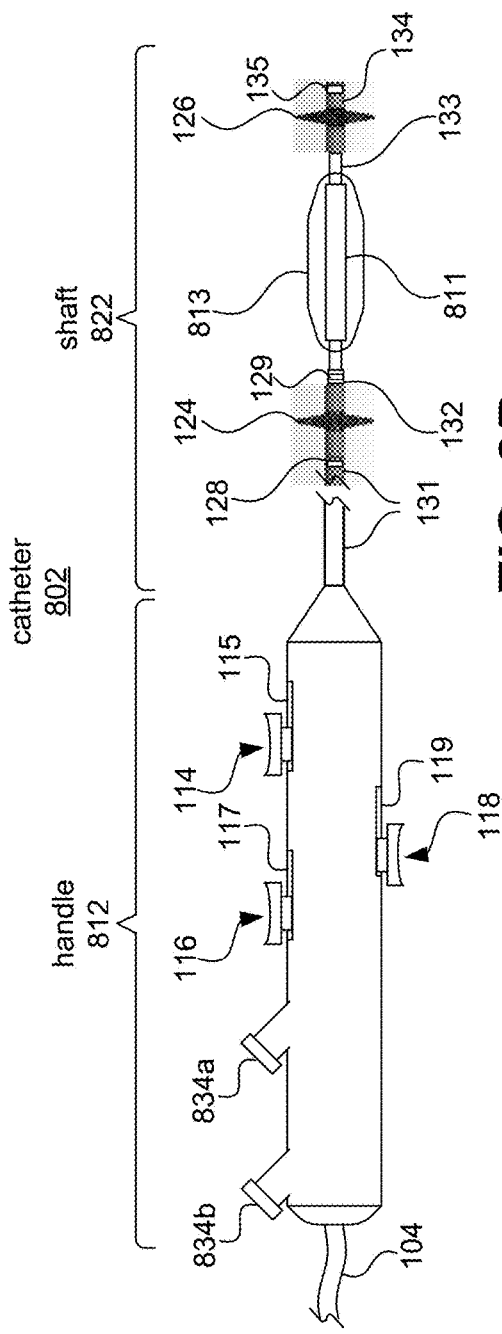

CATHETER FOR NEURAL MEASUREMENTS AND TREATMENT AND RELATED SYSTEMS AND METHODS

PRIORITY CLAIM

This application claims priority to each of the following U.S. Provisional Patent Applications, each of which is titled CATHETERS FOR NEURAL MEASUREMENTS AND RELATED SYSTEMS AND METHODS, and each of which is incorporated herein by reference: U.S. Provisional Patent Application No. 63/357,840, filed Jul. 1, 2022; U.S. Provisional Patent Application No. 63/263,000, filed Oct. 25, 2021; and U.S. Provisional Patent Application No. 63/226,622, filed Jul. 28, 2021.

FIELD

Embodiments of the present technology generally related to catheters (also known as probes) configured to be inserted into a biological lumen (e.g., a renal artery) and used for obtaining neural measurements, and related systems, electronic control units, and methods.

BACKGROUND

The human body's nervous system includes both the somatic nervous system that provides sense of the environment (vision, skin sensation, etc.) and regulation of the skeletal muscles, and is largely under voluntary control, and the autonomic nervous system, which serves mainly to regulate the activity of the internal organs and adapt them to the body's current needs, and which is largely not under voluntary control. The autonomic nervous system involves both afferent or sensory nerve fibers that can mechanically and chemically sense the state of an organ, and efferent fibers that convey the central nervous system's response (sometimes called a reflex arc) to the sensed state information. In some cases, the somatic nervous system is also influenced, such as to cause vomiting or coughing in response to a sensed condition.

Regulation of the human body's organs can therefore be somewhat characterized and controlled by monitoring and affecting the nerve reflex arc that causes organ activity. For example, the renal nerves leading to a kidney can often cause a greater reflexive reaction than desired, contributing significantly to hypertension. Measurement of the nerve activity near the kidney, and subsequent ablation of some (but not all) of the nerves can therefore be used to control the nervous system's overstimulation of the kidney, improving operation of the kidney and the body as a whole.

Because proper operation of the nervous system is therefore an important part of proper organ function, it is desired to be able to monitor and change nervous system function in the human body to characterize and correct nervous system regulation of internal human organs.

New medical therapies have been practiced whereby a probe such as a needle, catheter, wire, etc. is inserted into the body to a specified anatomical location and destructive means are conveyed to nerves by means of the probe to irreversibly damage tissue in the nearby regions. The objective is to modulate (e.g., abolish) nerve function in the specified anatomic location. The result is that abnormally functioning physiological processes can be terminated or modulated back into a normal range. Unfortunately, such medical therapies are not always successful and there is no means to assess that the nervous activity has been successfully abolished. An alternative objective can be to increase a physiologic process or modulate it to an abnormal range.

An example is renal nerve ablation to relieve hypertension. Various studies have confirmed the relationship of renal nerve activity with blood pressure regulation. In various renal ablation procedures, a catheter is introduced into a hypertensive patient's arterial vascular system and advanced into the renal artery. Renal nerves are located in the arterial wall and/or in regions adjacent to the artery. Destructive means are delivered proximate to the renal artery wall to an extent intended to cause destruction of nerve activity. Destructive means include energy such as radio frequency (RF), microwave, cryotherapy, ultrasound, laser or chemical agents. The objective is to abolish the renal nerve activity. Such nerve activity is an important factor in the creation and/or maintenance of hypertension and abolishment of the nerve activity reduces blood pressure and/or medication burden in hypertensive patients.

Unfortunately, not all patients respond to this therapy. Renal nerve ablation procedures are often ineffective, potentially due to a poor probe/tissue interface. Accordingly, insufficient quantities of destructive means are delivered to the nerve fibers transmitting along the renal artery. One reason is that the delivery of destructive means to the arterial wall does not have a feedback mechanism to assess the destruction of the nerve activity. As a consequence, an insufficient quantity of destructive means is delivered and nervous activity is not abolished. Clinicians, therefore, require a means of improving the probe/tissue interface or better targeting of nerves, and a technology to monitor the integrity of the nerve fibers passing through the arterial wall in order to confirm destruction of nerve activity prior to terminating therapy. Current technology for the destruction of nerve activity does not provide practitioners with a feedback mechanism to detect when the desired nervous activity destruction is accomplished. Nerve destructive means are applied empirically without knowledge that the desired effect has been achieved.

It is known that ablation of the renal nerves, with sufficient energy, is able to affect a reduction in both systolic and diastolic blood pressure. Current methods are said to be, from an engineering perspective, open-loop; i.e., the methods used to affect renal denervation do not employ any way of measuring, in an acute clinical setting, the results of applied ablation energies. It is only after application of such energies and a period of time (3-12 months) that the effects of the procedure are known.

The two major components of the autonomic nervous system (ANS) are the sympathetic and the parasympathetic nerves. The standard means for monitoring autonomic nerve activity in situations such as described is to insert very small electrodes into the nerve body or adjacent to it. The nerve activity creates an electrical signal in the electrodes which is communicated to a monitoring means such that a clinician can assess nerve activity. This practice is called microneurography and its practical application is by inserting the electrodes transcutaneously to the desired anatomical location. This is not possible in the case of the ablation of many autonomic nerves proximate to arteries, such as the renal artery, because the arteries and nerves are located within the abdomen and cannot be accessed transcutaneously with any reliability. Thus, the autonomic nerve activity cannot be assessed in a practical or efficacious manner.

The autonomic nervous system is responsible for regulating the physiological processes of circulation, digestion, metabolism, hormonal function, immune function, reproduction, and respiration, among others. The sympathetic nerves and parasympathetic nerves most often accompany the blood vessels supplying the body organs which they regulate. Examples of such include but are not limited to the following: (1) Nerves regulating liver function accompany the hepatic artery and the portal vein; (2) Nerves regulating the stomach accompany the gastroduodenal, the right gastroepiploic artery, and the left gastric artery; (3) Nerves regulating the spleen accompany the splenic artery; (4) Nerves from the superior mesenteric plexus accompany the superior mesenteric artery, where both the artery and the nerves branch to the pancreas, small intestine, and large intestine; (5) Nerves of the inferior mesenteric plexus accompany the inferior mesenteric artery and branch with the artery to supply the large intestine, the colon, and the rectum; (6) Nerves accompanying the pulmonary artery that regulated the lungs and/or cardiac function; and (7) Greater splanchnic nerves regulating venous pooling.

When monitoring ANS activity, one must generally differentiate between the electrical signals generated by the ANS and those generated by muscle activity, which is commonly called electromyography (EMG) signals. EMG signals possess amplitudes several orders of magnitude larger than compared to those of the ANS. Probes (aka catheters) possessing electrodes have been used to assess the EMG of the heart, stomach, intestines, and other muscles of the body. Such probes and their means and methods for detecting and analyzing the electric signals are not suitable for use with signals generated by the ANS.

Deficiencies in the use of existing therapeutic protocols in denervation of autonomic nerves proximate arteries include: 1) The inability to determine the appropriate lesion sites along the artery that correspond to the location of nerves; 2) The inability to verify that the destructive devices are appropriately positioned adjacent to the arterial wall, normalizing the tissue/device interface and enabling energy transfer through the vessel wall; and 3) The inability to provide feedback to the clinician intraoperatively to describe lesion completeness or the integrity of the affected nerve fibers. As a consequence, current autonomic nerve ablation procedures are performed in a 'blind' fashion; the clinician performing the procedure does not know where the nerves are located; and further, whether the nerves have truly been ablated. Instead, surrogates such as calf muscle sympathetic activity (MSNA) or catecholamine spillover into the circulating blood have been used to attempt to evaluate the reduction in organ specific autonomic activity such as renal nerve activity. It is entirely likely that this deficiency could at least partly be responsible for the current variability in clinical responses coming from clinical trials. Therefore, a system designed to indicate with precision, and in real time, whether ablation was successful is urgently needed.

SUMMARY

Certain embodiments of the present technology are directed to a catheter for use in analyzing neural activity of nerves that surround a biological lumen. In accordance with certain embodiments, the catheter comprises a handle and a shaft extending from the handle. The handle includes first, second, and third actuators. The shaft includes proximal and distal electrodes that are selectively deployable. The first actuator is configured to selectively deploy the proximal electrode in response to the first actuator being manually maneuvered. The second actuator is configured to selectively deploy the distal electrode in response to the second actuator being manually maneuvered. The third actuator is configured to selectively adjust a longitudinal distance between the proximal and distal electrodes in response to the third actuator being manually maneuvered.

Certain embodiments of the present technology are directed to a catheter comprising a handle including a plurality of actuators, and a shaft extending from the handle and including a plurality of nested and concentric tubes, with the shaft also including proximal and distal electrodes that are selectively deployable. Each electrode, of the proximal and distal electrodes that are selectively deployable, includes a pair of longitudinal ends and is configured to be selectively deployed in response to one of the longitudinal ends being moved towards the other one of the longitudinal ends of the electrode. One of the tubes is mechanically coupled between one of the actuators and the proximal electrode that is selectively deployable such that the one of the tubes and the one of the actuators are collectively configured to deploy the proximal electrode in response to the one of the actuators being manually maneuvered. Another one of the tubes mechanically is coupled between another one of the actuators and the distal electrode that is selectively deployable such that the another one of the tubes and the another one of the actuators are collectively configured to deploy the distal electrode in response to the another one of the actuators being manually maneuvered. A further one of the tubes is mechanically coupled to a further one of the actuators such that the further one of the tubes and the further one of the actuators are collectively configured to adjust a longitudinal distance between the proximal and distal electrodes, while one of the proximal and distal electrodes is deployed, in response to the further one of the actuators being manually maneuvered.

Certain embodiments of the present technology are directed to a catheter for use in analyzing neural activity of nerves that surround a biological lumen, the catheter comprising a handle and a shaft extending from the handle. The handle includes a plurality of actuators. The shaft includes first, second, third, and fourth tubes that are nested and concentric. The shaft also includes proximal and distal electrodes that are selectively deployable. The catheter also includes an electrical cable that extends from a proximal portion of the handle and is configured to by coupled to an electronic control unit (ECU). Each electrode, of the proximal and distal electrodes that are selectively deployable, includes a pair of longitudinal ends and is configured to be selectively deployed in response to one of the longitudinal ends being moved towards the other one of the longitudinal ends of the electrode. Each tube, of at least two of the first, second, third, and fourth tubes, includes an electrically conductive coil extending between proximal and distal ends of the tube and surrounded by one or more electrical insulator. The electrically conductive coil of one of the tubes is electrically coupled between the proximal electrode and an electrically conductive path within the handle to thereby provide for an electrical connection between the proximal electrode and the electrical cable that extends from the proximal end of the handle. The electrically conductive coil of another one of the tubes is electrically coupled between the distal electrode and another electrically conductive path within the handle to thereby provide for an electrical connection between the distal electrode and the electrical cable that extends from the proximal end of the handle.

Certain embodiments of the present technology are directed to system comprising an electronic control unit and a catheter electrically coupled to the electronic control unit. The electronic control unit includes a multi-channel nerve sensing subsystem, wherein the multi-channel nerve sensing subsystem includes a first channel and a second channel. The catheter, which is electrically coupled to the electronic control unit, includes a plurality of electrodes along a portion thereof that is configured to be inserted into a biological lumen. The first channel of the electronic control unit comprises a first amplifier comprising a first pair of inputs and a first output, the first pair of inputs including a non-inverting (+) input and an inverting (−) input. The second channel of the electronic control unit comprises a second amplifier comprising a second pair of inputs and a second output, the second pair of inputs including a non-inverting (+) input and an inverting (−) input. The first pair of inputs of the first amplifier is electrically coupled to a first pair of the electrodes of the catheter. The output of the first amplifier outputs a first channel signal indictive of neural activity sensed between the first pair of electrodes. The second pair of inputs of the second amplifier electrically is coupled to a second pair of the electrodes of the catheter, wherein at least one of the electrodes in the second pair of electrodes is not included in the first pair of electrodes. The output of the second amplifier outputs a second channel signal indicative of neural activity sensed between the second pair of electrodes.

Certain embodiments of the present technology are directed to methods for use with a catheter including a plurality of electrodes along a portion thereof that is configured to be inserted into a biological lumen. In certain such embodiments, the method includes sensing a first channel signal using a first amplifier including a first pair of inputs electrically coupled to a first pair of the electrodes, wherein the first channel signal is indicative of neural activity sensed between the first pair of electrodes. The method also includes sensing a second channel signal using a second amplifier including a second pair of inputs electrically coupled to a second pair of the electrodes, wherein at least one electrode in the second pair of electrodes is not included in the first pair of electrodes, and wherein the second channel signal is indicative of neural activity sensed between the second pair of electrodes. The method additional includes comparing the first and second channel signals to one another, and extracting, from the first and second channel signals, information about nerves in tissue surrounding the biological lumen, based at least in part one results of the comparing the first and second channel signals to one another.

This summary is not intended to be a complete description of the embodiments of the present technology. Other features and advantages of the embodiments of the present technology will appear from the following description in which the preferred embodiments have been set forth in detail, in conjunction with the accompanying drawings and claims.

BRIEF DESCRIPTION OF THE FIGURES

The details of one or more examples of the invention are set forth in the accompanying drawings and the description below. Other features and advantages will be apparent from the description and drawings, and from the claims.

FIG. 2A-2D illustrate various tubes of the shaft of the catheter shown in FIGS. 1A-1D.

FIG. 2E illustrates how the various tubes of the catheter shaft are concentric and nested relative to one another and relative to the electrodes of the catheter.

FIGS. 5A and 5B are, respectively, perspective and top views of a portion of the handle of the catheter, according to an embodiment of the present technology, wherein half of an outer housing of the handle has been removed to show internal components of, and the internal workings of, the handle and its actuators.

FIG. 8A shows a catheter according to another embodiment of the present technology, with two selectively deployable electrodes in their non-deployed positions, and with a transducer within a balloon.

FIG. 8B shows the catheter, which was introduced in FIG. 8A, with both of its two selectively deployable electrodes in their deployed positions, and a minimum longitudinal distance between the two selectively deployable electrodes.

DETAILED DESCRIPTION

Figure 1A:
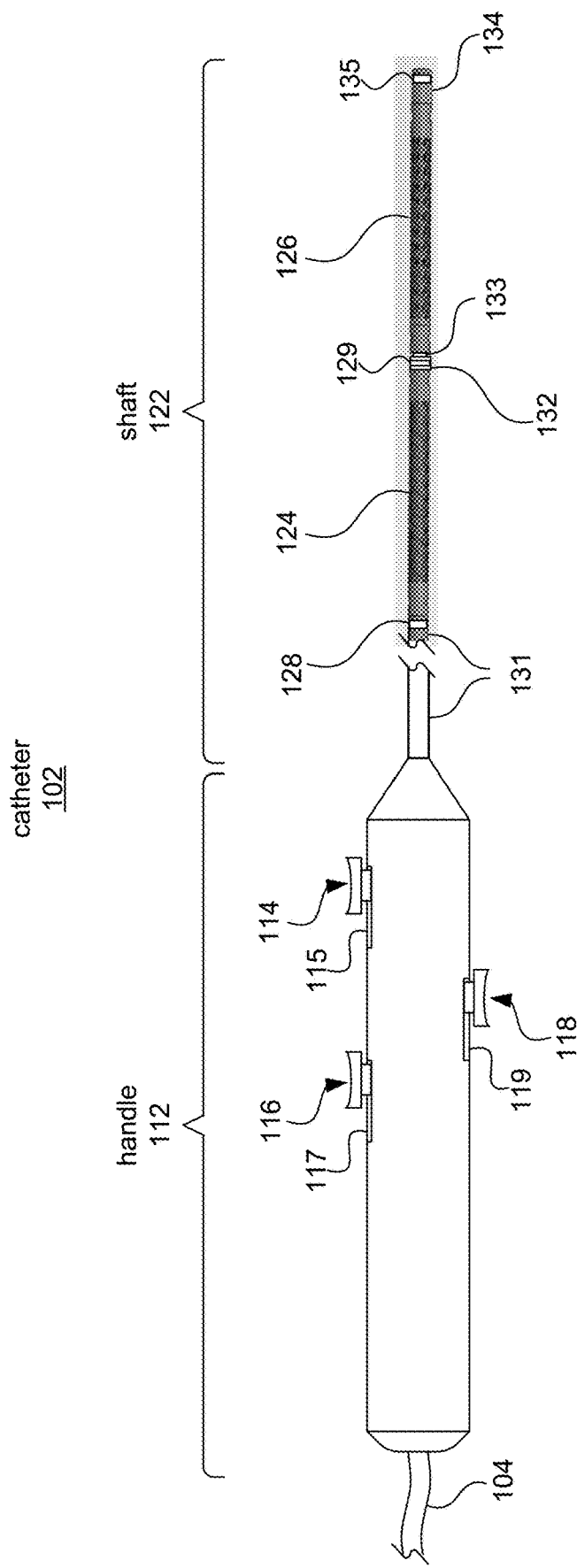
FIG. 1A shows a catheter according to an embodiment of the present technology with its two selectively deployable electrodes in their non-deployed positions.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made. Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combination is explicitly contemplated to be within the scope of the examples presented here. The following detailed description does not, therefore, limit the scope of what is claimed.

Regulating operation of the nervous system to characterize nerve signaling and modulate organ function includes in some examples introduction of a probe such as a needle, catheter, wire, or the like into the body to a specified anatomical location, and partially destroying or ablating nerves using the probe to destroy nerve tissue in the region near the probe. By reducing nerve function in the selected location, an abnormally functioning physiological process can often be regulated back into a normal range. It would also be possible to modulate nerve function to purposely cause an abnormally functioning that is beneficial to the patient.

Unfortunately, it is typically very difficult to estimate the degree to which nerve activity has been reduced, which makes it difficult to perform a procedure where it is desired to ablate all nerves, or to ablate some, but not all, nerves to bring the nervous system response back into a desired range without destroying the nervous system response entirely.

One such example is renal nerve ablation to treat hypertension. Various studies have confirmed that renal nerve activity has been associated with hypertension, and that ablation of the nerve can improve renal function and reduce hypertension. In a typical procedure, a catheter is introduced into a hypertensive patient's arterial vascular system and advanced into the renal artery. Renal nerves located in the arterial wall and in regions adjacent to the artery are ablated by destructive means such as radio frequency waves, microwave, cryotherapy, ultrasound, laser or chemical agents to limit the renal nerve activity, thereby reducing hypertension in the patient.

Unfortunately, renal nerve ablation procedures are sometimes ineffective due to insufficiently ablating the nerve. Also, it may be desirable to avoid ablating other off-target tissues. Clinicians often estimate based on provided guideline estimates or past experience the degree to which application of a particular ablative method will reduce nerve activity, and it can take a significant period of time (e.g., 3-12 months) before the clinical effects of the ablation procedure are fully known.

Some attempt has been made to monitor nerve activity in such procedures by inserting very small electrodes into or adjacent to the nerve body, which are then used to electrically monitor the nerve activity. Such microneurography practices are not practical in the case of renal ablation because the renal arteries and nerves are located within the abdomen and cannot be readily accessed, making monitoring and characterization of nerve activity in a renal nerve ablation procedure a challenge.

Prior methods such as inserting electrodes into the arteries of a patient's heart and analyzing received electrical signals are not readily adaptable to renal procedures. In the heart, the ablated tissue is heart muscle which itself is electrically conductive. Further, the cardiac electrical signals emitted from the heart are generally large and slow-moving relative to electrical signals near the renal arteries, which tend to be smaller in size and produce smaller signals that propagate more quickly through the nerves. In the case of renal denervation, the target of the ablation is renal nerves which lie outside the lumen within the blood vessel, and the blood vessel tissue is different from myocardium and acts as a barrier to adequately sense nerve firing. As such, intracardiac techniques used in heart measurements are not readily adaptable to similar renal procedures.

Because nerve activity during procedures to ablate or neuromodulate enervation of organs such as renal nerve ablation cannot be readily measured, it is also difficult to ensure that an ablation probe is located at the most appropriate sites along the renal artery, or to measure the efficiency of the nerve ablation process in a particular patient.

FIG. 1A shows a catheter 102, according to an embodiment of the present EXtechnology, with its selectively deployable electrodes 124 and 126 in their non-deployed positions. The selectively deployable electrode 124 can also be referred to as the proximal selectively deployable electrode 124, or more succinctly as the proximal electrode 124, or even more succinctly as the electrode 124. The selectively deployable electrode 126 can also be referred to as the distal selectively deployable electrode 126, or more succinctly as the distal electrode 126, or even more succinctly as the electrode 126. The catheter 102 includes a catheter handle 112 and a catheter shaft 122. The catheter handle 112, which can also be referred to more succinctly as the handle 112, includes actuators 114, 116, and 118, which can be used to selectively deploy the electrodes 124, 126, as well as to adjust a longitudinal distance between the electrodes 124, 126, as will be described in additional detail below. The actuators 114, 116, and 118 are respectively slidable within slots 115, 117, and 119 in the handle, and thus, the actuators 114, 116, and 118 can also be referred to as sliders. The catheter 102 can also be referred to as an intraluminal microneurography probe 102, or more succinctly, as a probe 102. An electrical cable 104, which extends from a proximal portion of the handle 112, provides for electrical connections between the catheter 102 (and more specifically, the electrodes thereof) and an electrical control unit (ECU), an example of which is described below with reference to FIG. 7.

When the catheter 102 is inserted into a biological lumen, such as an artery, vein or other vasculature or biological lumen, it is the distal portion of the catheter 102 (and more specifically the shaft 122) that is inserted into the biological lumen, and the proximal end of the catheter 102 (and more specifically the handle 112) that is used to maneuver the catheter 102. In the embodiment shown in FIGS. 1A-1D, the electrode 126 can also be referred to as a distal electrode 126 as noted above, since it located closer to the distal end of the catheter 102 than to the proximal end of the catheter 102; and the electrode 124 can also be referred to as a proximal electrode 124 as noted above, since it is located closer to the proximal end of the catheter 102 than to the distal end of the catheter 102.

Figure 1B:
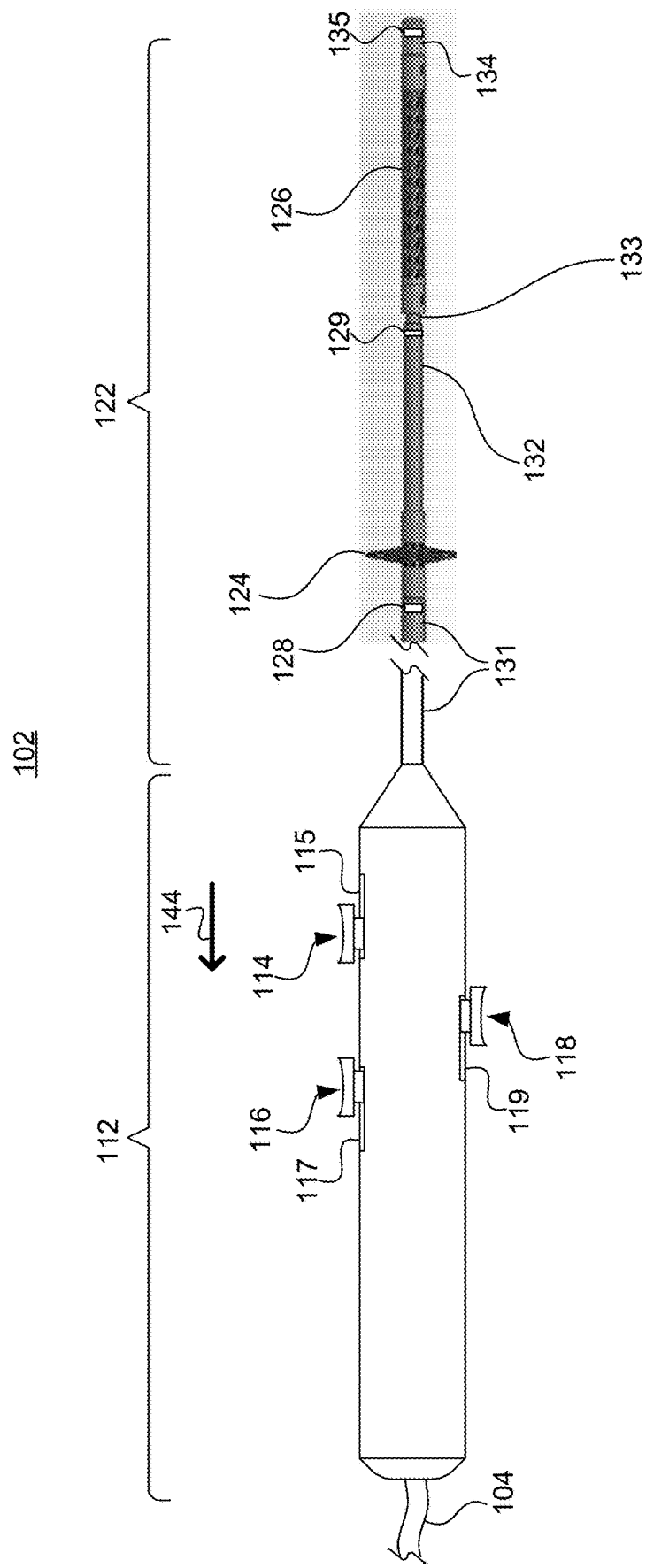
FIG. 1B shows the catheter, which was introduced in FIG. 1A, with one of its two selectively deployable electrodes in its deployed position, the other one of its two selectively deployable electrodes in its non-deployed position, and a maximum longitudinal distance between the two selectively deployable electrodes.

FIG. 1B shows the catheter 102 with the electrode 124 in its deployed (aka expanded) position, the electrode 126 in its non-deployed position, and a maximum longitudinal distance between the two selectively deployable electrodes 124, 126. In accordance with certain embodiments, the proximal electrode 124 is configured to be deployed (aka expanded) in response to the actuator 114 being slid in the proximal direction indicated by the arrow 144 in FIG. 1B. In such an embodiment, the proximal electrode 124 can be returned to its non-deployed (aka non-expanded or retracted) position in response to the actuator 114 being slid in the distal direction opposite the arrow 144 in FIG. 1B. More generally, the actuator 114 is used to selectively expand and retract the electrode 124.

Figure 1C:
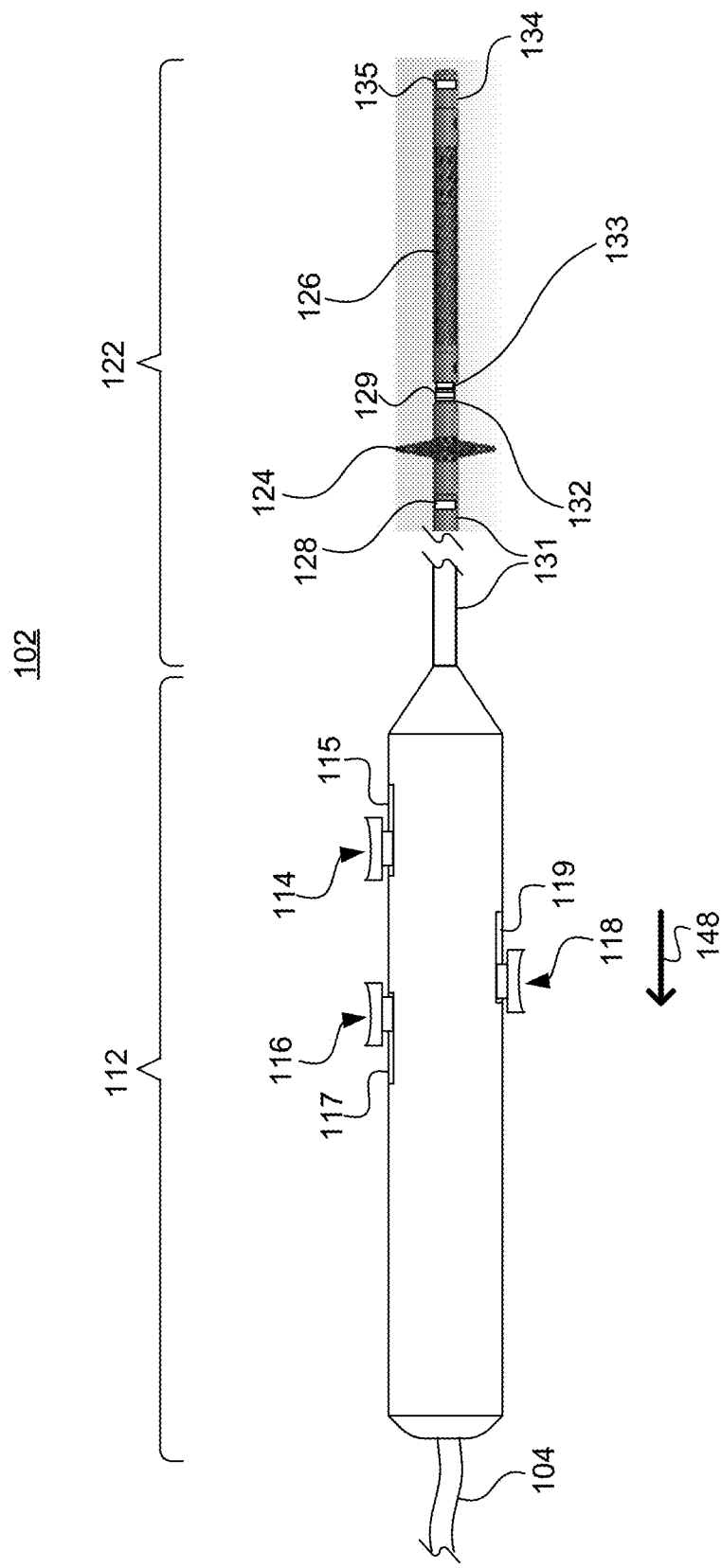
FIG. 1C shows the catheter, which was introduced in FIG. 1A, with one of its two selectively deployable electrodes in its deployed position, the other one its two selectively deployable electrodes in its non-deployed position, and a minimum longitudinal distance between the two selectively deployable electrodes.

FIG. 1C shows the catheter 102 with the electrode 124 in its deployed position, the electrode 126 still in its non-deployed position, and a minimum longitudinal distance between the two selectively deployable electrodes 124, 126. In accordance with certain embodiments, the longitudinal distance between the distal electrode 126 and the proximal electrode 124 is reduced by sliding the actuator 118 in the proximal direction indicated by the arrow 148 in FIG. 1C. Thereafter, the longitudinal distance between the distal electrode 126 and the proximal electrode 124 can be increased, if desired, by sliding the actuator 118 in the distal direction opposite the arrow 148 in FIG. 1C. More generally, the actuator 118 is used to adjust the longitudinal distance between the electrodes 124 and 126.

Figure 1D:
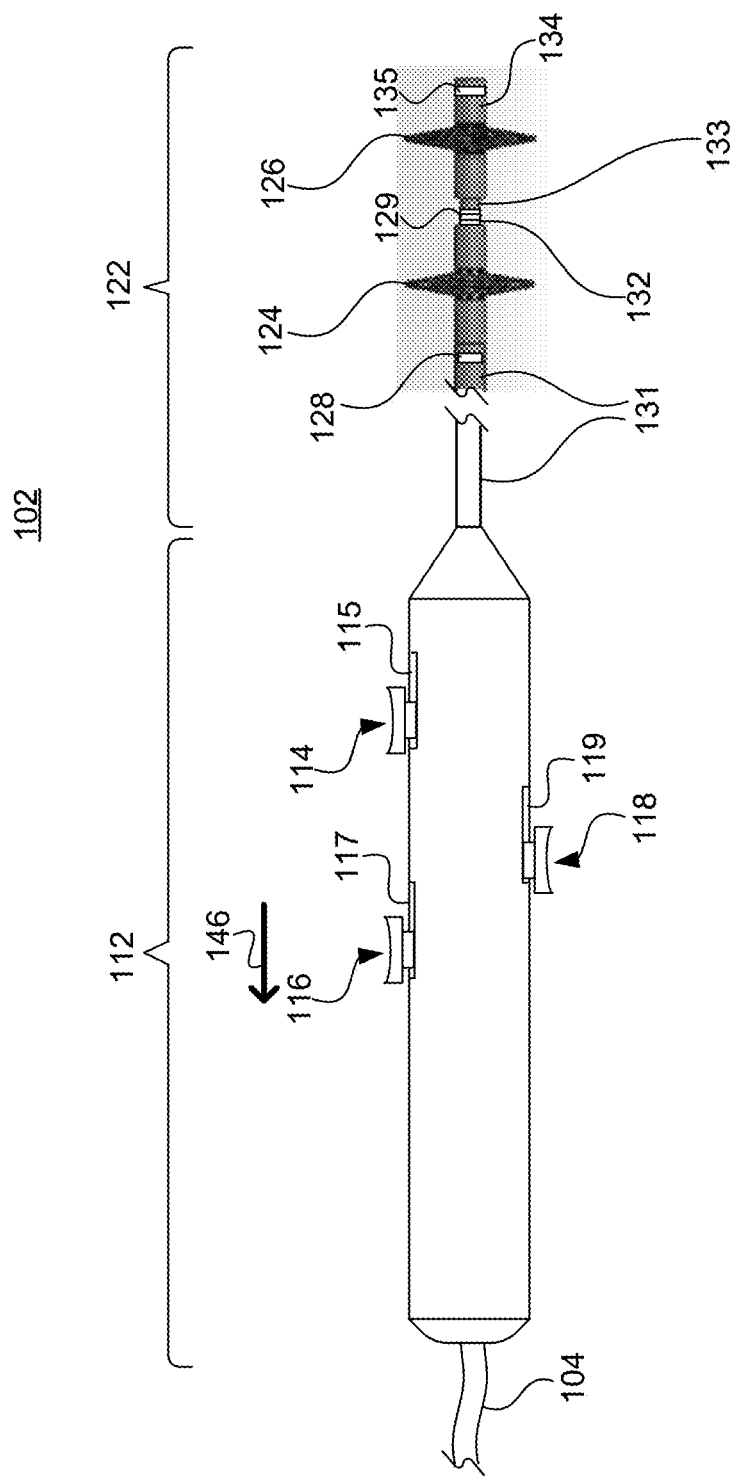
FIG. 1D shows the catheter, which was introduced in FIG. 1A, with both of its two selectively deployable electrodes in their deployed positions, and a minimum longitudinal distance between the two selectively deployable electrodes.

FIG. 1D shows the catheter 102 with both of its two selectively deployable electrodes 124, 126 in their deployed positions, with the minimum longitudinal distance between the two selectively deployable electrodes 124, 126. The longitudinal distance between the proximal and distal electrodes 124, 126 can be any distance between the maximum and minimum longitudinal distance as controlled by a user using the actuator 118. In accordance with certain embodiments, the electrode 124 is configured to be deployed in response to the actuator 114 being slid in the proximal direction indicated by the arrow 144 in FIG. 1B. In accordance with certain embodiments, the distal electrode 126 is configured to be deployed in response to the actuator 116 being slid in the proximal direction indicated by the arrow 146 in FIG. 1D. In such an embodiment, the distal electrode 126 can be returned to its non-deployed position in response to the actuator 116 being slid in the distal direction opposite the arrow 146 in FIG. 1D. More generally, the actuator 116 is used to selectively expand and retract the electrode 126.

In the embodiments described with reference to FIGS. 1A-1D, the electrode 124 is configured to be deployed by holding the proximal longitudinal end of the electrode 124 in place and moving the distal longitudinal end of the electrode 124 towards the proximal longitudinal end of the electrode 124, by moving the actuator 114 in the direction of the arrow 144 in FIG. 1B, as noted above. Similarly, the electrode 126 is configured to be deployed by holding the proximal longitudinal end of the electrode 126 in place and moving the distal longitudinal end of the electrode 126 towards the proximal longitudinal end of the electrode 126, by moving the actuator 116 in the direction of the arrow 146 in FIG. 1D. In alternative embodiments, the electrode 124 is deployed by holding the distal longitudinal end of the electrode 124 in place and moving the proximal longitudinal end of the electrode 124 towards the distal longitudinal end of the electrode 124, by moving the actuator 114 in a direction opposite the arrow 144 in FIG. 1B; and the electrode 126 is deployed by holding the distal longitudinal end of the electrode 126 in place and moving the proximal longitudinal end of the electrode 126 towards the distal longitudinal end of the electrode 126, by moving the actuator 116 in a direction opposite the arrow 146 in FIG. 1D. In such alternative embodiments, the longitudinal distance between the electrodes 124 and 126 is adjusted from a maximum longitudinal distance to a minimum longitudinal distance (or any longitudinal distance therebetween) by moving the actuator in a distal direction opposite the arrow 148 in FIG. 1C.

In the embodiments described with reference to FIGS. 1A-1D, after the electrode 124 has been deployed, but before the electrode 126 has been deployed, the longitudinal distance between the electrodes 124 and 126 (and more specifically, the longitudinal distance between the distal longitudinal end of the electrode 124 and the proximal longitudinal end of the electrode 126) can be adjusted, and more specifically reduced, by moving the actuator 118 in the direction of the arrow 148 shown in FIG. 1C. In accordance with certain embodiments, the longitudinal distance between the electrodes 124 and 126 is locked in place, i.e., is not adjustable using the actuator 118, after the electrode 126 has been deployed. Example details of how the actuator 118 can be locked in place, while the electrode 126 is deployed, are described below with reference to FIGS. 5A-5C. In alternative embodiments, the longitudinal distance between the electrodes 124 and 126 is instead locked in place, i.e., is not adjustable using the actuator 118, after the electrode 124 has been deployed. A benefit of preventing adjustment of the longitudinal distance between the electrodes 124 and 126, when at least one of the electrodes 124, 126 is in its deployed position, is that this reduces the chance that electrodes 124, 126 could be accidently maneuvered within a biological lumen (e.g., a renal artery) such that the deployed electrodes 124, 126 scrape against an interior wall of the biological lumen, which could inadvertently damage the interior wall of the biological lumen.

As shown in FIGS. 1A-1D, and FIGS. 2A-2F, the catheter shaft 122 includes four concentric and nested tubes 131, 132, 133, and 134, which can be referred to respectively as a first tube 131, a second tube 132, a third tube 133, and a fourth tube 134. The catheter shaft 122, which can also be referred to more succinctly as the shaft 122, also includes the aforementioned electrodes 124 and 126. As noted above, and as will be described in additional detail below, the electrodes 124 and 126 can each be selectively transitioned between its non-deployed position and its deployed position using the actuators 114, 116, respectively. A longitudinal distance between the electrodes 124 and 126 can be adjusted using the actuator 118, as noted above, and as will be described in additional detail below. As will be described in further detail below, in accordance with certain embodiments the shaft 122 can additionally include one or more non-deployable ring electrodes. For example, the shaft 122 can include a proximal ring electrode 128 located near the distal end of the first tube 131, a medial ring electrode 129 located near the distal end of the second tube 132 and/or a distal tip or ring electrode 135 located at or near the distal end of the fourth tube 134. The aforementioned ring electrodes can also be referred to as marker band electrodes, since they can be used as markers when imaging is used to monitor a position of the catheter 102 within a biological lumen.

In accordance with certain embodiments of the present technology, each of the electrodes 124, 126 is made of a unitary nitinol tube that is laser cut to include apertures or openings having a predetermine pattern. In FIGS. 1A and 1B, each of the electrodes 124, 126 has laser cut spiral apertures that extend between proximal and distal portions of each of the electrodes 124, 126. The spiral apertures in each of the electrodes 124, 126 enable each of the electrodes to be selectively transitioned between their non-deployed and deployed positions. As will be described in additional detail below, the apertures that are cut into the electrodes 124, 126 can have other shapes besides being spiral, so long as the apertures enable the electrodes to be transitioned between non-deployed and deployed positions. In accordance with certain embodiments, each of the electrodes 124 and 126 includes a pair of longitudinal ends and is configured to be selectively deployed in response to one of the longitudinal ends being moved towards the other one of the longitudinal ends of the electrode. Additional details of the electrodes 124, 126, and alternative embodiments thereof, are described below with reference to FIGS. 4A-4C.

Figure 2F:
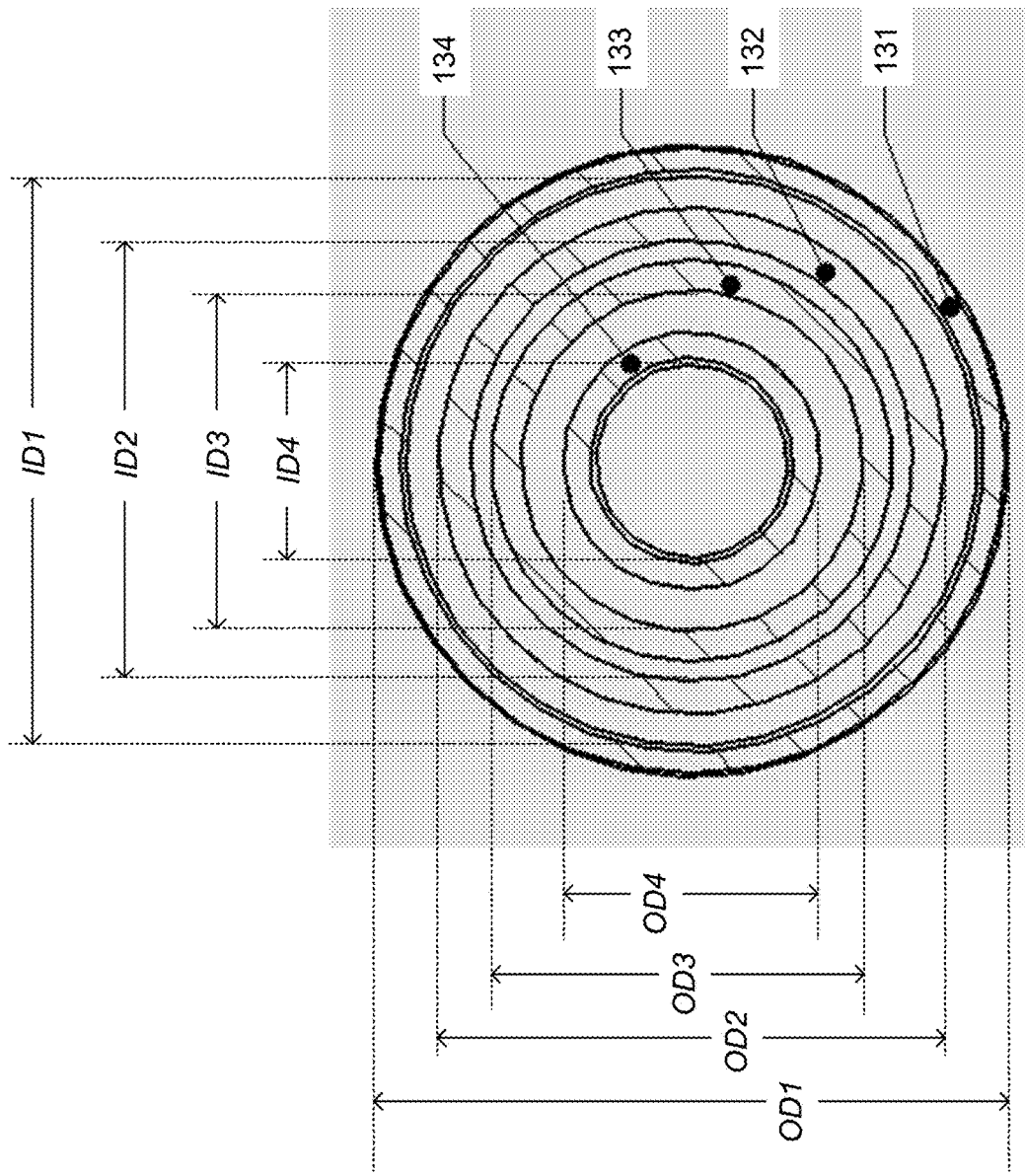
FIG. 2F is a cross-sectional view of the catheter shaft along the line F-F in FIG. 2E.

Additional details of the concentric tubes 131, 132, 133, and 134 of the catheter shaft 122, according to certain embodiments of the present technology, will now be described with reference to FIGS. 2A-2F and FIGS. 3A-3B, wherein FIG. 2F is a cross section of the shaft 122 along the dashed line F-F shown in FIG. 2E. As will be described in additional detail below, and as can be appreciated from FIGS. 2A-2F, proximal portions of the concentric tubes 131, 132, 133, and 134 extend into the handle 112. The wall thickness of each of the tubes 131, 132, 133, 134, in accordance with certain embodiments, is about 0.006 inches. The use of thicker or thinner walls is also possible and within the scope of the embodiments described herein. Referring to FIGS. 2A and 2F, the first tube 131 is shown as extending from the handle 112 and having an outer diameter OD1, and an inner diameter ID1. Referring to FIGS. 2B and 2F, the second tube 132 is shown as extending from the handle 112 and having an outer diameter OD2 (which is less than the inner diameter ID1 of the first tube 131), and having an inner diameter ID2. At the distal end of the second tube 132 is a flange 132' having an outer diameter OD2' that is greater than the outer diameter OD2, as shown in FIG. 2B. Referring to FIGS. 2C and 2F, the third tube 133 is shown as extending from the handle 112 and having an outer diameter OD3 (which is less than the inner diameter ID2), and having an inner diameter ID3. At the distal end of the third tube 133 is a flange 133' having an outer diameter OD3' that is greater than the outer diameter OD3, as shown in FIG. 2C. Referring to FIG. 2D, the fourth tube 134 is shown as extending from the handle 112 and having an outer diameter OD4 (which is less than the inner diameter ID3), and having an inner diameter ID4. At the distal end of the fourth tube 134 is a flange 134' having an outer diameter OD4' that is greater than the outer diameter OD4, as shown in FIG. 2D.

In accordance with certain embodiments, a distal portion of each of the second, third, and fourth 132, 133 and 134 tubes includes a respective flange 132', 133' and 134' that has an outer diameter that is substantially the same as the outer diameter of the first tube 131. FIG. 2E shows that a portion of a length of the fourth tube 134 extends through the first, second, and third tubes 131, 132, and 133; a portion of a length of the third tube 133 extends through the first and second tubes 131 and 132; and a portion of a length of the second tube 132 extends through the first tube 131. It can also be appreciated from FIG. 2E that a portion of each of the second, third, and fourth tubes 132, 133, and 134 extends through a hollow lumen of the proximal electrode 124, and a portion of the fourth tube 134 extends through a hollow lumen of the distal electrode 126.

In accordance with an embodiment, the outer diameter OD1 of the first tube 131 is about 0.078 inches, the outer diameter OD2 of the second tube 132 is about 0.063 inches, the outer diameter OD3 of the third tube 133 is about 0.050 inches, and the outer diameter OD4 of the fourth tube 134 is about 0.032 inches. Assuming the wall thickness of each of the tubes 131, 132, 133, and 134 is about 0.006 inches, then the inner diameter ID1 of the first tube 131 is about 0.064 inches (i.e., 0.078−(2×0.006)=0.066), the inner diameter ID2 of the second tube 132 is about 0.51 inches, the inner diameter ID3 of the third tube 133 is about 0.038 inches, and the inner diameter ID4 of the fourth tube 134 is about 0.020 inches. The use of alternative outer and inner diameters, and the use of other wall thicknesses, are also within the scope of the embodiments of the present technology described herein, so long as the outer diameter OD4 of the fourth tube 134 is less than the inner diameter ID3 of the third tube 133, the outer diameter ID3 of the third tube 133 is less than the inner diameter ID2 of the second tube 132, and the outer diameter ID2 of the second tube 132 is less than the inner diameter ID1 of the first tube 131.

Referring to FIGS. 2A-2E, in accordance with certain embodiments, outer diameters OD2', OD3', and OD4' of the flanges 132', 133', and 134', respectively, are substantially the same as the outer diameter OD1 of the first tube 131. Accordingly, where the outer diameter OD1 of the first tube 131 is about 0.078 inches, the outer diameters OD2', OD3', and OD4' of the flanges 132', 133', and 134' can also be about 0.078 inches.

In accordance with certain embodiments, the longitudinal length of the first tube 131 is about 34.25 inches, the longitudinal length of the second tube 132 is about 34.6 inches, the longitudinal length of the third tube 133 is about 36.5 inches, and the longitudinal length of the fourth tube 134 is about 38.5 inches. The use of alternative longitudinal lengths of the tubes 131, 132, 133, and 134 are also within the scope of the embodiments of the present technology described herein, so long as the longitudinal length of the fourth tube 134 is greater than the longitudinal length of the third tube 133, the longitudinal length of the third tube 133 is greater than the longitudinal length of the second tube 132, and the longitudinal length of the second tube 132 is greater than the longitudinal length of the first tube 131.

Figures 3A, 3B:
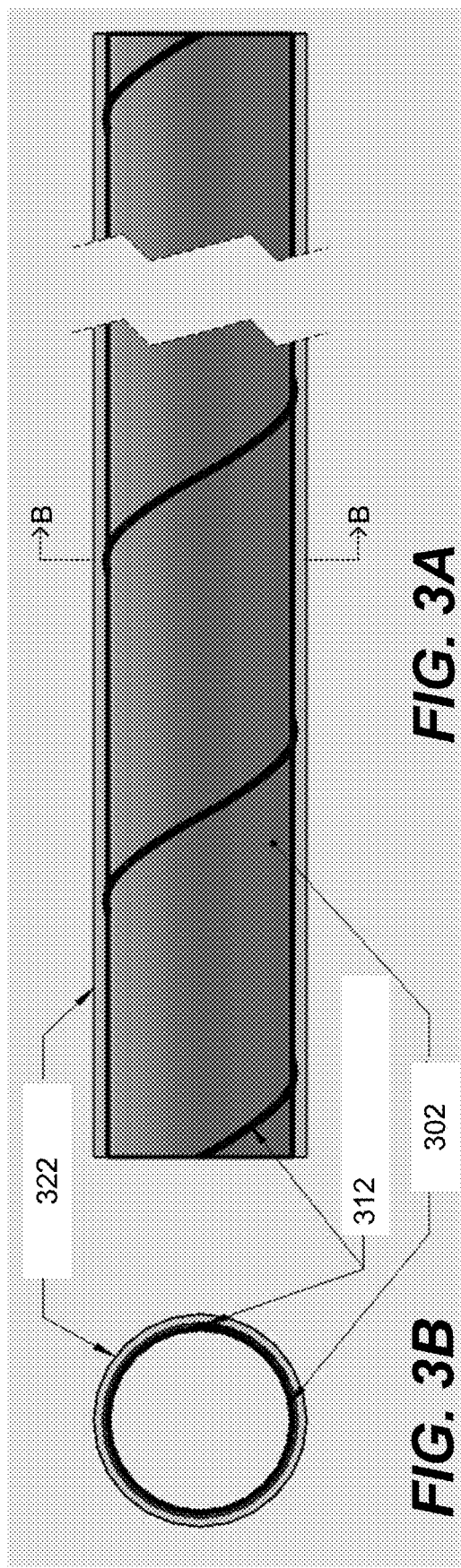
FIG. 3A shows an example portion of a length of one of the tubes of the catheter shaft, according to an embodiment of the present technology.
FIG. 3B is a cross-sectional view of the tube introduced in FIG. 3A along the line B-B in FIG. 3A.

FIGS. 3A and 3B will now be used to describe additional details of each of the tubes 131, 132, 133, and 134, according to certain embodiments of the present technology, wherein FIG. 3A shows an example portion of a length of such tubes, and FIG. 3B shows a cross section along the line B-B in FIG. 3A. Referring to FIGS. 3A and 3B, each of the tubes is shown as including a tubular liner 302 that is made of a non-electrically conductive material, such as, but not limited to, Polytetrafluoroethylene (PTFE), which is a synthetic fluoropolymer of tetrafluoroethylene. The liner 302, which is cylindrical and hollow, can also be referred to as the inner liner 302. Coiled around the tubular inner liner 302 is a coiled wire 312 that is made of an electrically conductive material, such as, but not limited to, stainless steel, or a platinum-iridium alloy. Surrounding the coiled wire 312 is an outer jacket 322 that is made of a non-electrically conductive material, such as, but not limited to, Polyether block amide (PEBA), which is often marketed under the trademark PEBAX™ (which is a registered trademark of Arkema S.A, headquartered in Colombes, France). Accordingly, it can be appreciated that the coiled wire 312 is sandwiched between the tubular inner line 302 and the outer jacket 322. In accordance with certain embodiments of the present technology, the coiled wire 312 of each tube provides structural support for the tube, and in some cases also provides an electrically conductive path between an electrode (e.g., 124 or 126) and an electrical control unit (ECU), an example of which is described below with reference to FIG. 7. The structural support provided by the coiled wire 312 provides the tube (that includes the coiled wire 312) with kink-resistance and crush-resistance. The electrically conductive path provided by the coiled wire 312 enables an electrical connection to an electrode (e.g., 124 or 126, or some other electrode described below) of the catheter 102 without requiring that a wire be positioned within the hollow lumen(s) of one or more of the tubes 131, 132, 133, 134, or more generally, without requiring that one or more wires extend through one or more lumens within the shaft 122.

One or more of the tubes 131, 132, 133, and 134 can each include more than one coiled wire (e.g., 312) so that one such tube can provide two or more electrically conductive paths. For an example, the tube 133 can include first and second coiled wires (e.g., 312a and 312b, not specifically shown) that are spaced apart from one another or are otherwise electrically insulated from one another.

Figure 7:
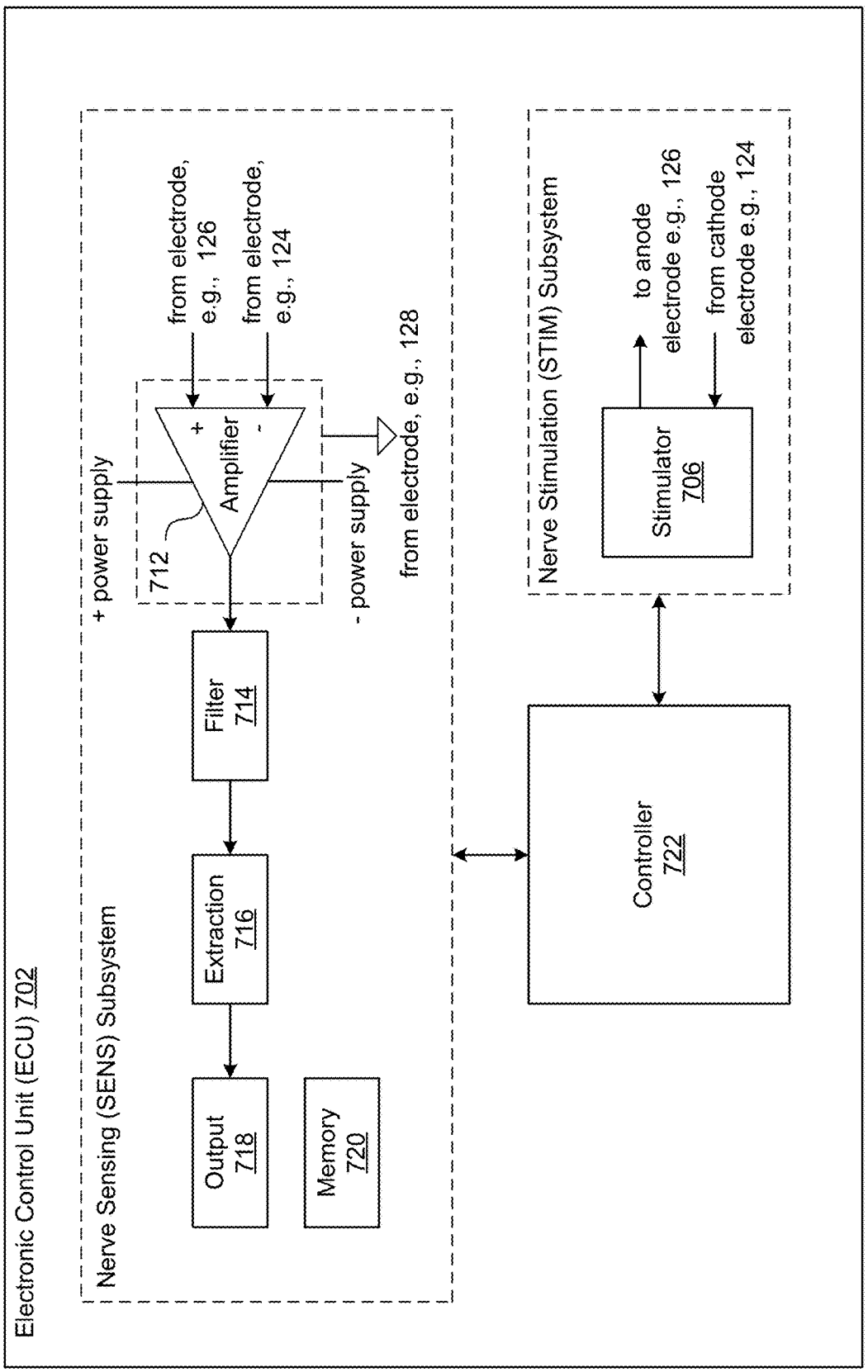
FIG. 7 is a schematic diagram of an example system, according to an embodiment of the present technology, for interfacing with a patient's arterial nerves.

Referring briefly back to FIGS. 1A-1D, where the catheter 102 includes a ring electrode 128 near the distal end of the first tube 131, the coiled wire 312 of the first tube 131 can be used to provide an electrically conductive path between the ring electrode 128 and a wire within the handle, which wire is connected to the cable 104, to thereby provide an electrically conductive path between the ring electrode 128 and an ECU (e.g., 702 in FIG. 7). Additionally, or alternatively, a ring electrode (not shown) can be located near the distal end of the third tube 133, e.g., on the flange 133' of the third tube 133, in which case the coiled wire 312 of the third tube 133 can be used to provide an electrically conductive path between the ring electrode (on the flange 133') and a wire within the handle, which wire is connected to the cable 104, to thereby provide an electrically conductive path between the ring electrode (on the flange 133') and the ECU. Additionally, or alternatively, a ring or tip electrode (not shown) can be located near or on the distal end of the fourth tube 134, e.g., on the flange 134' of the fourth tube 134, in which case the coiled wire 312 of the fourth tube 134 can be used to provide an electrically conductive path between the ring or tip electrode (on the flange 134') and a wire within the handle, which wire is connected to the cable 104, to thereby provide an electrically conductive path between the ring or tip electrode (on the flange 134') and the ECU.

Figure 4C:
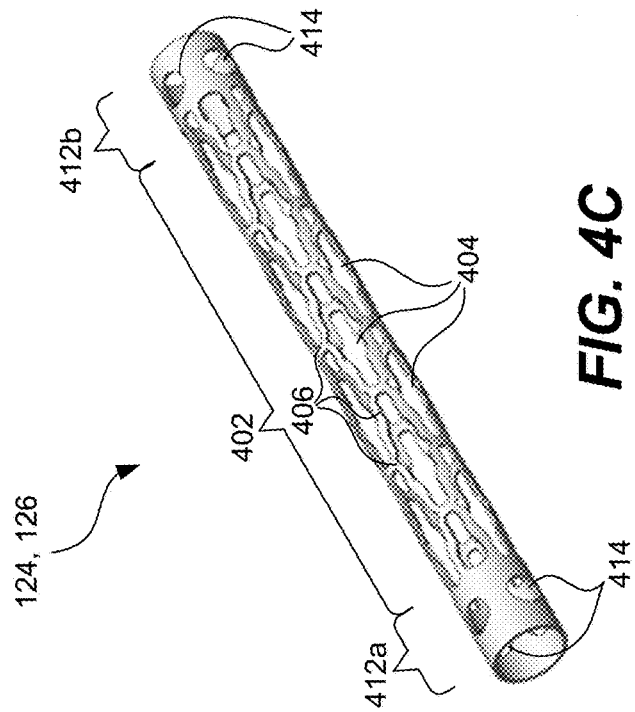
FIG. 4C shows a perspective view of an electrode of a catheter according to still another embodiment of the present technology.
Figure 4A:
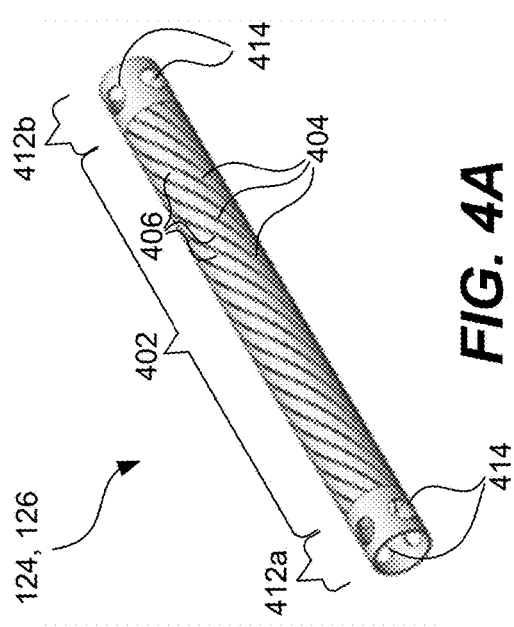
FIG. 4A shows a perspective view of one of the electrodes of the catheter introduced in FIGS. 1A-1C, according to an embodiment of the present technology, when the electrode is in its non-deployed position.

FIG. 4A shows a perspective view of one of the electrodes 124, 126, according to an embodiment of the present technology. Referring to FIG. 4A, the electrode 124, 126 is shown as including a central portion 402, and end portions 412a and 412b, each of which is cylindrical in shape. The central portion 402 includes laser cut apertures 404 (which in this embodiment, are spiral apertures) and struts 406 (which in this embodiment, are spiral struts). Each of the end portions 412a, 412b (which can also be referred to as a sleeve) is shown as including openings 414, which in this embodiment, are circular openings. The laser cut apertures 404 in the central portion 402 are shaped, spaced, and otherwise designed to enable the electrode 124, 126 to be transitioned from its non-deployed position (shown in FIGS. 4A and 1A) to its deployed position (e.g., shown in FIG. 1B) when one of the end portions 412a, 412b is held in place with the other one of the end portions 412a, 412b is moved towards the end portion that is held in place. The deployed position of an electrode 124, 126 can also be referred to as the expanded position, since the outer diameter of the electrode 124, 126 is expanded when the electrode 124, 126 is in its deployed position. The non-deployed position of an electrode 124, 126 can also be referred to as its non-expanded position. When an electrode 124, 126 is deployed, it need not be fully deployed, but rather, may just be deployed to the extent that an outer circumference of the deployable electrode in the deployed position contacts an inner circumference of the biological lumen in which the catheter shaft 122 is introduced. In other words, the extent to which each of the electrodes 124, 126 is deployed depends on the size of the biological lumen in which the catheter shaft 122 is introduced. In FIG. 4A the apertures 404 and the struts 406 are at an obtuse angle relative to a longitudinal axis of the electrodes 124, 126.

The openings 414 in the end portions 412a, 412b of the electrodes 124, 126, which end portions can also be referred to as collars 412, provide for electrical and/or mechanical attachment points to one of the tubes 131, 132, 133, or 134. The end portion 412a of an electrode 124, 126 can also be referred to as the proximal end portion 412a or the proximal collar 412a. The end portion 412b of an electrode 124, 126 can also be referred to as the distal end portion 412b or the distal collar 412b.

Figure 4B:
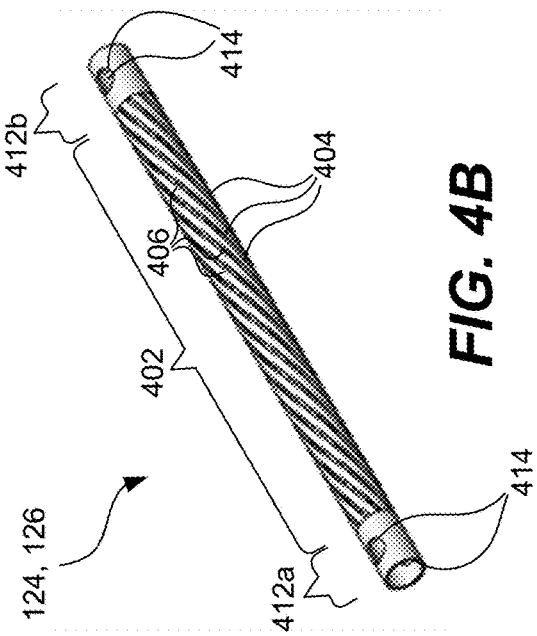
FIG. 4B shows a perspective view of an electrode of a catheter according to another embodiment of the present technology.

FIG. 4B shows an alternative embodiment of the electrodes 124, 126, which is similar to the embodiment shown in FIG. 4A, in that the electrodes 124, 126 in FIG. 4B also include a central portion 402 having laser cut apertures 404 (that are spiral apertures) and struts (that are spiral struts), and end portions 412a and 412b that include openings 414. The strut width and the strut pitch of the spiral struts 406 of the electrode shown in FIG. 4B differ from the strut width and the strut pitch of the spiral struts 406 of the electrode shown in FIG. 4A, and the outer diameter of the electrode in FIG. 4B is smaller than the outer diameter of the electrode shown in FIG. 4A. Additionally, in FIG. 4B the end portions 412a and 412b are each shown as including only two openings, in contrast to the end portions 412a and 412b in FIG. 4A each including four openings. In both FIGS. 4A and 4B the spiral apertures are shown as being continuous between the end portions 412a and 412b, but that need not be the case. In FIG. 4B the apertures 404 and the struts 406 are at an obtuse angle relative to a longitudinal axis of the electrodes 124, 126.

FIG. 4C shows still another embodiment of the electrodes 124, 126. In the embodiment of FIG. 4C the laser cut apertures 404 are irregular oblong openings arranged in a staggered pattern included in the central portion 402. Further, the struts 406 in FIG. 4C differ from the struts 406 in the embodiments of FIGS. 4A and 4B, since in FIG. 4C the struts are not spiral in shape. The end portions 412a and 412b in FIG. 4C each include four openings, similar to the embodiment shown in FIG. 4A. The laser cut apertures 404 and struts 406 in the central portion 402 in FIG. 4C are also shaped, spaced, and otherwise designed to enable the electrode 124, 126 to be transitioned from its non-deployed position to its deployed position when one of the end portions 412a, 412b is held in place while the other one of the end portions 412a, 412b is moved towards the end portion that is held in place. The use of other shaped and arranged apertures and struts are also possible, and within the scope of the embodiments described herein, so long as the apertures and struts enable an electrode to be transitioned between a non-deployed position and a deployed position.

Figure 4D:
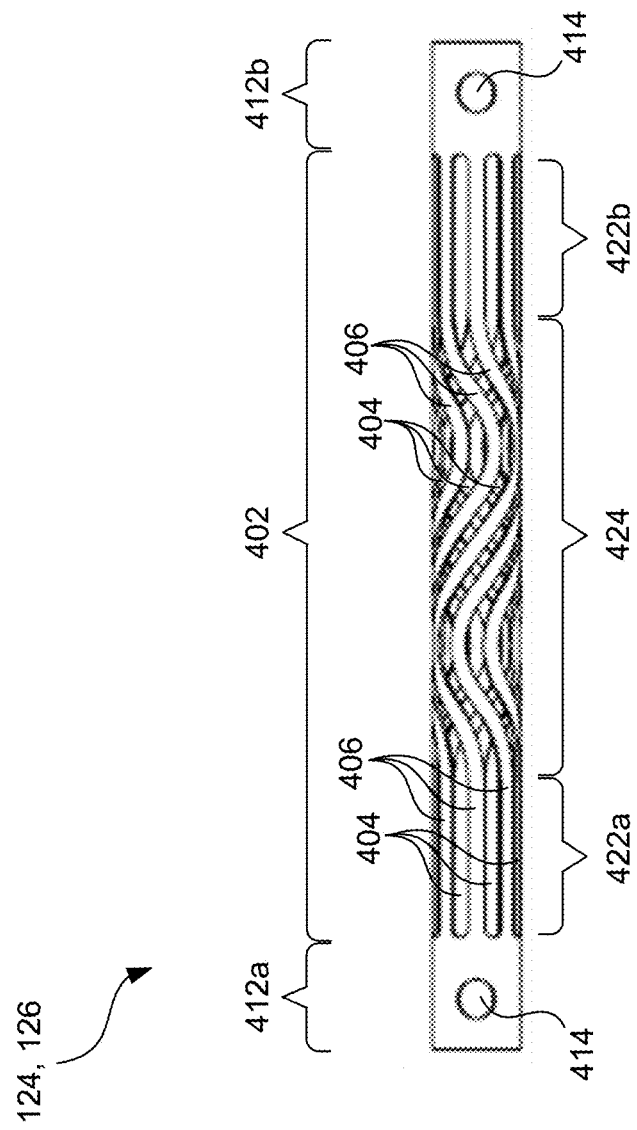
FIG. 4D shows a side view of an electrode of a catheter according to a further embodiment of the present technology.

FIG. 4D shows a side view of still another embodiment of the electrode 124, 126, when in the non-deployed position. In the embodiment of FIG. 4D, the central portion 402 of the electrode 124, 126 includes side-sections 422a and 422b, between which is located a mid-section 424. As can be appreciated from FIG. 4D, within each of the side-sections 422a, 422b the apertures 404 and the struts 406 are each parallel to a longitudinal axis of the electrode 124, 126, and within the mid-section 424 the apertures 404 and the struts 406 each have a sinusoidal wave shape.

In accordance with certain embodiments, where the catheter is intended to be inserted into a specific biological lumen, namely a renal artery, regardless of which one of the laser cut designs is used to provide the electrodes 124, 126, each of the electrodes when deployed should have an outer diameter that is at least about 0.4 inches, so that an outer periphery of the electrode when deployed comes into contact with an inner wall of the specific biological lumen (e.g., a renal artery) of most, if not all, patients in which the electrodes may be used. A benefit of the embodiment of FIG. 4D, compared to the embodiments of FIGS. 4A-4C, is that a longitudinal length of an electrode of the embodiment of FIG. 4D can be made about 20% shorter than a longitudinal length of the electrodes of the embodiments of FIG. 4A-4C. More specifically, a longitudinal length of the electrodes shown in FIGS. 4A-4C needs to be at least about 0.9 inches so that the outer diameters of the electrodes in FIGS. 4A-4C are at least about 0.4 inches when the electrodes are deployed. By contrast, with the electrode shown in FIG. 4D, a longitudinal length of the electrode shown in FIG. 4D needs to be only about 0.7 inches so that the outer diameter of the electrode is at least about 0.4 inches when the electrode is deployed. Accordingly, if both of the deployable electrodes 124 and 126 of the catheter are implemented using the embodiment shown in FIG. 4D, the portion of the catheter that includes the deployable electrodes 124 and 126 can be made about 0.4 inches shorter in length than if one of the designs of FIGS. 4A-4C were used.

The above-described electrodes 124, 126 are stronger, less expensive to manufacture, and less prone to failure than other types of deployable electrodes, such as wire mesh basket type electrodes that require numerous solder points to manufacture, making them difficult and expensive to manufacture and resulting in numerous potential points of failure due to the numerous solder points. As noted above, in accordance with certain embodiments of the present technology, each of the electrodes 124, 126 is made of a unitary Nitinol tube that is laser cut to include apertures or openings having a predetermine pattern. Nitinol, which is a metal alloy of nickel and titanium, beneficially is electrically conductive, has shape memory, and has superelasticity. It is also within the scope of the embodiments of the present technology described herein to manufacture the electrodes 124, 126 of another known or future developed alloy or material, besides Nitinol, wherein the material is electrically conductive, has shape memory, and has superelasticity.

In accordance with certain embodiments, the proximal end portion 412a of the proximal electrode 124 is mechanically connected (aka attached) to the distal end of the first tube 131, the distal end 412b of the proximal electrode 124 is both mechanically and electrically connected to the distal end of the second tube 132, and the proximal end of the second tube 132 is mechanically connected to the actuator 114 (e.g., as shown in FIG. 5A or 5B). In such an embodiment, the proximal end portion 412a of the proximal electrode 124 is held in place by the first tube 131, and the distal end 412b of the proximal electrode 124 can be moved towards the proximal end portion 412a using the actuator 114 to thereby deploy the electrode 124. The extent to which the proximal electrode 124 is deployed depends on how far the actuator 114 is slid.

In accordance with certain embodiments, the proximal end portion 412a of the distal electrode 126 is mechanically connected (aka attached) to the distal end of the third tube 133, the distal end 412b of the distal electrode 126 is both mechanically and electrically connected to the distal end of the fourth tube 134, and the proximal end of the fourth tube 134 is mechanically connected to the actuator 116 (e.g., as shown in FIG. 5A or 5B). In such an embodiment, the proximal end portion 412a of the distal electrode 126 is held in place by the third tube 133, and the distal end 412b of the distal electrode 126 can be moved towards the proximal end portion 412a using the actuator 116 to thereby deploy the electrode 126. The extent to which the distal electrode 126 is deployed depends on how far the actuator 116 is slid.

In accordance with certain embodiments, the proximal end of the first tube 131 is mechanically connected (aka attached) to the handle 112 of the catheter 102 such that the first tube 131 does not move relative to the handle. The proximal end of the second tube 132 is attached to the actuator 114, as noted above, and as will be described in additional detail below with reference to FIG. 5A, to thereby enable the actuator 114 to be used to selectively transition the proximal electrode 124 between its non-deployed and deployed positions (aka its non-expanded and expanded positions). The proximal end of the third tube 133 is attached to the actuator 118, as noted above, and as will be described in additional detail below with reference to FIG. 5A, to thereby enable the actuator 118 to be used to selectively adjust how longitudinally far apart the proximal and distal electrodes 124, 126 are from one another. The proximal end of the fourth tube 134 is attached to the actuator 116, as noted above, and as will be described in additional detail below with reference to FIG. 5A, to thereby enable the actuator 116 to be used to selectively transition the distal electrode 126 between its non-deployed and deployed positions (aka its non-expanded and expanded positions).

FIGS. 5A and 5B are, respectively, perspective and top views of a portion of the handle 112, according to an embodiment of the present technology, wherein half of an outer housing 502 of the handle 112 has been removed to show internal components of, and the internal workings of, the handle 112 and its actuators 114, 116, and 118. As shown in the FIGS. 5A and 5B, the actuator 114 includes a neck 514 that extends between a pad 516 and a support member 512, wherein the pad 516 and a portion of the neck 514 are outside the housing 502 of the handle 112, and the rest of the actuator 114 is within the housing 502 of the handle. Portions of the actuator 114, which extend from and are thereby supported by the support member 512, include a tube grip 518, a lock tooth 515, a guide 517, and the neck 514. An inner sidewall of the housing 502 includes a plurality of spaced apart teeth 520 that provide a plurality of spaced apart lock notches 521 adjacent to the slot 115 in the handle 112. The actuator 114 is biased such that the lock tooth 515 normally rests within one of the lock notches 521 to thereby hold the proximal end of the second tube 132 locked in place. The actuator 114 can be slid linearly by pressing on the pad 516, using a finger or thumb, which presses the actuator 114 inward such that the lock tooth 515 is moved away from the lock notches 521 a sufficient distance such that the actuator 114 can be moved back and forth within the slot 115 until the pad 516 is released and the lock tooth 515 moves back into one of the lock notches 521. The guide 517 rests against a portion of the inner sidewall of the housing 502, adjacent to where the teeth 520 are located, to help keep the actuator 114 centered and aligned within the slot 115. In accordance with an embodiment, a wire 522 (that is electrically connected to the coiled wire 312 of the second tube 132, or is an extended proximal portion of the coiled wire 312) is mechanically connected to an opening 513 in the support member 512, e.g., using a screw (not shown), and another wire (not shown) (or a further portion of the wire 522) extends longitudinally from the distal to proximal ends of the handle 112 to provide for an electrical connection to the cable 104 that extends from the proximal portion of the handle 112, whereby the cable 104 provides for electrical connections between the catheter 102 and an electrical control unit (ECU), and example of which is described below with reference to FIG. 7.

Still referring to FIGS. 5A and 5B, the actuator 116 includes a neck 534 that extends between a pad 536 and a support member 532, wherein the pad 536 and a portion of the neck 534 are outside the housing 502 of the handle 112, and the rest of the actuator 116 is within the housing 502 of the handle. Portions of the actuator 116, which extend from and are thereby supported by the support member 532, include a tube grip 538, a lock tooth 535, a guide 537, a longitudinal lock body 543, and the neck 534. An inner sidewall of the housing 502 includes a plurality of spaced apart teeth 540 that provide a plurality of spaced apart lock notches 541 adjacent to the slot 117 in the handle 112. The actuator 116 is biased such that the lock tooth 535 normally rests within one of the lock notches 541 to thereby hold the proximal end of the fourth tube 134 locked in place. The actuator 116 can be slid linearly by pressing on the pad 536, using a finger or thumb, which presses the actuator 116 inward such that the lock tooth 535 is moved away from the lock notches 541 a sufficient distance such that the actuator 116 can be moved back and forth within the slot 117 until the pad 536 is released and the lock tooth 535 moves back into one of the lock notches 541. The guide 537 rests against a portion of the inner sidewall of the housing 502, adjacent to where the teeth 540 are located, to help keep the actuator 116 centered and aligned within the slot 117. In accordance with an embodiment, a wire 542 (that is electrically connected to the coiled wire 312 of the fourth tube 134, or is an extended proximal portion of the coiled wire 312) is mechanically connected to an opening 533 in the support member 532, e.g., using a screw (not shown), and another wire (not shown) (or a further portion of the wire 542) extends longitudinally to the proximal end of the handle 112 to provide for an electrical connection to the cable 104 that extends from the proximal end of the handle 112, whereby the cable 104 provides for electrical connections between the catheter 102 and an ECU, and example of which is described below with reference to FIG. 7.

Still referring to FIGS. 5A and 5B, the actuator 118 includes a neck 554 that extends between a pad 556 and a support member 552, wherein the pad 556 and a portion of the neck 554 are outside the housing 502 of the handle 112, and the rest of the actuator 118 is within the housing 502 of the handle. Portions of the actuator 118, which extend from and are thereby supported by the support member 552, include a tube grip 558, a lock tooth 555 (which cannot be seen in FIGS. 5A and 5B, but can be seen in FIG. 6), a guide 557, and the neck 554. An inner sidewall of the housing 502 includes a plurality of spaced apart teeth 560 that provide a plurality of spaced apart lock notches 561 adjacent to the slot 119 in the handle 112. The actuator 118 is biased such that its lock tooth 555 normally rests within one of the lock notches 561 to thereby hold the proximal end of the third tube 133 locked in place. In accordance with an embodiment, the actuator 118 can be slid linearly by using the pad 556 to rotate the actuator 118 clockwise about ten degrees (as shown by the dashed arrowed line 559 in FIG. 5A), using a finger or thumb, which rotates the lock tooth away from the lock notches 541 a sufficient distance such that the actuator 118 can be moved back and forth within the slot 119 until the pad 556 is rotated back counterclockwise so that the lock tooth of the actuator 118 moves back into one of the lock notches 561. The guide 557 rests against a portion of the inner sidewall of the housing 502, adjacent to where the teeth 560 are located, to help keep the actuator 118 centered and aligned within the slot 119.

Figure 5C:
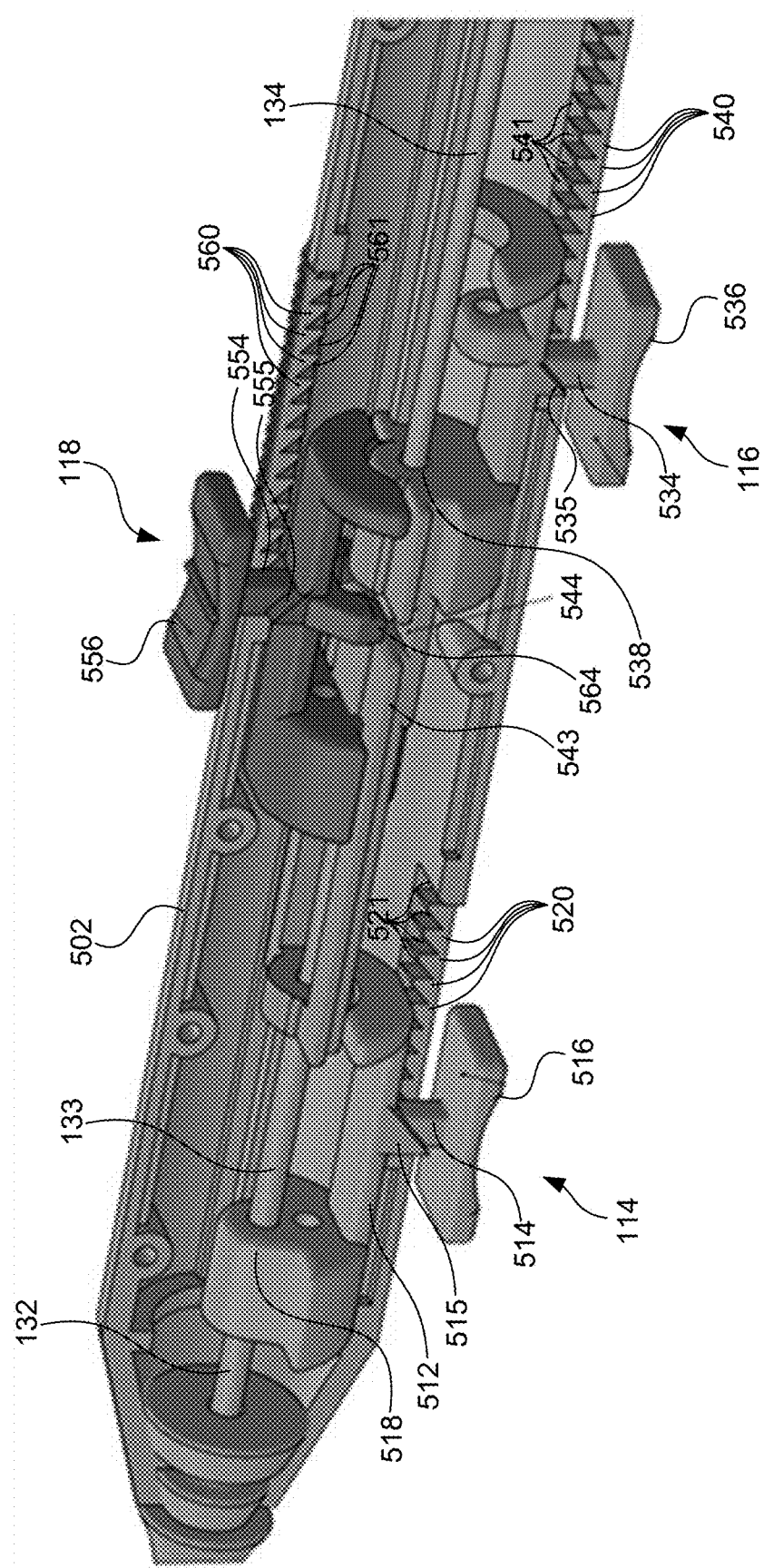
FIG. 5C is a perspective view of a portion of the handle of the catheter, according to another embodiment of the present technology, wherein half of the outer housing of the handle has been removed to show internal components of, and the internal workings of, the handle and its actuators.
Figure 6:
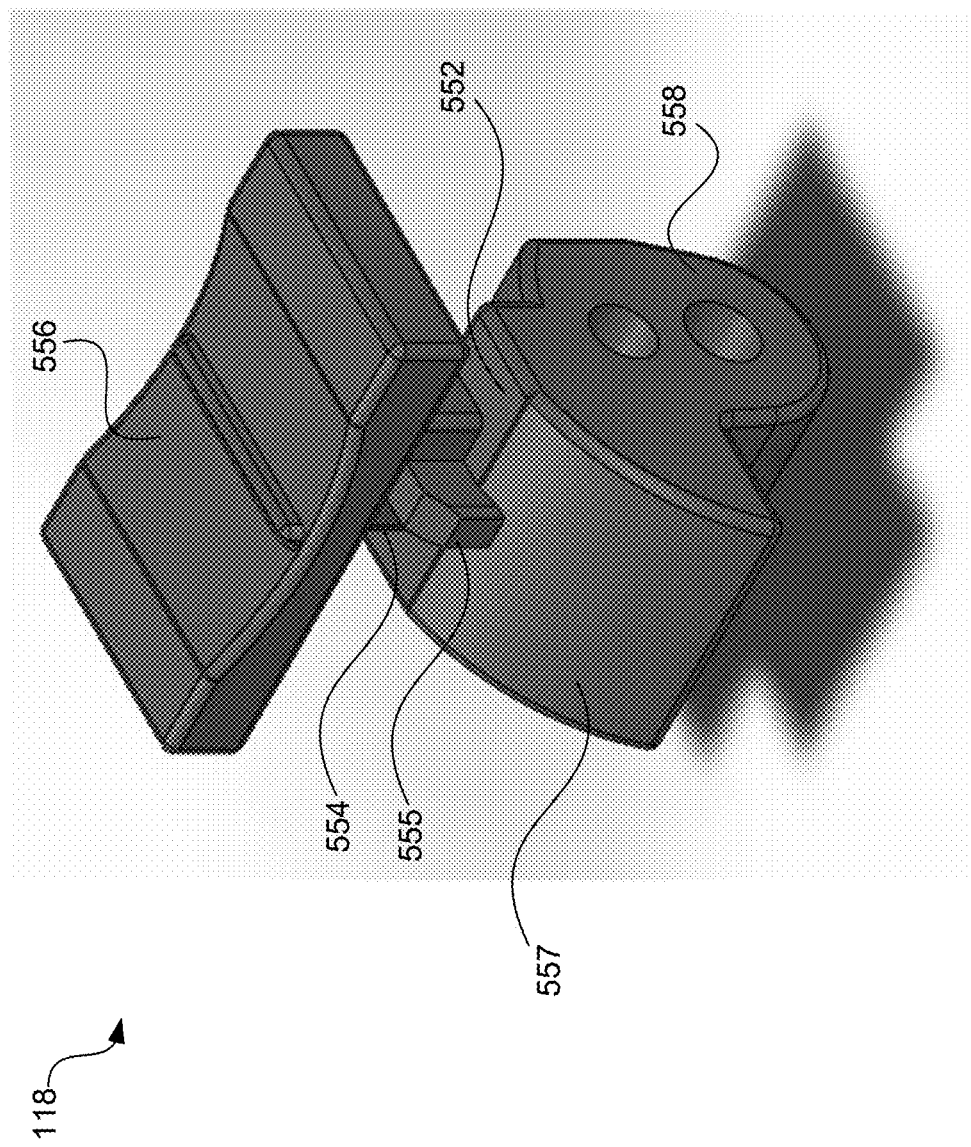
FIG. 6 is a perspective view of one of the actuators shown in FIGS. 5A and 5B.

As can be seen in FIG. 5A, when the actuator 116 is positioned in its most distal position, such that the distal electrode 126 is in its non-deployed position, a gap or detent 544 in the longitudinal lock body 543 is aligned with the neck 554 of the actuator 118, which enables the actuator 118 to be selectively rotated about ten degrees clockwise to thereby release the lock tooth 555 (shown in FIG. 6) of the actuator 118 from the lock notches 561, at which point the actuator 118 can be moved back and forth longitudinally to adjust the longitudinal distance between the electrodes 124 and 126 by moving the third tube 133, which is gripped by the tube grip 558 (shown in FIG. 6). By contrast, after the actuator 116 has been slid in the proximal direction (indicated by the arrow 146 in FIG. 1D), the gap or detent 544 is no longer aligned with the neck 554 of the actuator 118, as can be seen in FIG. 5B, which prevents the actuator 118 from being rotated to release the lock tooth of the actuator 118 from one of the lock notches 561, at which point the actuator 118 is locked in place such that the longitudinal distance between the electrodes 124 and 126 is locked in place.

FIG. 5C is a perspective view of a portion of the handle 112 of the catheter 102, according to another embodiment of the present technology, wherein half of the outer housing 502 of the handle 122 has been removed to show internal components of, and the internal workings of, the handle and its actuators 114, 116, 118. The elements in FIG. 5C that are the same as or similar to the elements in FIGS. 5A and 5B are labeled the same and need not be described again. The main difference between the embodiment shown in FIG. 5C, compared to the embodiment shown in FIGS. 5A and 5B, is the differences in longitudinal lock body 543. As can be seen in FIG. 5C, when the actuator 116 is positioned in its most distal position, such that the distal electrode 126 is in its non-deployed position, a gap or detent 544 in the longitudinal lock body 543 is aligned with a protrusion 564 of the actuator 118, which enables the actuator 118 to be selectively pressed (using a finger or thumb the presses on the pad 556), which releases the lock tooth 555 from the lock notches 561, at which point the actuator 118 can be moved back and forth longitudinally to adjust the longitudinal distance between the electrodes 124 and 126 by moving the third tube 133, which is gripped by the tube grip 558 (which cannot be seen in FIGS. 5C). By contrast, after the actuator 116 has been slid in the proximal direction (indicated by the arrow 146 in FIG. 1D), the gap or detent 544 is no longer aligned with the protrusion 564 of the actuator 118, which prevents the actuator 118 from being pressed to release the lock tooth 555 of the actuator 118 from the lock notches 561, at which point the actuator 118 is locked in place such that the longitudinal distance between the electrodes 124 and 126 is locked in place. In certain embodiments, the actuator 118 is locked in place, thereby preventing the longitudinal distance between the proximal and distal electrodes 124 and 126 from being adjusted, while one of the proximal and distal electrodes 124 and 126 is deployed. One of ordinary skill in the art, after reading this disclosure, would appreciate that alternative configurations for locking the actuator 118 in place, once a specific one of the electrodes 124, 126 has been deployed, are also possible and are within the scope of the embodiments described herein.

In the embodiments described above, the shaft 122 was shown and described as including four nested and concentric tubes, labeled 131, 132, 133, and 134. In alternative embodiments the shaft 122 can include more or less than four nested and concentric tubes. For example, in certain embodiments there can also be a fifth tube (not shown). More specifically, in one example alternative embodiment, the shaft 122 includes five nested and concentric tubes, wherein the fifth tube (not shown) is static relative to the handle 112, has an inner diameter that is greater than the outer diameter of the first tube 131, and surrounds the first tube 131. In such an embodiment, the fourth tube 134 is also static relative to the handle 112, a proximal portion of the first tube 131 is coupled to the actuator 114, a proximal portion of the second tube 132 is coupled to the actuator 118, and a proximal portion of the third tube 133 is coupled to the actuator 116. Similar to the other embodiments described above, the actuator 114 is used to selectively deploy the electrode 124, the actuator 116 is used to selectively deploy the electrode 126, and the actuator 118 is used to adjust the longitudinal distance between the electrodes 124 and 126. Other variations are also possible and within the scope of the embodiments described herein, as would be appreciated by one of skill in the art reading this disclosure.

FIG. 7 is a high level block diagram of an electrical control unit (ECU) 702 that is configured to be in electrical communication with a catheter, such as the catheter 102 described above. The ECU 702, and the catheter (e.g., 102) to which the ECU 702 is electrically coupled via a cable (e.g., 104), can be referred to more generally as a system 700. The ECU 702 can process a received signal to produce an output signal, and present information including information about the output signal, the received signal, or processing information. Such a system can be used, for example, in diagnostic procedures for assessing the status of a patient's nervous activity proximate a biological lumen, such as a vein or an artery, e.g., a renal artery, or another type of blood vessel.

The ECU 702 includes a stimulator 706 electrically coupled to the electrodes 124 and 126 of the catheter 102. The stimulator 706, which is part of a STIM circuit or subsystem, can selectively emit electrical signals (including stimulation pulses) having a specific voltage, amperage, duration, and/or frequency of application that will cause nerve cell activation. In the configuration shown, the distal electrode 126 is connected as the stimulation anode and the proximal electrode 124 is connected as the stimulation cathode. Alternatively, the proximal electrode 124 can be connected as the stimulation anode and the distal electrode 126 can be connected as the stimulation cathode. Upon receiving the stimulation signal produced by the stimulator 706, the stimulating electrodes of the catheter 102, i.e., 126 and 124 in this example, can apply electrical energy to a patient's nerves through the biological lumen wall based on the received signal. Such stimulus can have any of a variety of known waveforms, such as a sinusoid, a square wave form or a triangular wave form, but is not limited thereto. In various examples, the stimulation can be applied for durations between approximately 0.05 milliseconds (msec) and approximately 2 msec.

In some configurations, the stimulation of nerves to evoke an elicited potential can cause such a potential to propagate in every direction along the nerve fibers. In some situations, it can be undesirable for such a potential to propagate unnecessarily through the nerve for patient safety and/or desired signal isolation purposes. In some configurations, the propagation of elicited action potentials can be "blocked" by applying an electrical signal to a portion of the nerve. Accordingly, in some embodiments, a catheter (e.g., 102) can include one or more electrodes configured to reduce or eliminate an elicited potential from propagating undesirably. For example, the catheter 102 can include a third stimulating electrode (e.g., a proximal ring electrode 128 located on the first tube 131, e.g., as shown in FIGS. 1A-2D), which is not deployable, that can function as a second anode coupled with the deployable anode electrode (e.g., 126). The cathode (e.g., 124) is positioned between the anode (e.g., 126) and this third electrode (e.g., 128). During the application of a stimulation signal, a blocking stimulation pulse can be applied via the third stimulating electrode to prevent elicited action potentials from travelling proximally along the patient's nerves while permitting the action potential to propagate toward the electrodes that are used to sense the evoke response.

In some embodiments, the ECU 702 can digitally sample the signal sensed using the electrodes 124 and 126 (and optionally also the 128, or some other electrode) to receive the electrical signal from the catheter. In alternate embodiments, the signal can be recorded as an analog signal. When receiving an electrical signal from the electrodes on the catheter 102, the ECU 702 can perform filtering and/or other processing steps on the signal. Generally, such steps can be performed to discriminate the signal from the catheter from any background noise within the patient's vasculature such that the resulting output is predominantly the signal from nerve cell activation. In some instances, the ECU 702 can modulate the electrical impedance of the signal receiving portion in order to accommodate the electrical properties and spatial separation of the electrodes mounted on the catheter in a manner to achieve the highest fidelity, selectively and resolution for the signal received. For example, electrode size, separation, and conductivity properties can impact the field strength at the electrode/tissue interface.

Additionally or alternatively, the ECU 702 can comprise a headstage and/or an amplifier to perform any of offsetting, filtering, and/or amplifying the signal received from the catheter. In some examples, a headstage applies a DC offset to the signal and performs a filtering step. In some such systems, the filtering can comprise applying notch and/or band-pass filters to suppress particular undesired signals having a particular frequency content or to let pass desired signals having a particular frequency content. An amplifier can be used to amplify the entire signal uniformly or can be used to amplify certain portions of the signal more than others. For example, in some configurations, the amplifier can be configured to provide an adjustable capacitance of the recording electrode, changing the frequency dependence of signal pick-up and amplification. In some embodiments, properties of the amplifier, such as capacitance, can be adjusted to change amplification properties, such as the resonant frequency, of the amplifier.

In the illustrated embodiment of FIG. 7, the ECU 702 includes an amplifier 712 including a non-inverting (+) input terminal, an inverting (−) input terminal, a power supply input terminal, and a ground or reference terminal. As can be appreciated from FIG. 7, the non-inverting (+) input terminal is electrically coupled to the electrode 126, the inverting (−) input terminal is electrically coupled to the electrode 124, the power supply input terminal is electrically coupled to a voltage source (e.g., a reference voltage generator), and the ground or reference terminal is electrically coupled to the electrode 128. Alternatively, the non-inverting (+) input terminal can be electrically coupled to the electrode 124, the inverting (−) input terminal is electrically coupled to the electrode 126. It is also possible that the ground or reference terminal of the amplifier 712 be connected to some other ring or tip electrode on the catheter 102, or to a reference electrode that is located on a distal end of an introducer or that is located on the skin of the patient, but is not limited thereto.

In some embodiments, the ECU 702 can include a switching network configured to interchange which of electrodes of a catheter (e.g., 102) are coupled to which portions of the ECU. In some such embodiments, a user can manually switch which inputs receive connections to which electrodes of the catheter 102. Such configurability allows for a system operator to adjust the direction of propagation of the elicited potential as desired. For example, the switching network, or more generally switches, can be used to connect the electrodes 124 and 126 to the stimulator during a period of time during which stimulation pulses are to be emitted by the catheter 102, and the switches can then be used to connect the electrodes 124 and 126 to the amplifier 712 during a period of time during which the elicited response to the stimulation pulses are to be sensed.

The amplifier 712 can include any appropriate amplifier for amplifying desired signals or attenuating undesired signals. In some examples, the amplifier has a high common-mode rejection ratio (CMRR) for eliminating or substantially attenuating undesired signals present in each at each of the electrodes 124 and 126. In some embodiments, the amplifier 712 can be adjusted, for example, via an adjustable capacitance or via other attributes of the amplifier.

In the example system 700 of FIG. 7, the ECU 702 further includes a filter 714 for enhancing the desired signal in the signal received via the electrodes 124 and 126. The filter 714 can include a band-pass filter, a notch filter, or any other appropriate filter to isolate desired signals from the received signals. In some embodiments, various properties of the filter 714 can be adjusted to manipulate its filtering characteristics. For example, the filter may include an adjustable capacitance or other parameter to adjust its frequency response.

At least one of amplification and filtering of the signal received at the electrodes 124 and 126 can allow for extraction of the desired signal at 716. In some embodiments, extraction 716 comprises at least one additional processing step to isolate desired signals from the signal sensed using the electrodes 124 and 126 such as preparing the signal for output at 718. In some embodiments, the functionalities of any combination of amplifier 712, filter 714, and extraction 716 may be combined into a single entity. For instance, the amplifier 712 may act to filter undesired frequency content from the signal without requiring additional filtering at a separate filter.

In some embodiments, the ECU 702 can record emitted stimuli and/or received signals. Such data can be subsequently stored in permanent or temporary memory 720. The ECU 702 can comprise such memory 720 or can otherwise be in communication with external memory (not shown). Thus, the ECU 702 can be configured to emit stimulus pulses to electrodes of the catheter, record such pulses in a memory, receive signals from the catheter, and also record such received signal data. The memory 720 in or associated with the ECU 702 can be internal or external to any part of the ECU 702 or the ECU 702 itself.

The ECU 702 or separate external processor can further perform calculations on the stored data to determine characteristics of signals either emitted or received via the catheter. For example, in various embodiments, the ECU 702 can determine any of the amplitude, duration, or timing of occurrence of the received or emitted signals. The ECU 702 can further determine the relationship between the received signal and the emitted stimulus signal, such as a temporal relationship therebetween. In some embodiments, the ECU 702 performs signal averaging on the signal data received from the catheter. Such averaging can act to reduce random temporal noise in the data while strengthening the data corresponding to any elicited potentials received by the catheter.

Averaging as such can result in a signal in which temporally random noise is generally averaged out and the signal present in each recorded data set, such as elicited potentials, will remain high. In some embodiments, each iteration of the process can include a synchronization step so that each acquired data set can be temporally registered to facilitate averaging the data. That is, events that occur consistently at the same time during each iteration may be detected, while temporally random artifacts (e.g., noise) can be reduced. In general, the signal to noise ratio (SNR) resulting in such averaging will improve by the square root of the number of samples averaged in order to create the averaged data set.

The ECU 702 can further present information regarding any or all of the applied stimulus, the signal, and the results of any calculations to a user of the system, e.g., via output 718. For example, the ECU 702 can generate a graphical display providing one or more graphs of signal strength vs. time representing the stimulus and/or the received signal.

In some embodiments, the ECU 702 can include a controller 722 in communication with one or both of stimulator 706 and SENS subsystem 710. The controller 722 can be configured to cause stimulator 706 to apply a stimulation signal to a catheter, e.g., the catheter 102. Additionally or alternatively, the controller 722 can be configured to analyze signals received and/or output by the SENS subsystem 710. In some embodiments, the controller 722 can act to control the timing of applying the stimulation signal from stimulator 706 and the timing of receiving signals by the SENS subsystem 710. The controller 722 can be implemented, e.g., using one or more processors, field programmable gate arrays (FPGAs), state machines, and/or application specific integrated circuits (ASICs), but is not limited thereto.

Example electrical control units have been described. In various embodiments, the ECU 702 can emit stimulus pulses to the catheter 102, receive signals from the catheter 102, perform calculations on the emitted and/or received signals, and present the signals and/or results of such calculations to a user. In some embodiments, the ECU 702 can comprise separate modules for emitting, receiving, calculating, and providing results of calculations. Additionally or alternatively, the functionality of controller 722 can be integrated into the ECU 702 as shown, or can be separate from and in communication with the ECU.

The catheter 102, according to an embodiment of the present technology, is configured to be introduced into a biological lumen, such as an artery, in a location near a body organ, such as a kidney. The catheter 102 can be introduced via a sheath that is advanced to the intended catheter location in the biological lumen, and then withdrawn sufficiently to expose the shaft 122 to the biological lumen (e.g., renal artery). Once the shaft 122 is within the biological lumen, one of the electrodes 124, 126 can be deployed (aka expanded) using one of the actuators 114, 116 such that it is in contact with a portion of a circumferential interior wall of the biological lumen. The longitudinal distance between the electrodes 124 and 126 can then be adjusted, if desired, using the actuator 118. The other one of the electrodes 124, 126 can then be deployed (aka expanded) such that it is in contact with another portion of the circumferential interior wall of the biological lumen.

For example, where the catheter is inserted into a renal artery close to a kidney, the electrodes can be positioned near a nerve bundle that connects the kidney to the central nervous system, as the nerve bundle tends to approximately follow the artery leading to most body organs. The nerve bundle tends to follow the artery more closely at the end of the artery closer to the kidney, while spreading somewhat as the artery expands away from the kidney. As a result, it is desired in some examples that the catheter shaft 122 is small enough to introduce relatively near the kidney or other organ, as nerve proximity to the artery is likely to be higher nearer the organ.

Once the catheter 102 is in place, a practitioner can use instrumentation (e.g., the ECU 702) coupled to the electrodes 124, 126 to stimulate the nerve, and monitor for nerve response signals used to characterize the nervous system response to certain stimulus. In some embodiments, an ablation element (not shown) is included in or on the shaft and configured to ablate nerve tissue, such as by using radio frequency, microwave, cryotherapy, ultrasound, or other energy, such that the catheter can actively stimulate the nerve and sense resulting neural signals in between applications of energy via the ablation element, enabling more accurate control of the degree and effects of nerve ablation. In other examples, a catheter 102 lacking an ablation element can be removed via the sheath, and an ablation probe inserted, with the ablation probe removed and the catheter 102 reinserted to verify and characterize the effects of the ablation probe.

FIG. 8A shows a catheter 802 according to another embodiment of the present technology, including a handle 812 and a shaft 822 with two selectively deployable electrodes 126, 124 in their non-deployed positions, and a transducer 811 within a balloon 813. FIG. 8B shows the catheter 802, which was introduced in FIG. 8A, with both of its two selectively deployable electrodes 126, 124 in their deployed positions, and a minimum longitudinal distance between the two selectively deployable electrodes 126, 124. Elements in FIGS. 8A and 8B that are the same or similar to those described above with reference to FIGS. 1A-1D, etc., are labeled the same and need not be described again. The transducer 811 is an example of an ablation element that is included on the distal end of catheter 802 and configured to ablate nerve tissue, such as by using radio frequency, microwave, cryotherapy, ultrasound, or other energy or by using chemically ablative means. Accordingly, the catheter 802 can actively stimulate a nerve and sense resulting neural signals in between applications of energy or other ablative means via the transducer 811 or other ablative element, enabling accurate control of the degree and effects of nerve ablation. For much of the below discussion, it is assumed that the transducer 811 is an ultrasound transducer that can be activated to deliver unfocused ultrasonic energy radially outwardly so as to suitably heat, and thus treat, tissue within the target anatomical region. The transducer 811 can be activated at a frequency, duration, and energy level suitable for treating the targeted tissue. In one nonlimiting example, the unfocused ultrasonic energy generated by the transducer 811 may target select nerve tissue of the subject, and may heat such tissue in such a manner as to neuromodulate (e.g., fully or partially ablate, necrose, or stimulate) the nerve tissue.

In accordance with certain embodiments, the transducer 811 includes a piezoelectric transducer body that comprises a hollow tube of piezoelectric material having an inner surface and an outer surface, with an inner electrode disposed on the inner surface of the hollow tube of piezoelectric material, and an outer electrode disposed on the outer surface of the hollow tube of piezoelectric material. In such embodiments, the hollow tube of piezoelectric material is an example of the piezoelectric transducer body. The hollow tube of piezoelectric material, or more generally the piezoelectric transducer body, can be cylindrically shaped and have a circular radial cross-section. However, in alternative embodiments the hollow tube of piezoelectric material can have other shapes besides being cylindrical with a circular radial cross-section. Other cross-sectional shapes for the hollow tube of piezoelectric material, and more generally the piezoelectric transducer body, include, but are not limited to, an oval or elliptical cross-section, a square or rectangular cross-section, pentagonal cross-section, a hexagonal cross-section, a heptagonal cross-section, an octagonal cross-section, and/or the like. The hollow tube of piezoelectric material, and more generally the piezoelectric transducer body, can be made from various different types of piezoelectric material, such as, but not limited to, lead zirconate titanate (PZT), polyvinylidene fluoride (PVDF), or other presently available or future developed piezoelectric ceramic materials. In other embodiments, the transducer 811 can be made of other materials and/or can have other shapes.

In certain embodiments, the transducer 811 is an ultrasound transducer configured to deliver acoustic energy in the frequency range of 8.5 to 9.5 MHz. In other embodiments, the ultrasound transducer 811 is configured to deliver acoustic energy in the frequency range of 6 MHz to 20 MHz, e.g., 10 MHz or 12 MHz. The piezoelectric transducer body is configured to generate ultrasonic waves in response to a voltage being applied between the inner and outer electrodes. One or both of the inner and outer electrodes is covered by an electrical insulator to inhibit (and preferably prevent) a short circuit from occurring between the inner and outer electrodes when the ultrasound transducer is placed within the electrically conductive fluid and a voltage is applied between the inner and outer electrodes. Such an electrical insulator can be parylene, and more specifically, a parylene conformal coating, but is not limited thereto. An excitation source (e.g., 1026 in FIG. 10) may be electrically coupled to inner and outer electrodes of the transducer 811, and may actuate the transducer 811 by applying a voltage between the inner and outer electrodes (or any other pair of electrodes), so as to cause the piezoelectric material of the piezoelectric transducer body to generate an unfocused ultrasonic wave that radiates radially outwardly.

In accordance with certain embodiments, the third tube 133 includes first and second coiled wires that are spaced apart from one another or are otherwise electrically insulated from one another. Such coiled wires, which can be similar to the coiled wire 312 discussed above with reference to FIGS. 3A and 3B, can provide structural support for the tube 133, and can also provide an electrically conductive path between the inner and outer electrodes of the transducer 811 and an excitation source (e.g., 1026 in FIG. 10) of an electrical control unit (ECU) (e.g., 1002 in FIG. 10), without requiring that any wires be threaded through a hollow lumen of the tube 133. More generally, in accordance with certain embodiments, a transducer (e.g., 811) is physically coupled to one of the plurality of tubes (e.g., 131, 132, 133 or 134) and configured to emit a neuromodulation signal (e.g., an ultrasound signal) in response to a voltage being applied between first and second electrodes of the transducer. In certain such embodiments, the one of the plurality of tubes, to which the transducer is physically coupled, includes first and second electrically conductive coils extending between proximal and distal ends of the one of the plurality of tubes, wherein the first and second electrically conductive coils are electrically coupled, respectively, to the first and second electrodes of the transducer to thereby enable the voltage to be applied between the first and second electrodes of the transducer.

In FIGS. 8A and 8B, the transducer 811 is shown as being disposed within a balloon 813 that can be filled with a fluid before and during treatment, such that the fluid can be used to cool the transducer during activations (e.g., sonications), as well as cool a body lumen with which the balloon is in contact. In an alternative embodiment (not shown), the transducer 811 may be exposed directly to the bloodstream, without a surrounding balloon, in what may be referred to as a balloonless embodiment. For much of the below discussion, it is assumed that the transducer 811 is disposed within the balloon 813. The balloon 813 can be made, e.g., from nylon, a polyimide film, a thermoplastic elastomer (such as those marked under the trademark PEBAX™), a medical-grade thermoplastic polyurethane elastomers (such as those marketed under the trademark PELLETHANE™), pellethane, isothane, or other suitable polymers or any combination thereof, but is not limited thereto.

In certain embodiments, described in further detail below, a fluid is circulated between a fluid supply subsystem and the balloon 813. Such a fluid supply subsystem can include, e.g., a pressure syringe and a vacuum syringe. The handle 812 of the catheter 802 is shown as including a fluidic inlet port 834a and a fluidic outlet port 834b. The fluid (e.g., expelled from a pressure syringe) enters a fluid lumen (in the catheter shaft 822), via the fluidic inlet port 834a of the catheter 802, and then enters and at least partially fills the balloon 813. Simultaneously, fluid is drawn from the balloon 813 (e.g., using a vacuum syringe) through another fluid lumen (in the catheter shaft 822) and out the fluidic outlet port 834b of the catheter 802. In this manner, the fluid can be circulated through the balloon 813.

Figure 9B:
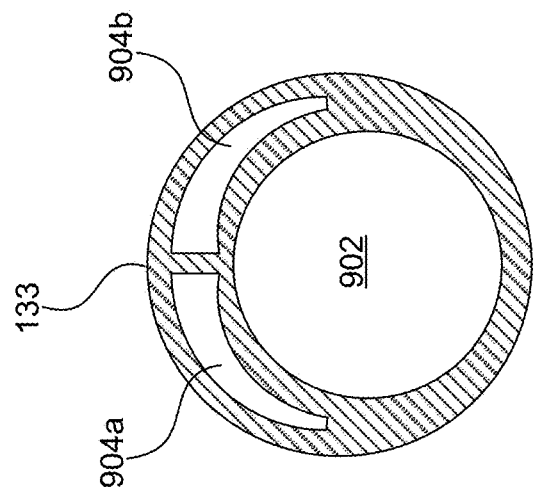
FIGS. 9A and 9B illustrate example cross-sections of a tube to which a transducer and a balloon can be physically coupled, wherein the tube includes a hollow lumen configured to receive at least a portion of another one of the tubes extending therethrough, as wells as hollow lumens configured to provide the cooling fluid to and from the balloon so that the cooling fluid can be circulated through the balloon.
Figure 9A:
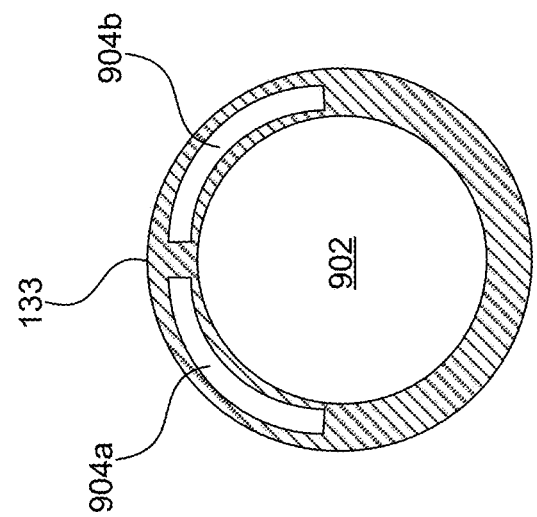

In accordance with certain embodiments, the aforementioned fluid lumens in the catheter 802 are provided by the third tube 133. Example cross-sections of the third tube 133, according to certain embodiments of the present technology, are shown in FIGS. 9A and 9B. Referring to FIG. 9A, the third tube 133 is shown as including a main lumen 902 having a circular cross-section, and smaller lumens 904a, 904b. A portion of a length of the fourth tube 134 extends through the main lumen 902 of the third tube 133 (as well as through lumens of the first and second tubes 131,132). In order to enable the fluid to be circulated through the balloon 813, the lumen 904a is fluidically coupled to the fluidic inlet port 834a (shown in FIG. 8) to enable fluid (e.g., expelled from a pressure syringe) to be provided to and at least partially fill the balloon 813 (shown in FIG. 8), and the lumen 904b is fluidically coupled to the fluidic outlet port 834b (shown in FIG. 8) to enable cooling fluid to be drawn from the balloon 813 (e.g., using a vacuum syringe). FIG. 9B shows alternative cross-sections for the lumens 902, 904b, and 904a of the third tube 133. Other variations are also possible and within the scope of the embodiments described herein. More generally, in accordance with certain embodiments, a balloon (e.g., 813) is physically coupled to the one of the plurality of tubes and surrounds the transducer, wherein the balloon is configured to receive a cooling fluid. In certain such embodiments, the one of the plurality of tubes, to which the transducer and the balloon are physically coupled, includes first, second, and third hollow lumens. The first hollow lumen has a circular cross-section and is configured to receive at least a portion of another one of the tubes extending therethrough. The second and third hollow lumens are configured to provide the fluid to and from the balloon so that the fluid can be circulated through the balloon.

Figure 10:
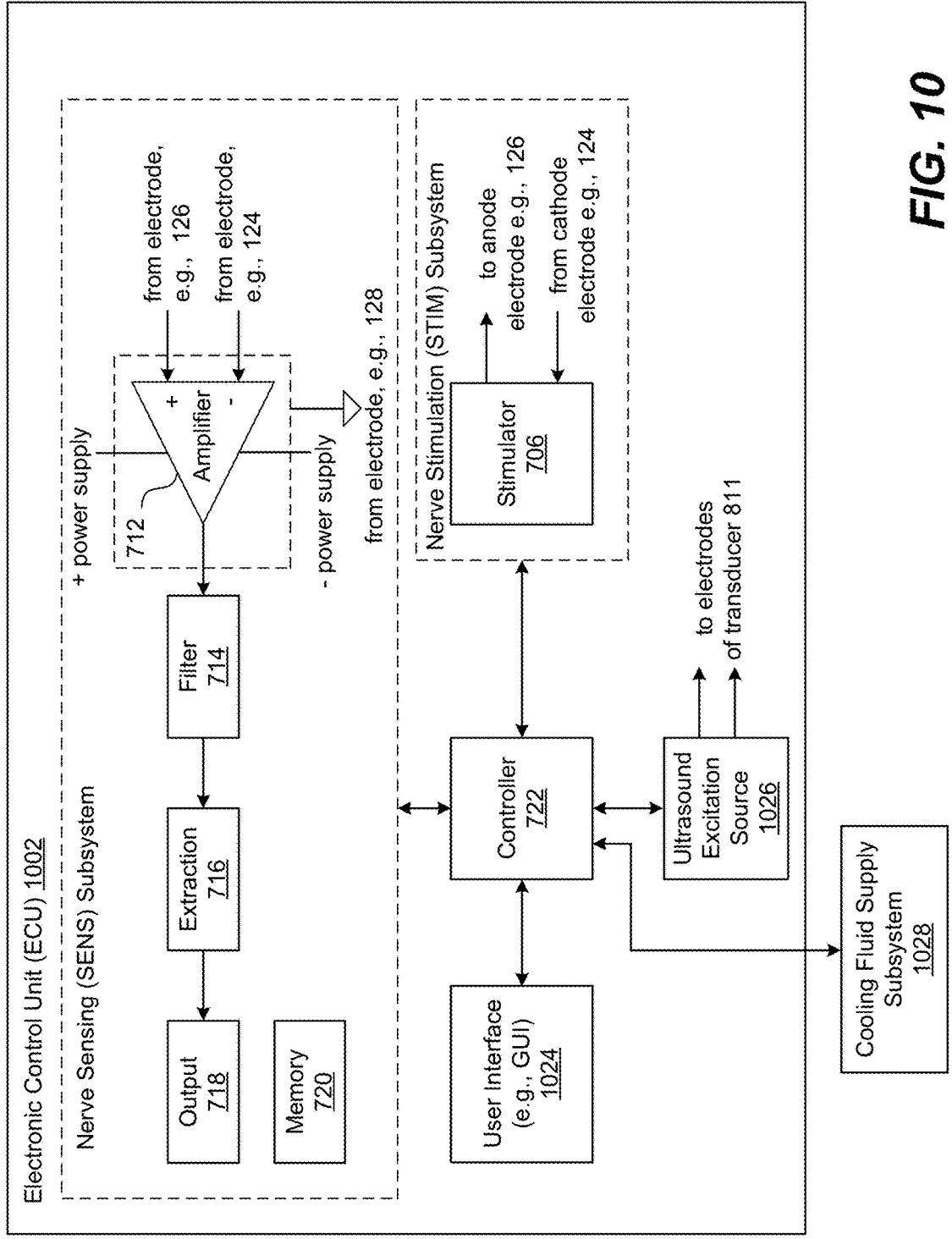
FIG. 10 is a schematic diagram of an example system, according to another embodiment of the present technology, for interfacing with and providing treatment to a patient's arterial nerves.

FIG. 10 is a high-level block diagram of an ECU 1002 that is configured to be in electrical communication with a catheter, such as the catheter 802 described above. The ECU 1002, the catheter (e.g., 802) to which the ECU 1002 is electrically coupled, and a cooling fluid subsystem 1028 can be referred to more generally as a system 1000. Elements in FIG. 10 that are the same or similar to those described above with reference to FIG. 7, are labeled the same and need not be described again. The ECU 1002 includes a SENS subsystem and a STIM subsystem, as was also the case with the ECU 702 described above with reference to FIG. 7. The ECU 1002 also includes an ultrasound excitation source 1026, and a user interface 1024. In FIG. 10, the controller 722 is also shown as being communicatively coupled to a cooling fluid supply subsystem 1028. Such a system 1000 can be used, for example, in both diagnostic procedures and treatment procedures. The diagnostic procedures can be used for assessing the status of a patient's nervous activity proximate a biological lumen, such as a vein or an artery, e.g., a renal artery, or another type of blood vessel. The treatment procedures can be used to neuromodulate (e.g., fully or partially ablate, necrose, or stimulate) the nerve tissue that surrounds such a biological lumen.

The user interface 1024 interacts with the controller 722 (and more specifically, e.g., a processor thereof) to cause transmission of electrical signals at selected actuation frequencies to the transducer 811. As explained above, in accordance with certain embodiments, the third tube 133 includes first and second coiled wires that are spaced apart from one another or are otherwise electrically isolated from one another. Such wires can electrically couple the transducer 811 to the excitation source 1026 of the ECU 1002, to thereby enable the controller 722 to control the excitation source 1026 to control the amplitude and timing of the electrical signals so as to control the power level and duration of the ultrasound signals emitted by transducer 811. More generally, the controller 722 can control one or more ultrasound treatment parameters that are used to perform sonication. In certain embodiments, the SENS subsystem can also detect electrical signals generated by transducer 811 and communicate such signals to the controller 722. While the ultrasound excitation source 1026 in FIG. 10 is shown as being part of the ECU 1002, it is also possible that the ultrasound excitation source 1026 is external to the ECU 1002 while still being controlled by the controller 722. It is also noted that a different type of transducer can be used, such as, but not limited to, a radio frequency (RF) or microwave transducer, in which cases a different excitation source 1026 may be used.

The user interface 1024 can include a touch screen and/or buttons, switches, etc., to allow for an operator (aka user) to enter patient data, select a treatment parameters, view records stored on a storage/retrieval unit (not shown), and/or otherwise communicate with the controller 722. The user interface 1024 can include a voice-activated mechanism to enter patient data or may be able to communicate with additional equipment so that control of the controller 722 is through a separate user interface, such as a wired or wireless remote control. In some embodiments, the user interface 1024 is configured to receive operator-defined inputs, which can include, e.g., a duration of energy delivery, one or more other timing aspects of the energy delivery pulses (e.g., frequency, duty cycle, etc.), power, and/or mode of operation, or a combination thereof. Example modes of operation can include (but are not limited to): system initiation and set-up, catheter preparation, balloon inflation, verification of balloon apposition, pre-cooling, sonication, post-cooling, balloon deflation, and catheter removal, but are not limited thereto. In certain embodiments, the user interface 1024 provides a graphical user interface (GUI) that instructs a user how to properly operate the system 1000. The user interface 1024 can also be used to process and/or display treatment data for review and/or download, as well as to allow for software updates, and/or the like.

Figure 11:
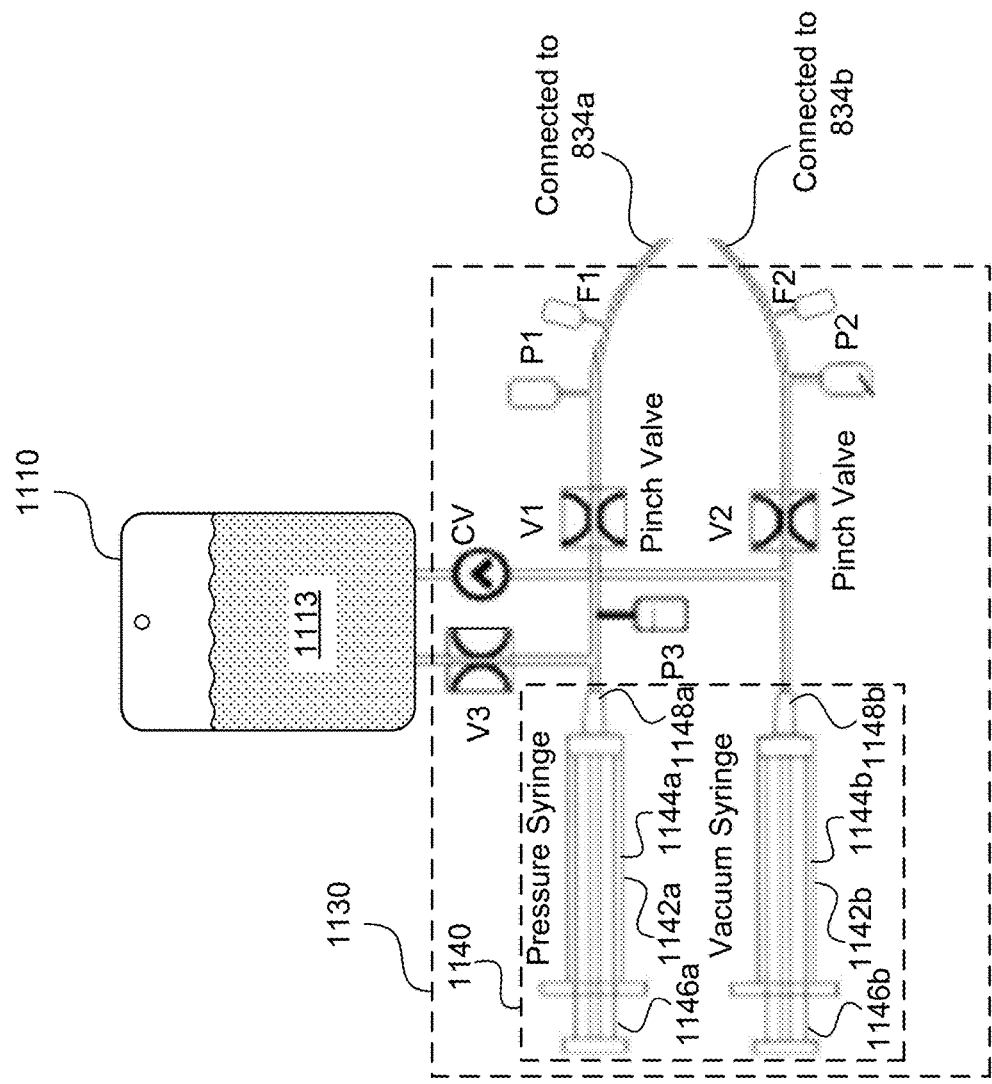
FIG. 11 illustrates example details of a cooling fluid supply subsystem introduced in FIG. 10.

The controller 722 can also control a cooling fluid supply subsystem 1028, which can include a cartridge and a reservoir, which are described below with reference to FIG. 11, but can include alternative types of fluid pumps, and/or the like. The cooling fluid supply subsystem 1028 is fluidically coupled to one or more fluid lumens (e.g., 904a, 904b, in FIGS. 9A, 9B) within the catheter shaft 822 which in turn are fluidically coupled to the balloon 813. The cooling fluid supply subsystem 1028 can be configured to circulate a cooling liquid through the catheter 822 to the transducer 811 in the balloon 813.

Example details of the cooling fluid supply subsystem 1028, which were introduced above in the above discussion of FIG. 10, will now be described with reference to FIG. 11. Referring to FIG. 11, the cooling fluid supply subsystem 1028 is shown as including a cartridge 1130 and the reservoir 1110. The reservoir 1110 is shown as being implemented as a fluid bag, which can be the same or similar to an intravenous (IV) bag in that it can hang from a hook, or the like. The reservoir 1110 and the cartridge 1130 can be disposable and replaceable items.

The reservoir 1110 is fluidically coupled to the cartridge 1130 via a pair of fluidic paths, one of which is used as a fluid outlet path (that provides fluid from the reservoir to the cartridge), and the other one of which is used as a fluid inlet path (the returns fluid from the cartridge to the reservoir). The cartridge 1130 is shown as including a syringe pump 1140, which includes a pressure syringe 1142a and a vacuum syringe 1142b. The pressure syringe 1142a includes a barrel 1144a, a plunger 1146a, and a hub 1148a. Similarly, the vacuum syringe 1142b includes a barrel 1144b, a plunger 1146b, and a hub 1148b. The hub 1148a, 1148b of each of the syringes 1142a, 1142b is coupled to a respective fluid tube or hose. The cartridge 1130 is also shown as including pinch valves V1, V2 and V3, pressure sensors P1, P2, and P3, and a check valve CV. While not specifically shown in FIG. 11, the syringe pump 1140 can include one or more gears and step-motors, and/or the like, which are controlled by the controller 722 (in FIG. 10) to selectively maneuver the plungers 1146 of the pressure syringe 1142a and the vacuum syringe 1142b. Alternatively, the gear(s) and/or step-motor(s) can be used to control the syringe pump 1140.

In order to at least partially fill the barrel of the pressure syringe 1142a with a portion of the cooling fluid that is stored in the reservoir 1110, the pinch valves V1 and V2 are closed, the pinch valve V3 is opened, and the plunger 1146a of the pressure syringe 1142a is pulled upon to draw cooling fluid 1113 into the barrel 1144a of the of the pressure syringe 1142a. The pinch valve V3 is then closed and the pinch valves V1 and V2 are opened, and then the plunger 1146a of the pressure syringe 1142a is pushed upon to expel cooling fluid from the barrel 1144a of the pressure syringe 1142a through the fluid tube attached to the hub 1148a of the pressure syringe 1142a. The cooling fluid expelled from the pressure syringe 1142a enters a fluid lumen (e.g., 904a in the catheter shaft 822), via the fluidic inlet port 834a of the catheter 802, and then enters and at least partially fills the balloon 813. Simultaneously, the plunger 1146b of the vacuum syringe 1142b can be pulled upon to pull or draw cooling fluid from the balloon 813 into a fluid lumen (e.g., 904b in the catheter shaft 822), through the fluidic outlet port 834b of the catheter 802, and then through fluid tube attached to the hub 1148b of the vacuum syringe 1142b and into the barrel 1144b of the vacuum syringe 1142b. In this manner, the cooling fluid can be circulated through the balloon 813. The balloon 813 can be inflated by supplying more cooling fluid to the balloon than is removed from the balloon. One or more of the pressure sensors P1, P2, and P3 can be used to monitor the pressure in the balloon 813 to achieve a target balloon pressure, e.g., of 10 pounds per square inch (psi), but not limited thereto. Once the balloon 813 is inflated to a target pressure, e.g., 10 psi, and/or size, the cooling fluid can be circulated through the balloon 813 without increasing or decreasing the amount of fluid within the balloon by causing the same amount of fluid that is removed from the balloon 813 to be the same as the amount of fluid that is provided to the balloon 813. Also, once the target balloon pressure is reached, the ultrasound transducer 811 can be excited to emit ultrasound energy to treat tissue that surrounds the portion of the body lumen (e.g., a portion of a renal artery) in which the balloon 813 and the transducer 811 are inserted. When the ultrasound transducer 811 is emitting ultrasound energy it can also be said that the ultrasound transducer 811 is performing sonication, or that sonication is occurring. During the sonication, cooling fluid should be circulated through the balloon 813 by continuing to push on the plunger 1146a of the pressure syringe 1142a and continuing to pull on the plunger 1146b of the vacuum syringe 1142b.

After the sonication is completed, and the balloon 813 is to be deflated so that the catheter 822 can be removed from the body lumen, the cooling fluid should be returned from the barrel 1144b of the vacuum syringe 1142b to the reservoir 1110. In order to return the cooling fluid from the barrel 1144b of the vacuum syringe 1142b to the reservoir 1110, the pinch valves V1, V2, and V3 are all closed, and the plunger 1146b of the vacuum syringe 1142b is pushed on to expel the cooling fluid out of the barrel of the vacuum syringe 1142b, past the check valve CV, and into the reservoir 1110.

The pressure sensors P1, P2, and P3 can be used to monitor the fluidic pressure at various points along the various fluidic paths within the cartridge 1130, which pressure measurements can be provided to the controller 722 as feedback that is used for controlling the syringe pump 1140 and/or for other purposes, such as, but not limited to, determining the fluidic pressure within the balloon 813. Additionally, flow rate sensors F1 and F2 can be used, respectively, to monitor the flow rate of the cooling fluid that is being injected (aka pushed, provided, or supplied) into the balloon 813, and to monitor the flow rate of the cooling fluid that is being drawn (aka pulled or removed) from the balloon 813. The pressure measurements obtained from the pressure sensors P1, P2, and P3 can be provided to the controller 722 so that the controller 722 can monitor the balloon pressure. Additionally, flow rate measurements obtained from the flow rate sensors F1 and F2 can be provided to the controller 722 so that the controller 722 can monitor the flow rate of cooling fluid being pushed into and pulled from the balloon 813. It would also be possible for one or more pressure sensors and/or flow rate sensors to be located at additional or alternative locations along the fluidic paths that provide cooling fluid to and from the balloon 813.

Figure 12B:
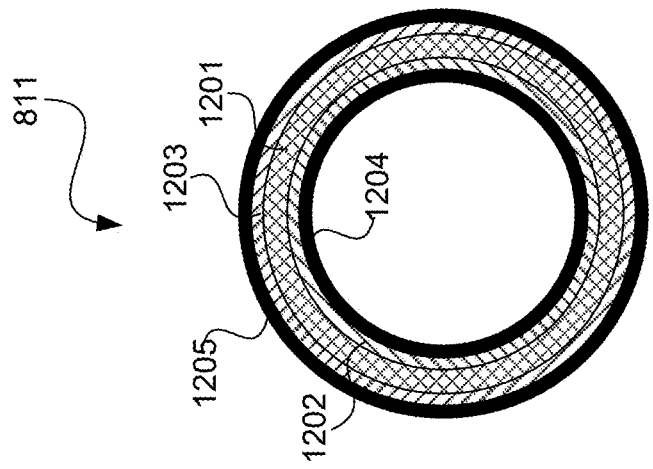
FIGS. 12A and 12B illustrates, respectively, a longitudinal cross-sectional view and a radial cross-sectional view of an example transducer that can be physically coupled to one of the tubes of a catheter, in accordance with certain embodiments of the present technology.
Figure 12A:
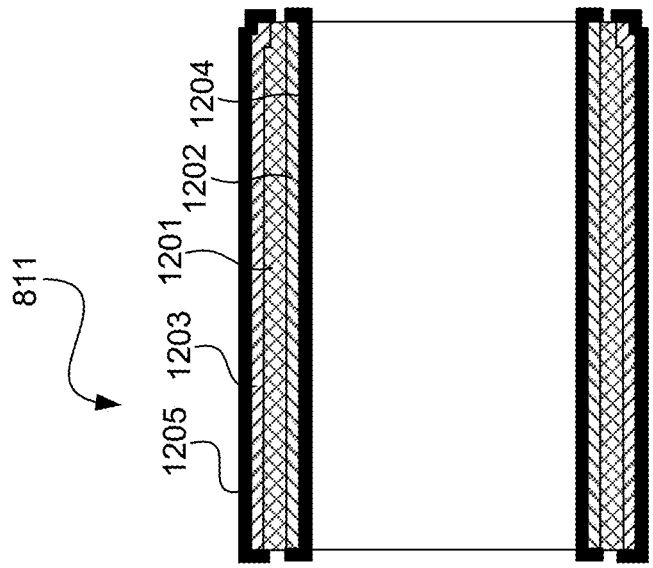

FIGS. 12A and 12B illustrate, respectively, a longitudinal cross-sectional view and a radial cross-sectional view of an example transducer 811 that can be physically coupled to one of the tubes (e.g., the third tube 133) of the catheter 802 introduced above in the discussion of FIGS. 8A and 8B, in accordance with certain embodiments of the present technology. The transducer 811 includes a piezoelectric transducer body 1201 that comprises a hollow tube of piezoelectric material having an inner surface and an outer surface, with an inner electrode 1202 disposed on the inner surface of the hollow tube of piezoelectric material, and an outer electrode 1203 disposed on the outer surface of the hollow tube of piezoelectric material. The hollow tube of piezoelectric material, or more generally the piezoelectric transducer body 1201, is cylindrically shaped and has a circular radial cross-section. However, in alternative embodiments the transducer body 1201 can have other shapes besides being cylindrical with a circular radial cross-section. The inner electrode 1202 is covered by an electrical insulator 1204, and the outer electrode 1203 is covered by an electrical insulator 1205. It is also possible that only one of the electrodes 1202, 1203 is covered by an electrical insulator. Other variations are also possible and within the scope of the embodiments described herein.

Figure 13:
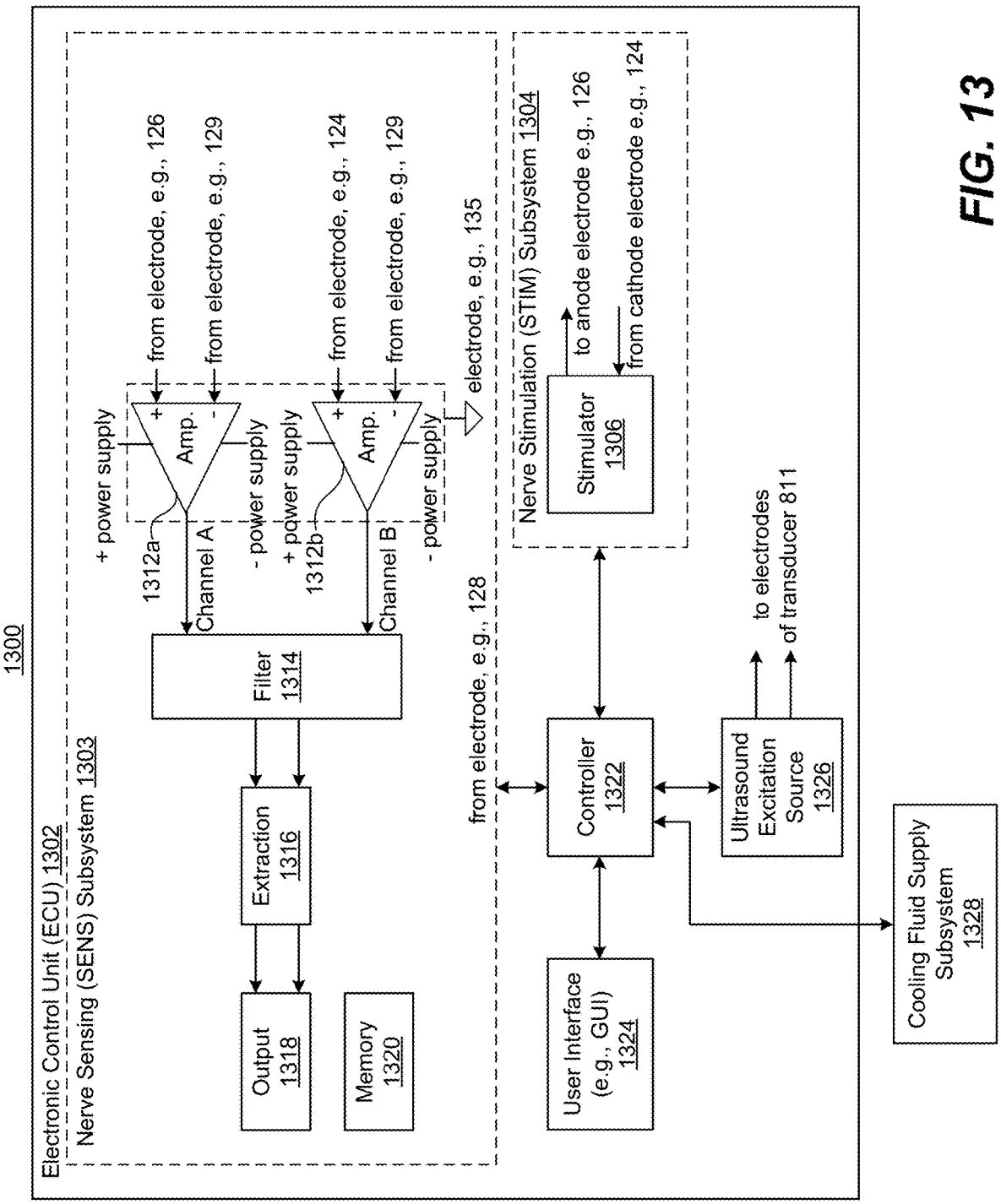
FIG. 13 is a schematic diagram of an example system, according to still another embodiment of the present technology, for interfacing with a patient's arterial nerves.

FIG. 13 is used to describe certain embodiments of the present technology that provide for multi-channel sensing capabilities, which embodiments take advantage of the catheters described herein having at least a pair of deployable electrodes as well as at least a pair of non-deployable (e.g., ring or tip) electrodes. Referring to FIG. 13, a system 1300 is shown as including an ECU 1302, which includes a nerve sensing subsystem 1303 and a nerve stimulation subsystem 1304. The ECU 1302 is also shown as including a controller 1322, a GUI 1324 and an optional excitation source 1326. The system 1300 can also include an optional cooling fluid supply subsystem 1328. The controller 1322, GUI 1324, excitation source 1326, and cooling fluid supply subsystem 1328, operate similarly to the commonly named components described above with reference to FIGS. 7 and 10, and thus, need not be described again.

In the embodiment of FIG. 13, the nerve sensing subsystem 1303 can be referred to more specifically as a multi-channel nerve sensing subsystem 1303, because it includes multiple channels, as will be described below. A first channel (which can also be referred to as channel 1, or channel A) includes a first amplifier 1312a, and a second channel (which can also be referred to as channel 2, or channel B) includes a second amplifier 1312b. The signal output by the first amplifier 1312a can be referred to as a first channel signal, and the signal output by the second amplifier 1312b can be referred to as a second channel signal. By contrast, referring briefly back to FIGS. 7 and 10, the nerve sensing subsystems shown therein can be referred to as single channel nerve sensing subsystems, since there is only a single amplifier 712 that outputs a single signal in those systems.

A benefit of using multi-channel sensing is that it enables additional information to be extracted from sensed signals, compared to if single-channel sensing is used. For example, with multi-channel sensing, the signals sensed by different channels can be compared to one another, to enable nerve depths to be quantified, to provide for better discrimination between sensed neural activity originating from afferent nerve fibers and sensed neural activity originating from efferent nerve fibers, and to enable nerve type identification. Additionally, by knowing the distances between the various electrodes that are used to simultaneously sense signals using multiple channels, nerve transmission velocities can be better quantified compared to if single-channel sensing is used.

Additionally, multi-channel sensing can be used to reduce and preferably eliminate noise in sensed signals. For example, two signals sensed by two different channels can be compared to one another to identify signal features (which can be temporal features and/or frequency features) that are common to both of the signals. In other words, noise common to both a first channel signal and a second channel signal can be filtered out, while first signal components unique to the first channel signal, and second signal components unique to the second channel signal, can be retained. As will be appreciated from the following discussion, each channel includes a respective differential amplifier that outputs a respective channel signal indicative of a difference between voltages at the differential inputs of the differential amplifier. Accordingly, a difference between the two channel signals sensed by two different channels is essentially a difference of differences, which difference of differences can be determined and used by an extraction module (1316) of the ECU 1302 described below with reference to FIGS. 13 and 14.

Referring briefly back to the catheter 102 shown in FIGS. 1A-1D, and the catheter 902 shown in FIGS. 8A-8B, those catheters were each shown as having a proximal selectively deployable electrode 124, a distal selectively deployable electrode 126, a proximal ring electrode 128, a medial ring electrode 129, and a distal ring or tip electrode 135. While the catheter 102 is shown as including three non-deployable electrodes 128, 129 and 135, it is possible that the catheter can include more or less than three non-deployable electrodes. For example, it is possible that the catheter 102 can include a pair of medial ring electrodes that are longitudinally spaced apart from one another.

Referring again to FIG. 13, the first amplifier 1312a of the first channel, and the second amplifier 1312b of the second channel, are each shown as having a non-inverting (+) input terminal, an inverting (−) input terminal, an output terminal, power supply terminals and a ground reference terminal. The non-inverting (+) input terminal, the inverting (−) input terminal and the output terminal, can be referred to more succinctly herein as the non-inverting (+) input, the inverting (−) input and the output, respectively. It is also noted that the non-inverting (+) input and the inverting (−) input of an amplifier can also be referred to herein as a pair of inputs of the amplifier.

In accordance with certain embodiments, as shown in FIG. 13, in order to provide for multi-channel sensing, the inverting (−) inputs of the two amplifiers 1312a, 1312b are electrically coupled the same non-deployable electrode (e.g., 129), the ground reference terminals of the two amplifiers 1312a, 1312b are electrically coupled to the same non-deployable electrode (e.g., 135), the non-inverting (+) input of the first amplifier 1312a is electrically coupled to one of the selectively deployable electrodes (e.g., 126), and the non-inverting (+) input of the second amplifier 1312b is electrically coupled to the other one of the selectively deployable electrodes (e.g., 124). A benefit of having the inverting (−) inputs of the two amplifiers 1312a, 1312b electrically coupled the same non-deployable electrode (e.g., 129) is that it eliminates bias that would otherwise occur if the inverting (−) inputs of the two amplifiers 1312a, 1312b were coupled to different electrodes than one another. Nevertheless, it would also be possible for the inverting (−) inputs of the two amplifiers 1312a, 1312b to instead be electrically coupled to different non-deployable electrodes that one another to create a decoupled reference, which may be useful if the different electrodes coupled to the inverting (−) inputs of the two amplifiers 1312a, 1312b span an ablation lesion. A benefit of having the ground reference terminals of the two amplifiers 1312a, 1312b electrically coupled to the same non-deployable electrode (e.g., 135) is that it introduces an identical ground reference, which provides for increased confidence in signal reliability. Nevertheless, although less preferred, it would also be possible for the ground reference terminals of the two amplifiers 1312a, 1312b to be electrically coupled to different electrodes than one another.

More generally, in accordance with certain embodiments, each of the amplifiers 1312a, 1312b includes a respective ground reference terminal that is coupled to a same ground reference electrode. In accordance with certain embodiments, the ground reference electrode comprises one of the electrodes of the catheter that is not electrically coupled to any of the inputs of the amplifiers 1312a, 1312b. In accordance with certain embodiments, the ground reference electrode comprises one of an external surface electrode configured to be placed against skin of a patient, or an external needle electrode configured to be placed into skin of a patient.

While not specifically shown in FIG. 13, so as to not overly complicate the figure, the ECU 1302 can include switches (e.g., transistor switches, multiplexers, or relays, but not limited thereto) that can be controlled (e.g., by the controller 1322) to select which electrodes, at any given time, are electrically coupled to the various terminals of the amplifiers 1312a, 1312b and the stimulator 1306. For example, referring to FIG. 13, during a first period of time, switches can be used to electrically couple the distal deployable electrode 126 to an output terminal (aka anode terminal) of the stimulator 1306, and to electrically couple the proximal deployable electrode 124 to a return terminal (aka cathode terminal) of the stimulator 1306, to enable one or more stimulation pulses to be delivered via the deployable electrodes 126, 124. Still referring to FIG. 13, during a second period of time, that follows the first period of time, switches can be used to electrically couple the distal deployable electrode 126 to the non-inverting (+) input of the first amplifier 1312a, to electrically couple the medial ring electrode 129 to the inverting (−) input of the first amplifier 1312a, and to electrically couple the distal ring or tip electrode 135 to the ground reference terminal of the first amplifier 1312a. Additionally, during the second period of time, that follows the first period of time, switches can be used to electrically couple the proximal deployable electrode 124 to the non-inverting (+) input of the second amplifier 1312b, to electrically couple the medial ring electrode 129 to the inverting (−) input of the second amplifier 1312b, and to electrically couple the distal ring or tip electrode 135 to the ground reference terminal of the second amplifier 1312b.

In the example just described above, the same electrodes 126, 124 that were described as being used to deliver the stimulation pulse(s) during the first period of time, were also described as being used to sense the evoked neural response to the stimulation pulse(s) during the second period of time. In accordance with certain embodiments, in order to mitigate the chance that such electrodes are polarized during the second period of time, as well as to prevent the amplifiers 1312a and 1312b from being saturated during the second period of time, deblocking and/or switching can be performed to isolate the amplifiers 1312a and 1312b during the first period of time that the stimulation pulse(s) is/are delivered, as well as for a short temporal window (e.g., a 15 millisecond window) following deliver of the stimulation pulse(s).

As can be appreciated from the above discussion, the nerve sensing subsystem 1303 can be used to sense an evoked neural response to one or more electrical stimulation pulses delivered using the nerve stimulation subsystem 1304. However, it is also noted that the nerve sensing subsystem 1303 can also be used to sense native electrical neural activity, if so desired.

As shown in FIG. 13, the signals output by the first and second amplifiers 1312a, 1312b, which can be referred to as the first channel signal (or signal A, or signal 1) and the second channel signal (or signal B, or signal 2), are shown as being provided to filter module 1314, and outputs of the filter circuitry 1314 are shown as being provided to extraction circuitry 1316. The filter circuitry 1314, which can also be referred to as a filter module 1314 or more succinctly as a filter 1314, is used to remove noise and other signal components that are not of interest. The extraction circuitry 1316, which can also be referred to as an extraction module 1316, is used to extract information of interest from filtered signals received from the filter module 1314. More generally, the filter circuitry 1314 and the extraction module 1316 collectively provide for signal processing of the multi-channel signals output 1318 by the first and second amplifiers 1312a, 1312b. Additional details of the filter circuitry 1314 and the extraction circuitry 1316, according to certain embodiments of the present technology, are described below with reference to FIG. 14.

As noted above, the filter circuitry 1314 is used to remove noise and other signal components that are not of interest. Additional details of the filter circuitry, according to specific embodiments of the present technology, are described below with reference to FIG. 14. In some embodiments, various properties of the filter circuitry 1314 can be adjusted to manipulate its filtering characteristics. For example, the filter module may include one or more adjustable capacitances and/or other parameter(s) to adjust its frequency response.

Figure 14:
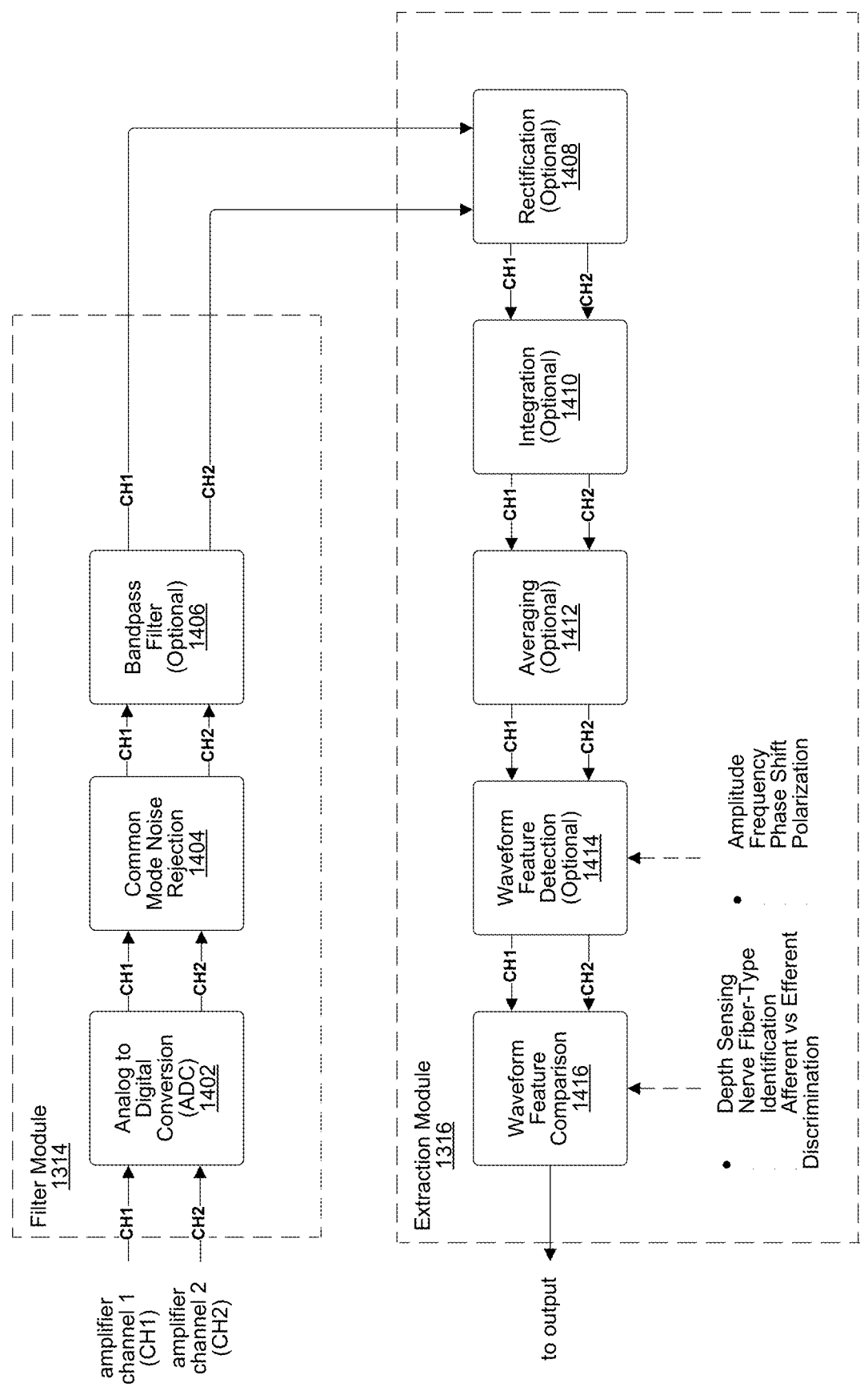
FIG. 14 is a block diagram that shows additional details of a multi-channel nerve sensing subsystem of an electronic control unit of the system shown in FIG. 13, according to an embodiment of the present technology.

Referring now to FIG. 14, the filter circuitry 1314 is shown as including a multi-channel analog-to-digital converter (ADC) 1402, common noise rejection circuitry 1404, and optional bandpass filter circuitry 1406. The multi-channel ADC 1402 converts the analog signals output by the first and second amplifiers 1312a, 1312b to digital signals, so that the multi-channel signals can be processed in the digital domain, using digital signal processing. While the multi-channel ADC 1402 is shown as being part of the filter module 1314, it would be equivalent for the multi-channel ADC 1402 to be located upstream of the filter module 1314, i.e., between the outputs of the first and second amplifiers 1312a, 1312b and inputs to the filter module 1314. It is also noted that two separate ADCs, that are preferably commonly grounded, can be used in place of the multi-channel ADC 1402.

In accordance with certain embodiments, the common noise rejection circuitry 1404, which can also be referred to as the common noise rejection module 1404, includes one or more digital notch filters that filter out noise, intrinsic to the channels, that is within the bandwidth of interest. Noise intrinsic to the channels, which is attenuated using one or more notch filters, can be noise from a known source of noise, such as line noise, but is not limited thereto. An example frequency range that such one or more notch filters can be used to attenuate is from 50 Hz to 60 Hz, but is not limited thereto. It is also noted that each of the differential amplifiers 1312a and 1312b provides for common noise rejection.

The common noise rejection circuitry 1404 can additionally be used to identify signal components of the first and second channel signals that are the same, and/or to identify signal components of the first and second channel signals that differ from one another, depending upon the specific implementation. Examples of type of signal components of the first and second channel signals, which can differ from one another, include signal phases and signal amplitudes, but are not limited thereto. Differences between phases of the first and second channel signals can be due to a longitudinal distance between electrodes used to sense the first and second channel signals. For example, signal phases may differ between the first and second channel signals due to a longitudinal distance between the deployable electrodes 126 and 124 used, respectively, to sense the first and second channel signals. Signal amplitudes may differ between the first and second channel signals due to variations of the depths of nerve fibers and/or nerve bundles relative to a wall of a biological lumen in which sensing electrodes are located. For example, if nerve fibers are located closer to a portion of the wall of a biological lumen that the deployable electrode 126 is in contact with, than are nerve fibers located in a portion of the wall of the biological lumen that the deployable electrode 124 is in contact with, then amplitudes of the first channel signal may be greater than amplitudes of the second channel signal. For the below discussion, it is assumed that noise common to both the first and second channel signals is removed by the common mode noise rejection module 1404, such that the first and second channel signals output from the common noise rejection module are substantially devoid of such common noise.

The optional bandpass filter circuitry 1406, which can also be referred to as the bandpass filter module 1406, if present, attenuates frequencies outside a bandwidth of interest. Explained another way, the bandpass filter circuitry 1406 is configured to filter out frequency components of the first and second channel signals outside the bandwidth of interest, and to pass frequency components of the first and second channel signals within the bandwidth of interest. The bandwidth of interest, which is passed by the bandpass filter circuitry 1406, can be, e.g., from 150 Hz to 2 kHz, but is not limited thereto. In certain embodiments, each bandpass filter can be implemented by a combination of a low pass filter (that filters out frequencies above an upper limit of the bandpass of interest) followed by a high pass filter (that filters out frequencies below a lower limit of the bandpass of interest), or by one filter that passes frequencies between the lower and upper limits of interest and filters out, aka rejects, frequencies below the lower limit of the bandpass of interest and above the upper limit of the bandpass of interest. The first and second channel signals, which are provided from the filter module 1314 to the extraction module 1316, can be referred to more specifically herein as filtered first and second channel signals, or equivalently as first and second channel filtered signals.

As noted above, the extraction module 1316 is used to extract information of interest from filtered signals received from the filter module 1314. Examples of information that can be extracted from the filtered signals include nerve depth information related to the depth of nerves of interest (e.g., renal nerves), nerve fiber type information which can be used to identify nerve fiber types (e.g., A, B, or C type fibers), and discrimination information which can be used to distinguish afferent nerves from efferent nerves, but are not limited thereto.

Nerves can be classified as afferent or efferent depending on the direction in which information travels, with afferent nerves carrying information from an organ (such as a kidney) to the central nervous system (i.e., brain and spinal cord), and efferent nerves carrying information from the central nervous system to an organ (such as a kidney). If a common signal component (e.g., a common evoked neural response component) appears in both the first channel filtered signal and the second channel filtered signal, then the relative phase of the signals can be used to determine whether the signal component originated from either an afferent nerve or an efferent nerve. For a more specific example, if a common evoked neural response component appears in the first channel signal (sensed using the distal deployable electrode 126) prior to appearing in the second channel signal (sensed using the proximal deployable electrode 124), then it can be determined that the nerves (whose evoked neural response was sensed) are afferent nerves. Conversely, if a common evoked neural response component appears in the second channel signal (sensed using the proximal deployable electrode 124) prior to appearing in the first channel signal (sensed using the distal deployable electrode 126), then it can be determined that the nerves (whose evoked neural response was sensed) are efferent nerves. Morphological analysis can be used to determine whether evoked neural response components included in both the first and second channel signals are a common evoked neural response component. Time stamps, and/or the like, can be used to determine which of the channels a common evoked neural response component initially appears in for the purpose of determining whether the signal component originated from either an afferent nerve or an efferent nerve.

A velocity of a sensed neural signal can be determined based on a time delay between when a common evoked neural response component appears in the second channel signal (sensed using the proximal deployable electrode 124) and when the common evoked neural response component appears in the first channel signal (sensed using the distal deployable electrode 126), and knowing the distance between the proximal deployable electrode 124 and the distal deployable electrode 126. More specifically, since velocity is a rate of change of position with respect to time, the velocity of a neural signal can be determined by dividing the distance between the proximal deployable electrode 124 and the distal deployable electrode 126, by the time delay between when a common evoked neural response component appears in the second channel signal (sensed using the proximal deployable electrode 124) and when the common evoked neural response component appears in the first channel signal (sensed using the distal deployable electrode 126). This is just one example, which is not intended to be all encompassing. Since different nerve fibers carry information at different speeds (aka velocities), the determined velocity of a neural response can be used to identify (aka classify) a type of nerve fiber from which the neural response originated. Accordingly, for example, if there is a desire to identify where C type nerve fibers are positioned about a biological lumen, so that the C type nerve fibers can be targeted for a denervation procedure, then embodiments of the present technology described herein can be used to identify where C type nerve fibers are located.

Still referring to FIG. 14, the extraction module 1316 is shown as including rectification circuitry 1408, integration circuitry 1410, averaging circuitry 1412, waveform feature detection circuitry 1414, and waveform feature comparison circuitry 1416. As can be appreciated from FIG. 14, some of the above types of circuitry of the extraction module, which circuitry can also be referred to as modules, is optional. The rectification module 1408, if present, rectifies each of the filtered first and second channel signals. The integration module 1410, if present, integrates (aka sums) the filtered (and optionally also rectified) first and second channel signals. The averaging module 1412, if present, takes several inputs over a period, t0 to tn, and sums then divides by the number to time points to arrive at a signal average. This methodology eliminates random variation from the primary signal. Beneficially, the averaging module 1412 smooths out spikes and higher frequency signals when comparing multiple data windows referencing an event, such as, a stimulation or a heartbeat. This assists in signal analysis by reducing noise and allows repetitive, strong signals to be visualized.

The waveform detection module 1414, if present, can be used to detect waveform features of the processed (e.g., filtered, rectified, integrated and/or averaged) first and second channel signals. Such waveform features, which can be detected by the waveform detection module 1414, include, but are not limited to, amplitudes, frequency components, phase shifts, polarizations, and/or the like. The waveform feature comparison module 1416 compares the first and second channel signals, and/or the features thereof already detected by the waveform feature detection module 1414, and outputs information determined based on the comparison. The information output by the waveform feature comparison module 1416 can include, e.g., nerve depth information related to the depth of nerves of interest (e.g., renal nerves), nerve fiber type information which can be used to identify nerve fiber types (e.g., A, B, or C type fibers), and discrimination information which can be used to distinguish afferent nerves from efferent nerves, but are not limited thereto. The nerve depth information can be determined by relative signal strengths. In certain embodiments, nerves can be polled to create a reference point based upon a known depth. Alternatively, a signal can be emitted using one or more electrodes from a distant point (e.g., in the abdominal aorta) and then one or more further electrodes can be used to listen for signals from known nerve depths. In certain embodiments, signal strength versus nerve depth from a reference is previously known based on direct coupling study versus depth to get a baseline from which to make inferences. The information output by the waveform feature comparison module 1416 can be stored in memory 1320 and/or used to display information via the GUI 1324, but is not limited thereto.

More generally, in accordance with certain embodiments, the multi-channel nerve sensing subsystem 1303 includes one or more analog-to-digital converters configured to convert the first and second channel signals from analog signals to digital signals, and digital signal processing circuitry configured to extract information from the first and second channel signals, based on least in part on the comparison between the first and second channel signals, after the first and second channel signals have been converted to digital signals.

In accordance with certain embodiments, the filter module 1314 and the extraction module 1316, and the modules thereof, can be implemented using one or more processors, which can include one or more Digital Signal Processors (DSPs). Alternatively, or additionally, the filter module 1314 and the extraction module 1316, and the modules thereof, can be implemented using one or more field-programmable gate arrays (FPGAs), one or more Signal on Chip (SOCs), and/or one or more application specific integrated circuits (ASICs). More generally, the filter module 1314 and the extraction module 1316 can be implemented using hardware, software, firmware, and/or combinations thereof.

Referring back to FIG. 13, while example electrodes are shown as being electrically coupled to the various terminals shown therein, it is noted that switches of the ECU 1302 can be used to electrically couple different combinations of electrodes to the various terminals. For example, the electrical connections for the electrodes 126 and 124 can be swapped, such that the electrode 124 is instead coupled to an input of the first amplifier 1312*a*, and the electrode 126 is instead coupled to an input of the second amplifier 1312*b*. For another example, another one of the non-deployable electrodes, besides the medial ring electrode 129, can be coupled to inputs of the amplifiers 1312*a* and 1312*b*. It is also possible that the ground reference terminals of the amplifiers 1312*a*, 1312*b* are coupled to different non-deployable electrodes of the catheter, or to an external surface or needle electrode that is configured to be placed against or into skin of a patient. Examples of locations that an external surface or needle electrode can be position include, but are not limited to, a patient's left leg, or a patient's abdominal flank. Other variations are also possible and within the scope of the embodiments described herein.

The below table, labeled Table 1, includes examples of additional multi-channel sensing configurations and examples of additional stimulation configurations.

TABLE 1

| Electrode Configurations (Config) | Sense Channel 1 Amplifier 1312a | | | Sense Channel 2 Amplifier 1312b | | | Stimulation Channel | |
|---|---|---|---|---|---|---|---|---|
| | (+) input | (−) input | GND Ref | (+) input | (−) input | GND Ref | Stim Anode (−) | Stim Cathode (+) |
| Config 1 | Electrode 126 | Electrode 129 | Left Leg External Electrode | Electrode 124 | Electrode 129 | Left Leg External Electrode | Abdominal Flank External Electrode | Electrode 135 |

TABLE 1-continued

| Electrode Configurations (Config) | Sense Channel 1 Amplifier 1312a | | | Sense Channel 2 Amplifier 1312b | | | Stimulation Channel | |
|---|---|---|---|---|---|---|---|---|
| | (+) input | (−) input | GND Ref | (+) input | (−) input | GND Ref | Stim Anode (−) | Stim Cathode (+) |
| Config 2 | Electrode 126 | Electrode 129 | Left Leg External Electrode | Abdominal Flank External Electrode | Electrode 129 | Left Leg External Electrode | Electrode 124 | Abdominal Flank External Electrode |
| Config 3 | Electrode 126 | Electrode 129 | Abdominal Flank External Electrode | Electrode 135 | Electrode 129 | Abdominal Flank External Electrode | Electrode 124 | Abdominal Flank External Electrode |
| Config 4 | Electrode 124 | Electrode 129 | Electrode 135 | Electrode 126 | Electrode 129 | Electrode 135 | Electrode 129 | Abdominal Flank External Electrode |
| Config 5 | Electrode 124 | Electrode 129 | Left Leg External Electrode | Electrode 126 | Electrode 135 | Left Leg External Electrode | Electrode 129 | Abdominal Flank External Electrode |
| Config 6 | Electrode 124 | Left Leg External Electrode | Electrode 135 | Electrode 129 | Left Leg External Electrode | Electrode 135 | Electrode 126 | Abdominal Flank External Electrode |
| Config 7 | Electrode 124 | Abdominal Flank External Electrode | Left Leg External Electrode | Electrode 129 | Abdominal Flank External Electrode | Left Leg External Electrode | Electrode 126 | Electrode 135 |

While the above table shows some examples of mutichannel sensing configurations and some examples of stimulation configurations, this table is not intended to be all encompassing.

Certain embodiments of the present technology are directed to methods for use with a catheter (e.g., 102) including a plurality of electrodes (e.g., 124, 126, 128, 129, 135) along a portion thereof (e.g., 122) that is inserted into a biological lumen. In certain such embodiments, the method includes sensing a first channel signal using a first amplifier (e.g., 1312a) including a first pair of inputs electrically coupled to a first pair of the electrodes, wherein the first channel signal is indicative of neural activity sensed between the first pair of electrodes. The method also includes sensing a second channel signal using a second amplifier (e.g., 1312b) including a second pair of inputs electrically coupled to a second pair of the electrodes, wherein at least one electrode in the second pair of electrodes is not included in the first pair of electrodes, and wherein the second channel signal is indicative of neural activity sensed between the second pair of electrodes. The method additionally includes comparing the first and second channel signals to one another, extracting, from the first and second channel signals, information about nerves in tissue surrounding the biological lumen, based at least in part one results of the comparing the first and second channel signals to one another.

In accordance with certain embodiments, the sensing the first channel signal and the sensing the second channel signal occur simultaneously.

In accordance with certain embodiments, the method further comprises filtering and digitizing the first and second channel signals (e.g., using one or more ADC 1402) before the first and second channel signals are compared to one another.

In accordance with certain embodiments, the comparing and the extracting are performed by an electronic control unit (e.g., 1302).

In accordance with certain embodiments, the method further comprises delivering one or more stimulation pulses (e.g., using the stimulator 1306) between at least two of the electrodes of the catheter, to thereby evoke a neural response that can be sensed using the first and second amplifiers (e.g., 1312a and 1312b). In certain such embodiments, the plurality of electrodes of the catheter include first and second deployable electrodes (e.g., 124 and 126) that are longitudinally spaced apart from one another, and one or more further electrodes (e.g., 128, 129, 135) that is/are non-deployable. In certain such embodiments, the method includes electrically coupling one of the inputs of the first pair of inputs of the first amplifier (e.g., 1312a) of the first channel to one of the first and second deployable electrodes (e.g., 124 or 126), electrically coupling the other one of the inputs of the first pair of inputs of the first amplifier of the first channel to one of the one or more further electrodes that is/are non-deployable (e.g., 128, 129 or 135), electrically coupling one of the inputs of the second pair of inputs of the second amplifier (e.g., 1312b) of the second channel to the other one of the first and second deployable electrodes (e.g., the other one of 124 or 126), and electrically coupling the other one of the inputs of the second pair of inputs of the second amplifier of the second channel to one of the one or more further electrodes that is/are non-deployable.

In accordance with certain embodiments, the first and second amplifiers (e.g., 1312a and 1312b) each include a ground reference terminal, and the method comprises coupling the ground reference terminals of the first and second amplifiers to a same ground reference electrode. In certain such embodiments, the ground reference electrode comprises one of the electrodes of the catheter that is not electrically coupled to any of the inputs of the first and second amplifiers. In other embodiments, the ground reference electrode comprises one of an external surface electrode configured to be placed against skin of a patient, or an external needle electrode configured to be placed into skin of a patient. Additional and alternative details and implementations of such methods could be appreciated from the above discussion.

EXAMPLES

Example 1

A catheter for use in analyzing neural activity of nerves that surround a biological lumen, the catheter comprising: a handle including first, second, and third actuators; and a shaft extending from the handle and including proximal and distal electrodes that are selectively deployable; the first actuator configured to selectively deploy the proximal electrode in response to the first actuator being manually maneuvered; the second actuator configured to selectively deploy the distal electrode in response to the second actuator being manually maneuvered; and the third actuator configured to selectively adjust a longitudinal distance between the proximal and distal electrodes in response to the third actuator being manually maneuvered.

Example 2

The catheter of example 1, wherein the third actuator: is configured to selectively adjust the longitudinal distance between the proximal and distal electrodes, while a first one of the proximal and distal electrodes is deployed, in response to the third actuator being manually maneuvered; and is locked in place, thereby preventing the longitudinal distance between the proximal and distal electrodes from being adjusted, while a second one of the proximal and distal electrodes is deployed.

Example 3

The catheter of any one of examples 1 or 2, wherein each electrode, of the proximal and distal electrodes that are selectively deployable, includes a pair of longitudinal ends and is configured to be selectively deployed in response to one of the longitudinal ends being moved towards the other one of the longitudinal ends of the electrode.

Example 4

The catheter of any one of examples 1 through 3, wherein each electrode, of the proximal and distal electrodes that are selectively deployable, comprises a nitinol tube having a laser cut pattern of apertures that separate struts of the electrode.

Example 5

The catheter of any one of claims 1 through 4, wherein: the shaft also includes a plurality of nested and concentric tubes; one of the tubes is mechanically coupled between the first actuator and the proximal electrode that is selectively deployable such that the one of the tubes and the first actuator are collectively configured to deploy the proximal electrode in response to the first actuator being manually maneuvered; another one of the tubes is mechanically coupled between the second actuator and the distal electrode that is selectively deployable such that the another one of the tubes and the second actuator are collectively configured to deploy the distal electrode in response to the second actuator being manually maneuvered; and a further one of the tubes is mechanically coupled to the third actuator such that the further one of the tubes and the third actuator are collectively configured to adjust a longitudinal distance between the proximal and distal electrodes, while one of the proximal and distal electrodes is deployed, in response to the third actuator being manually maneuvered.

Example 6

The catheter of example 5, wherein the plurality of nested and concentric tubes include first, second, third, and fourth tubes.

Example 7

The catheter of example 6, wherein: a portion of each of the second, third, and fourth tubes extends through a hollow lumen of the proximal electrode; and a portion of the fourth tube extends through a hollow lumen of the distal electrode.

Example 8

The catheter of any one of examples 5 through 7, further comprising: an electrical cable that extends from the handle and is configured to electrically connect the catheter to an electronic control unit (ECU); each tube, of at least two of the plurality of tubes, includes an electrically conductive coil extending between proximal and distal ends of the tube and surrounded by one or more electrical insulator; the electrically conductive coil of one of the tubes is electrically coupled between the proximal electrode and an electrically conductive path within the handle to thereby provide for an electrical connection between the proximal electrode and the electrical cable that extends from the handle; and the electrically conductive coil of another one of the tubes is electrically coupled between the distal electrode and another electrically conductive path within the handle to thereby provide for an electrical connection between the distal electrode and the electrical cable that extends from the handle.

Example 9

The catheter of example 8, wherein the electrically conductive coil of each tube that includes an electrically conductive coil: is sandwiched between a hollow sleeve of electrically non-conductive material and an outer jacket of electrically non-conductive material; and provides for kink resistance and crush resistance, as well as providing an electrically conductive path along a length of the tube without requiring that a wire be threaded through a hollow lumen of the tube.

Example 10

The catheter of any one of examples 6 through 9, wherein: at least a portion of the fourth tube extends through at least a portion of each of the first, second, and third tubes; at least a portion of the third tube extends through at least a portion of the first and second tubes; and at least a portion of the second tube extends through at least a portion of the first tube.

Example 11

The catheter of any one of examples 6 through 10, wherein: a longitudinal length of the fourth tube is greater than a longitudinal length of the third tube; the longitudinal length of the third tube is greater than a longitudinal length of the second tube; and the longitudinal length of the second tube is great then a longitudinal length of the first tube.

Example 12

The catheter of any one of examples 6 through 11, wherein: each of the first, second, third, and fourth tubes includes a respective inner diameter and a respective outer diameter; the outer diameter of the fourth tube is less than the inner diameter of the third tube; the outer diameter of the third tube is less than the inner diameter of the second tube; and the outer diameter of the second tube is less than the inner diameter of the first tube.

Example 13

The catheter of any one of examples 6 through 12, wherein: a distal portion of each of the second, third, and fourth tubes includes a respective flange that has an outer diameter that is substantially the same as the outer diameter of the first tube.

Example 14

The catheter of any one of examples 5 through 13, further comprising: a transducer physically coupled to one of the plurality of tubes and configured to emit a neuromodulation signal in response to a voltage being applied between first and second electrodes of the transducer; wherein the one of the plurality of tubes, to which the transducer is physically coupled, includes first and second electrically conductive coils extending between proximal and distal ends of the one of the plurality of tubes; and wherein the first and second electrically conductive coils are electrically coupled, respectively, to the first and second electrodes of the transducer to thereby enable the voltage to be applied between the first and second electrodes of the transducer.

Example 15

The catheter of example 14, further comprising: a balloon physically coupled to the one of the plurality of tubes and surrounding the transducer; the wherein the balloon is configured to receive a cooling fluid.

Example 16

The catheter of example 15, wherein: the one of the plurality of tubes, to which the transducer and the balloon are physically coupled, includes first, second, and third hollow lumens; the first hollow lumen has a circular cross-section and is configured to receive at least a portion of another one of the tubes extending therethrough; and the second and third hollow lumens are configured to provide the cooling fluid to and from the balloon so that the cooling fluid can be circulated through the balloon.

Example 17

The catheter of any one of examples 1 through 16, further comprising one or more non-deployable ring electrodes on the shaft.

Example 18

The catheter of any one of examples 1 through 17, further comprising a tip electrode on a distal end of the shaft.

Example 19

A catheter for use in analyzing neural activity of nerves that surround a biological lumen, the catheter comprising: a handle including a plurality of actuators; and a shaft extending from the handle and including a plurality of nested and concentric tubes, and also including proximal and distal electrodes that are selectively deployable; each electrode, of the proximal and distal electrodes that are selectively deployable, including a pair of longitudinal ends and configured to be selectively deployed in response to one of the longitudinal ends being moved towards the other one of the longitudinal ends of the electrode; one of the tubes mechanically coupled between one of the actuators and the proximal electrode that is selectively deployable such that the one of the tubes and the one of the actuators are collectively configured to deploy the proximal electrode in response to the one of the actuators being manually maneuvered; another one of the tubes mechanically coupled between another one of the actuators and the distal electrode that is selectively deployable such that the another one of the tubes and the another one of the actuators are collectively configured to deploy the distal electrode in response to the another one of the actuators being manually maneuvered; and a further one of the tubes mechanically coupled to a further one of the actuators such that the further one of the tubes and the further one of the actuators are collectively configured to adjust a longitudinal distance between the proximal and distal electrodes, while one of the proximal and distal electrodes is deployed, in response to the further one of the actuators being manually maneuvered.

Example 20

The catheter of example 19, wherein the actuators are configured such that while a specific one of the proximal and distal electrodes is deployed, the one of the actuators, which is configured to adjust the longitudinal distance between the proximal and distal electrodes, is locked in place to thereby prevent adjustment to the longitudinal distance between the proximal and distal electrodes while the specific one of the proximal and distal electrodes is deployed.

Example 21

The catheter of example 19, further comprising an electrical cable that extends from a proximal portion of the handle and is configured to electrically connect the catheter to an electronic control unit (ECU).

Example 22

The catheter of example 21, wherein: each tube, of at least two of the plurality of tubes, includes an electrically conductive coil extending between proximal and distal ends of the tube and surrounded by one or more electrical insulator; the electrically conductive coil of one of the tubes is electrically coupled between the proximal electrode and an electrically conductive path within the handle to thereby provide for an electrical connection between the proximal electrode and the electrical cable that extends from the proximal portion of the handle; and the electrically conductive coil of another one of the tubes is electrically coupled between the distal electrode and another electrically conductive path within the handle to thereby provide for an electrical connection between the distal electrode and the electrical cable that extends from the proximal portion of the handle.

Example 23

The catheter of example 22, wherein the electrically conductive coil of each tube that includes an electrically conductive coil: is sandwiched between a hollow sleeve of electrically non-conductive material and an outer jacket of electrically non-conductive material; and provides for kink resistance and crush resistance, as well as providing an electrically conductive path along a length of the tube without requiring that a wire be threaded through a hollow lumen of the tube.

Example 24

The catheter of example 19, wherein each electrode, of the proximal and distal electrodes that are selectively deployable, comprises a nitinol tube having a pattern of apertures that separate struts of the electrode.

Example 25

The catheter of example 19, wherein the plurality of nested and concentric tubes includes first, second, third, and fourth tubes that are concentric and nested such that at least a portion of the fourth tube extends through at least a portion of each of the first, second, and third tubes, at least a portion of the third tube extends through at least a portion of the first and second tubes, and at least a portion of the second tube extends through at least a portion of the first tube.

Example 26

The catheter of example 25, wherein: a longitudinal length of the fourth tube is greater than a longitudinal length of the third tube; the longitudinal length of the third tube is greater than a longitudinal length of the second tube; and the longitudinal length of the second tube is great then a longitudinal length of the first tube.

Example 27

The catheter of example 25, wherein: each of the first, second, third, and fourth tubes includes a respective inner diameter and a respective outer diameter; the outer diameter of the fourth tube is less than the inner diameter of the third tube; the outer diameter of the third tube is less than the inner diameter of the second tube; and the outer diameter of the second tube is less than the inner diameter of the first tube.

Example 28

The catheter of example 25, wherein a distal portion of each of the second, third, and fourth tubes includes a respective flange that has an outer diameter that is substantially the same as the outer diameter of the first tube.

Example 29

The catheter of any one of examples 19 through 21, further comprising: a transducer physically coupled to one of the plurality of tubes and configured to emit a neuromodulation signal in response to a voltage being applied between first and second electrodes of the transducer; wherein the one of the plurality of tubes, to which the transducer is physically coupled, includes first and second electrically conductive coils extending between proximal and distal ends of the one of the plurality of tubes; and wherein the first and second electrically conductive coils are electrically coupled, respectively, to the first and second electrodes of the transducer to thereby enable the voltage to be applied between the first and second electrodes of the transducer.

Example 30

The catheter of example 29, further comprising: a balloon physically coupled to the one of the plurality of tubes and surrounding the transducer; wherein the balloon is configured to receive a cooling fluid.

Example 31

The catheter of example 30, wherein: the one of the plurality of tubes, to which the transducer and the balloon are physically coupled, includes first, second, and third hollow lumens; the first hollow lumen has a circular cross-section and is configured to receive at least a portion of another one of the tubes extending therethrough; and the second and third hollow lumens are configured to provide the cooling fluid to and from the balloon so that the cooling fluid can be circulated through the balloon.

Example 32

A catheter for use in analyzing neural activity of nerves that surround a biological lumen, the catheter comprising: a handle including a plurality of actuators; and a shaft extending from the handle and including first, second, third, and fourth tubes that are nested and concentric, and also including proximal and distal electrodes that are selectively deployable; an electrical cable that extends from a proximal portion of the handle and is configured to by coupled to an electronic control unit; each electrode, of the proximal and distal electrodes that are selectively deployable, including a pair of longitudinal ends and configured to be selectively deployed in response to one of the longitudinal ends being moved towards the other one of the longitudinal ends of the electrode; each tube, of at least two of the first, second, third, and fourth tubes, includes an electrically conductive coil extending between proximal and distal ends of the tube and surrounded by one or more electrical insulator; the electrically conductive coil of one of the tubes is electrically coupled between the proximal electrode and an electrically conductive path within the handle to thereby provide for an electrical connection between the proximal electrode and the electrical cable that extends from the proximal end of the handle; and the electrically conductive coil of another one of the tubes is electrically coupled between the distal electrode and another electrically conductive path within the handle to thereby provide for an electrical connection between the distal electrode and the electrical cable that extends from the proximal end of the handle.

Example 33

The catheter of example 32, wherein: one of the tubes is mechanically coupled between one of the actuators and the proximal electrode that is selectively deployable such that the one of the tubes and the one of the actuators are collectively configured to deploy the proximal electrode in response to the one of the actuators being manually maneuvered; and another one of the tubes is mechanically coupled between another one of the actuators and the distal electrode that is selectively deployable such that the another one of the tubes and the another one of the actuators are collectively configured to deploy the distal electrode in response to the another one of the actuators being manually maneuvered.

Example 34

The catheter of example 33, wherein: a further one of the tubes is mechanically coupled to a further one of the actuators such that the further one of the tubes and the further one of the actuators are collectively configured to adjust a longitudinal distance between the proximal and distal electrodes, while one of the proximal and distal electrodes is deployed, in response to the further one of the actuators being manually maneuvered.

Example 35

The catheter of example 32, further comprising one or more non-deployable ring electrodes on the shaft, each of which is electrically coupled to the electrical cable.

Example 36

The catheter of example 32, wherein the electrically conductive coil, of each tube that includes an electrically conductive coil, is sandwiched between a hollow sleeve of electrically non-conductive material and an outer jacket of electrically non-conductive material.

Example 37

The catheter of example 22, wherein the electrically conductive coil, of each tube that includes an electrically conductive coil, provides for kink resistance and crush resistance, as well as providing an electrically conductive path along a length of the tube without requiring that a wire be threaded through a hollow lumen of the tube.

Example 38

The catheter of any one of examples 32 through 38, further comprising: a transducer physically coupled to the third tube and configured to emit a neuromodulation signal in response to a voltage being applied between first and second electrodes of the transducer; wherein the third tube, to which the transducer is physically coupled, includes first and second electrically conductive coils extending between proximal and distal ends of the third tube; and wherein the first and second electrically conductive coils are electrically coupled, respectively, to the first and second electrodes of the transducer to thereby enable the voltage to be applied between the first and second electrodes of the transducer.

Example 39

The catheter of example 38, further comprising a balloon physically coupled to the third tube and surrounding the transducer; the wherein the balloon is configured to receive a cooling fluid.

Example 40

The catheter of example 39, wherein: the third tube, to which the transducer and the balloon are physically coupled, includes first, second, and third hollow lumens; the first hollow lumen has a circular cross-section and is configured to receive at least a portion of another one of the tubes extending therethrough; and the second and third hollow lumens are configured to provide the cooling fluid to and from the balloon so that the cooling fluid can be circulated through the balloon.

Example 41

A system, comprising: an electronic control unit including a multi-channel nerve sensing subsystem, the multi-channel nerve sensing subsystem including a first channel and a second channel; and a catheter electrically coupled to the electronic control unit, the catheter including a plurality of electrodes along a portion thereof that is configured to be inserted into a biological lumen; the first channel comprising a first amplifier comprising a first pair of inputs and a first output, the first pair of inputs including a non-inverting (+) input and an inverting (−) input; the second channel comprising a second amplifier comprising a second pair of inputs and a second output, the second pair of inputs including a non-inverting (+) input and an inverting (−) input; the first pair of inputs of the first amplifier electrically coupled to a first pair of the electrodes of the catheter; the output of the first amplifier outputting a first channel signal indictive of neural activity sensed between the first pair of electrodes; the second pair of inputs of the second amplifier electrically coupled to a second pair of the electrodes of the catheter, wherein at least one of the electrodes in the second pair of electrodes is not included in the first pair of electrodes; the output of the second amplifier outputting a second channel signal indicative of neural activity sensed between the second pair of electrodes; the electronic control unit configured to compare the first and second channel signals to one another; and the electronic control unit configured to extract, from the first and second channel signals, information about nerves in tissue surrounding the biological lumen, based at least in part one results of the comparison of the first and second channel signals to one another.

Example 42

The system of example 41, wherein the electronic control unit is configured to filter and digitize the first and second channel signals before the first and second channel signals are compared to one another.

Example 43

The system of any one of examples 41 or 42, further comprising switches that enable a user to change which electrodes of the catheter are included in the first pair of electrodes electrically coupled to the first pair of inputs of the first amplifier of the first channel, and to change which electrodes of the catheter are included in the second pair of electrodes electrically coupled to the second pair of inputs of the second amplifier of the second channel.

Example 44

The system of any one of examples 41 through 43, wherein the plurality of electrodes of the catheter include: first and second deployable electrodes that are longitudinally spaced apart from one another; and one or more further electrodes that is/are non-deployable.

Example 45

The system of example 44, wherein: one of the inputs of the first pair of inputs of the first amplifier of the first channel is electrically coupled to one of the first and second deployable electrodes, the other one of the inputs of the first pair of inputs of the first amplifier of the first channel is electrically coupled to one of the one or more further electrodes that is/are non-deployable; and one of the inputs of the second pair of inputs of the second amplifier of the second channel is electrically coupled to the other one of the first and second deployable electrodes, the other one of the inputs of the second pair of inputs of the second amplifier of the second channel is electrically coupled to one of the one or more further electrodes that is/are non-deployable.

Example 46

The system of any one of examples 41 through 45, wherein each of the first and second amplifiers includes a respective ground reference terminal that is coupled to a same ground reference electrode.

Example 47

The system of example 46, wherein the ground reference electrode comprises one of the electrodes of the catheter that is not electrically coupled to any of the inputs of the first and second amplifiers.

Example 48

The system of example 46, wherein the ground reference electrode comprises one of an external surface electrode configured to be placed against skin of a patient, or an external needle electrode configured to be placed into skin of a patient.

Example 49

The system of any one of examples 41 through 48, wherein the electronic control unit also includes a nerve stimulation subsystem that is configured to deliver one or more stimulation pulses between at least two of the electrodes of the catheter, to thereby evoke a neural response that can be sensed using the multi-channel nerve sensing subsystem.

Example 50

The system of any one of examples 41 through 49, wherein the multi-channel nerve sensing subsystem includes: one or more analog-to-digital converters configured to convert the first and second channel signals from analog signals to digital signals; and digital signal processing circuitry configured to extract information from the first and second channel signals, based on least in part on the comparison between the first and second channel signals, after the first and second channel signals have been converted to digital signals.

Example 51

A method for use with a catheter including a plurality of electrodes along a portion thereof that is inserted into a biological lumen, the method comprising: sensing a first channel signal using a first amplifier including a first pair of inputs electrically coupled to a first pair of the electrodes, wherein the first channel signal is indicative of neural activity sensed between the first pair of electrodes; sensing a second channel signal using a second amplifier including a second pair of inputs electrically coupled to a second pair of the electrodes, wherein at least one electrode in the second pair of electrodes is not included in the first pair of electrodes, and wherein the second channel signal is indicative of neural activity sensed between the second pair of electrodes; comparing the first and second channel signals to one another; and extracting, from the first and second channel signals, information about nerves in tissue surrounding the biological lumen, based at least in part one results of the comparing the first and second channel signals to one another.

Example 52

The method of example 51, wherein the sensing the first channel signal and the sensing the second channel signal occur simultaneously.

Example 53

The method of any one of examples 51 or 52, further comprising filtering and digitizing the first and second channel signals before the first and second channel signals are compared to one another.

Example 54

The method of any one of examples 51 through 53, wherein the comparing and the extracting are performed by an electronic control unit.

Example 55

The method of any one of examples 51 through 54, further comprising delivering one or more stimulation pulses between at least two of the electrodes of the catheter, to thereby evoke a neural response that can be sensed using the first and second amplifiers.

Example 56

The method of any one of examples 51 through 55, wherein the plurality of electrodes of the catheter include first and second deployable electrodes that are longitudinally spaced apart from one another, and one or more further electrodes that is/are non-deployable.

Example 57

The method of example 56, further comprising: electrically coupling one of the inputs of the first pair of inputs of the first amplifier of the first channel to one of the first and second deployable electrodes; electrically coupling the other one of the inputs of the first pair of inputs of the first amplifier of the first channel to one of the one or more further electrodes that is/are non-deployable; electrically coupling one of the inputs of the second pair of inputs of the second amplifier of the second channel to the other one of the first and second deployable electrodes; and electrically coupling the other one of the inputs of the second pair of inputs of the second amplifier of the second channel to one of the one or more further electrodes that is/are non-deployable.

Example 58

The method of any one of examples 51 through 57, wherein the first and second amplifiers each include a ground reference terminal, and the method comprises coupling the ground reference terminals of the first and second amplifiers to a same ground reference electrode.

Example 59

The method of example 58, wherein the ground reference electrode comprises one of the electrodes of the catheter that is not electrically coupled to any of the inputs of the first and second amplifiers.

Example 60

The method of example 58, wherein the ground reference electrode comprises one of an external surface electrode configured to be placed against skin of a patient, or an external needle electrode configured to be placed into skin of a patient.

The term substantially the same, as used herein, means that two values are within plus and minus ten percent of one another. For example, if two values are substantially the same as one another, they are within plus and minus ten percent of one another. The term substantially equal to, as used herein, means a value plus and minus ten percent. For example, if a diameter is substantially equal to a value, then the diameter is within the range of plus and minus ten percent of the value.

Although several embodiments and examples are disclosed herein, the present application extends beyond the specifically disclosed embodiments to other alternative embodiments and/or uses of the inventions and modifications and equivalents thereof. It is also contemplated that various combinations or subcombinations of the specific features and aspects of the embodiments may be made and still fall within the scope of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above, but should be determined only by a fair reading of the claims that follow.

While the inventions are susceptible to various modifications, and alternative forms, specific examples thereof have been shown in the drawings and are herein described in detail. It should be understood, however, that the inventions are not to be limited to the particular forms or methods disclosed, but, to the contrary, the inventions are to cover all modifications, equivalents, and alternatives falling within the spirit and scope of the various embodiments described and the appended claims. Any methods disclosed herein need not be performed in the order recited.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, it is noted that the term "based on" as used herein, unless stated otherwise, should be interpreted as meaning based at least in part on, meaning there can be one or more additional factors upon which a decision or the like is made. For example, if a decision is based on the results of a comparison, that decision can also be based on one or more other factors in addition to being based on results of the comparison.

What is claimed is:

1. A catheter for use in analyzing neural activity of nerves that surround a biological lumen, the catheter comprising:
   a handle including first, second, and third actuators; and
   a shaft extending from the handle and including proximal and distal electrodes that are selectively deployable;
   the first actuator configured to selectively deploy the proximal electrode in response to the first actuator being manually maneuvered;
   the second actuator configured to selectively deploy the distal electrode in response to the second actuator being manually maneuvered; and
   the third actuator configured to selectively adjust a longitudinal distance between the proximal and distal electrodes in response to the third actuator being manually maneuvered; wherein: the shaft also includes a plurality of nested and concentric tubes; one of the tubes is mechanically coupled between the first actuator and the proximal electrode that is selectively deployable such that the one of the tubes and the first actuator are collectively configured to deploy the proximal electrode in response to the first actuator being manually maneuvered; another one of the tubes is mechanically coupled between the second actuator and the distal electrode that is selectively deployable such that the another one of the tubes and the second actuator are collectively configured to deploy the distal electrode in response to the second actuator being manually maneuvered; and a further one of the tubes is mechanically coupled to the third actuator such that the further one of the tubes and the third actuator are collectively configured to adjust a longitudinal distance between the proximal and distal electrodes, while one of the proximal and distal electrodes is deployed, in response to the third actuator being manually maneuvered.

2. The catheter of claim 1, wherein the third actuator:
   is configured to selectively adjust the longitudinal distance between the proximal and distal electrodes, while a first one of the proximal and distal electrodes is deployed, in response to the third actuator being manually maneuvered; and
   is locked in place, thereby preventing the longitudinal distance between the proximal and distal electrodes from being adjusted, while a second one of the proximal and distal electrodes is deployed.

3. The catheter of claim 1, wherein:
each electrode, of the proximal and distal electrodes that are selectively deployable, includes a pair of longitudinal ends, and is configured to be selectively deployed in response to one of the longitudinal ends being moved towards the other one of the longitudinal ends of the electrode.

4. The catheter of claim 1, wherein:
each electrode, of the proximal and distal electrodes that are selectively deployable, comprises a nitinol tube having a laser cut pattern of apertures that separate struts of the electrode.

5. The catheter of claim 1, wherein:
the plurality of nested and concentric tubes include first, second, third, and fourth tubes;
a portion of each of the second, third, and fourth tubes extends through a hollow lumen of the proximal electrode; and
a portion of the fourth tube extends through a hollow lumen of the distal electrode.

6. The catheter of claim 5, wherein:
at least a portion of the fourth tube extends through at least a portion of each of the first, second, and third tubes;
at least a portion of the third tube extends through at least a portion of the first and second tubes;
at least a portion of the second tube extends through at least a portion of the first tube;
a longitudinal length of the fourth tube is greater than a longitudinal length of the third tube;
the longitudinal length of the third tube is greater than a longitudinal length of the second tube; and
the longitudinal length of the second tube is great then a longitudinal length of the first tube.

7. The catheter of claim 5, wherein:
each of the first, second, third, and fourth tubes includes a respective inner diameter and a respective outer diameter;
the outer diameter of the fourth tube is less than the inner diameter of the third tube;
the outer diameter of the third tube is less than the inner diameter of the second tube; and
the outer diameter of the second tube is less than the inner diameter of the first tube.

8. The catheter of claim 5, wherein:
a distal portion of each of the second, third, and fourth tubes includes a respective flange that has an outer diameter that is substantially the same as the outer diameter of the first tube.

9. The catheter of claim 1, further comprising:
an electrical cable that extends from the handle and is configured to electrically connect the catheter to an electronic control unit (ECU);
each tube, of at least two of the plurality of tubes, includes an electrically conductive coil extending between proximal and distal ends of the tube and surrounded by one or more electrical insulator;
the electrically conductive coil of one of the tubes is electrically coupled between the proximal electrode and an electrically conductive path within the handle to thereby provide for an electrical connection between the proximal electrode and the electrical cable that extends from the handle; and
the electrically conductive coil of another one of the tubes is electrically coupled between the distal electrode and another electrically conductive path within the handle to thereby provide for an electrical connection between the distal electrode and the electrical cable that extends from the handle.

10. The catheter of claim 9, wherein the electrically conductive coil of each tube that includes an electrically conductive coil:
is sandwiched between a hollow sleeve of electrically non-conductive material and an outer jacket of electrically non-conductive material; and
provides for kink resistance and crush resistance, as well as providing an electrically conductive path along a length of the tube without requiring that a wire be threaded through a hollow lumen of the tube.

11. The catheter of claim 1, further comprising:
a transducer physically coupled to one of the plurality of tubes and configured to emit a neuromodulation signal in response to a voltage being applied between first and second electrodes of the transducer;
wherein the one of the plurality of tubes, to which the transducer is physically coupled, includes first and second electrically conductive coils extending between proximal and distal ends of the one of the plurality of tubes; and
wherein the first and second electrically conductive coils are electrically coupled, respectively, to the first and second electrodes of the transducer to thereby enable the voltage to be applied between the first and second electrodes of the transducer.

12. A catheter for use in analyzing neural activity of nerves that surround a biological lumen, the catheter comprising:
a handle including a plurality of actuators; and
a shaft extending from the handle and including a plurality of nested and concentric tubes, and also including proximal and distal electrodes that are selectively deployable;
each electrode, of the proximal and distal electrodes that are selectively deployable, including a pair of longitudinal ends and configured to be selectively deployed in response to one of the longitudinal ends being moved towards the other one of the longitudinal ends of the electrode;
one of the tubes mechanically coupled between one of the actuators and the proximal electrode that is selectively deployable such that the one of the tubes and the one of the actuators are collectively configured to deploy the proximal electrode in response to the one of the actuators being manually maneuvered;
another one of the tubes mechanically coupled between another one of the actuators and the distal electrode that is selectively deployable such that the another one of the tubes and the another one of the actuators are collectively configured to deploy the distal electrode in response to the another one of the actuators being manually maneuvered; and
a further one of the tubes mechanically coupled to a further one of the actuators such that the further one of the tubes and the further one of the actuators are collectively configured to adjust a longitudinal distance between the proximal and distal electrodes, while one of the proximal and distal electrodes is deployed, in response to the further one of the actuators being manually maneuvered.

13. The catheter of claim 12, wherein:
the actuators are configured such that while a specific one of the proximal and distal electrodes is deployed, the one of the actuators, which is configured to adjust the longitudinal distance between the proximal and distal electrodes, is locked in place to thereby prevent adjustment to the longitudinal distance between the proximal and distal electrodes while the specific one of the proximal and distal electrodes is deployed.

14. The catheter of claim 12, further comprising an electrical cable that extends from a proximal portion of the handle and is configured to electrically connect the catheter to an electronic control unit (ECU), wherein:
each tube, of at least two of the plurality of tubes, includes an electrically conductive coil extending between proximal and distal ends of the tube and surrounded by one or more electrical insulator;
the electrically conductive coil of one of the tubes is electrically coupled between the proximal electrode and an electrically conductive path within the handle to thereby provide for an electrical connection between the proximal electrode and the electrical cable that extends from the proximal portion of the handle; and
the electrically conductive coil of another one of the tubes is electrically coupled between the distal electrode and another electrically conductive path within the handle to thereby provide for an electrical connection between the distal electrode and the electrical cable that extends from the proximal portion of the handle;
wherein the electrically conductive coil of each tube that includes a said electrically conductive coil is sandwiched between a hollow sleeve of electrically non-conductive material and an outer jacket of electrically non-conductive material, and provides for kink resistance and crush resistance, as well as providing an electrically conductive path along a length of the tube without requiring that a wire be threaded through a hollow lumen of the tube.

15. The catheter of claim 12, wherein:
each electrode, of the proximal and distal electrodes that are selectively deployable, comprises a nitinol tube having a pattern of apertures that separate struts of the electrode.

16. The catheter of claim 12, wherein:
the plurality of nested and concentric tubes includes first, second, third, and fourth tubes that are concentric and nested such that at least a portion of the fourth tube extends through at least a portion of each of the first, second, and third tubes, at least a portion of the third tube extends through at least a portion of the first and second tubes, and at least a portion of the second tube extends through at least a portion of the first tube; and
a longitudinal length of the fourth tube is greater than a longitudinal length of the third tube, the longitudinal length of the third tube is greater than a longitudinal length of the second tube, and the longitudinal length of the second tube is great then a longitudinal length of the first tube.

17. The catheter of claim 16, wherein:
each of the first, second, third, and fourth tubes includes a respective inner diameter and a respective outer diameter;
the outer diameter of the fourth tube is less than the inner diameter of the third tube;
the outer diameter of the third tube is less than the inner diameter of the second tube; and
the outer diameter of the second tube is less than the inner diameter of the first tube.

18. The catheter of claim 16, wherein:
a distal portion of each of the second, third, and fourth tubes includes a respective flange that has an outer diameter that is substantially the same as the outer diameter of the first tube.

19. The catheter of claim 12, further comprising:
a transducer physically coupled to one of the plurality of tubes and configured to emit a neuromodulation signal in response to a voltage being applied between first and second electrodes of the transducer;
wherein the one of the plurality of tubes, to which the transducer is physically coupled, includes first and second electrically conductive coils extending between proximal and distal ends of the one of the plurality of tubes; and
wherein the first and second electrically conductive coils are electrically coupled, respectively, to the first and second electrodes of the transducer to thereby enable the voltage to be applied between the first and second electrodes of the transducer.

20. A catheter for use in analyzing neural activity of nerves that surround a biological lumen, the catheter comprising:
a handle including a plurality of actuators; and
a shaft extending from the handle and including first, second, third, and fourth tubes that are nested and concentric, and also including proximal and distal electrodes that are selectively deployable;
an electrical cable that extends from a proximal portion of the handle and is configured to by coupled to an electronic control unit;
each electrode, of the proximal and distal electrodes that are selectively deployable, including a pair of longitudinal ends and configured to be selectively deployed in response to one of the longitudinal ends being moved towards the other one of the longitudinal ends of the electrode;
each tube, of at least two of the first, second, third, and fourth tubes, includes an electrically conductive coil extending between proximal and distal ends of the tube and surrounded by one or more electrical insulator;
the electrically conductive coil of one of the tubes is electrically coupled between the proximal electrode and an electrically conductive path within the handle to thereby provide for an electrical connection between the proximal electrode and the electrical cable that extends from the proximal end of the handle; and
the electrically conductive coil of another one of the tubes is electrically coupled between the distal electrode and another electrically conductive path within the handle to thereby provide for an electrical connection between the distal electrode and the electrical cable that extends from the proximal end of the handle; wherein: one of the tubes is mechanically coupled between one of the actuators and the proximal electrode that is selectively deployable such that the one of the tubes and the one of the actuators are collectively configured to deploy the proximal electrode in response to the one of the actuators being manually maneuvered; and another one of the tubes is mechanically coupled between another one of the actuators and the distal electrode that is selectively deployable such that the another one of the tubes and the another one of the actuators are collectively configured to deploy the distal electrode in response to the another one of the actuators being manually maneuvered; wherein: a further one of the tubes is mechanically coupled to a further one of the actuators such that the further one of the tubes and the further one of the actuators are collectively configured to adjust a longitudinal distance between the proximal and distal electrodes, while one of the proximal and distal electrodes is deployed, in response to the further one of the actuators being manually maneuvered.

21. The catheter of claim 20, further comprising one or more non-deployable ring electrodes on the shaft, each of which is electrically coupled to the electrical cable.

22. The catheter of claim 20, wherein the electrically conductive coil, of each tube that includes an electrically conductive coil, is sandwiched between a hollow sleeve of electrically non-conductive material and an outer jacket of electrically non-conductive material.

23. The catheter of claim 20, wherein the electrically conductive coil, of each tube that includes an electrically conductive coil, provides for kink resistance and crush resistance, as well as providing an electrically conductive path along a length of the tube without requiring that a wire be threaded through a hollow lumen of the tube.

24. The catheter of claims 20, further comprising:
- a transducer physically coupled to the third tube and configured to emit a neuromodulation signal in response to a voltage being applied between first and second electrodes of the transducer;
- wherein the third tube, to which the transducer is physically coupled, includes first and second electrically conductive coils extending between proximal and distal ends of the third tube; and
- wherein the first and second electrically conductive coils are electrically coupled, respectively, to the first and second electrodes of the transducer to thereby enable the voltage to be applied between the first and second electrodes of the transducer.

* * * * *